(12) United States Patent
Kung et al.

(10) Patent No.: US 11,659,493 B2
(45) Date of Patent: May 23, 2023

(54) METHOD AND APPARATUS FOR MULTI-TRANSMISSION/RECEPTION POINT POWER HEADROOM REPORTING IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/558,669

(22) Filed: Dec. 22, 2021

(65) Prior Publication Data

US 2022/0217644 A1 Jul. 7, 2022

Related U.S. Application Data

(60) Provisional application No. 63/131,160, filed on Dec. 28, 2020, provisional application No. 63/131,156, filed on Dec. 28, 2020, provisional application No. 63/130,549, filed on Dec. 24, 2020, provisional application No. 63/130,544, filed on Dec. 24, 2020.

(51) Int. Cl.
*H04W 52/14* (2009.01)
*H04W 52/36* (2009.01)
(Continued)

(52) U.S. Cl.
CPC ....... *H04W 52/146* (2013.01); *H04W 52/365* (2013.01); *H04W 52/367* (2013.01); *H04W 72/23* (2023.01); *H04W 80/02* (2013.01)

(58) Field of Classification Search
CPC ............. H04W 52/146; H04W 52/365; H04W 52/367; H04W 72/14; H04W 80/02; H04W 72/23
See application file for complete search history.

(56) References Cited

U.S. PATENT DOCUMENTS

2016/0270094 A1 9/2016 Dinan
2018/0132197 A1* 5/2018 Lin .................... H04W 52/242
(Continued)

FOREIGN PATENT DOCUMENTS

WO 2018175784 A1 9/2018
WO 2019013485 A1 1/2019
(Continued)

OTHER PUBLICATIONS

Samsung, "Further enhancements on MIMO for NR", 3GPP TSG RAN Meeting #86, RP-193133, Sitges, Spain, Dec. 9-12, 2019, 5 pages.
(Continued)

*Primary Examiner* — Jasper Kwoh
(74) *Attorney, Agent, or Firm* — Cooper Legal Group

(57) ABSTRACT

A method and apparatus are disclosed. In an example from the perspective of a User Equipment (UE), the UE receives an uplink (UL) grant. The UL grant is indicative of a first Physical Uplink Shared Channel (PUSCH) transmission on a first Transmission/Reception Point (TRP) of a first cell. The UL grant is indicative of a second PUSCH transmission on a second TRP of the first cell. The UE transmits a Power Headroom Reporting (PHR) Medium Access Control (MAC) Control Element (CE). Based on the UL grant, the PHR MAC CE is indicative of a first power headroom (PH), associated with the first TRP, based on a real PUSCH transmission, and is indicative of a second PH, associated with the second TRP, based on a reference PUSCH transmission. The second PUSCH transmission is performed after transmitting the PHR MAC CE.

18 Claims, 20 Drawing Sheets

(51) Int. Cl.
    *H04W 72/23*     (2023.01)
    *H04W 80/02*     (2009.01)

(56) References Cited

U.S. PATENT DOCUMENTS

| | | | |
|---|---|---|---|
| 2020/0205090 A1* | 6/2020 | Loehr | H04W 52/365 |
| 2020/0288412 A1* | 9/2020 | Ajdakple | H04W 80/02 |
| 2021/0045070 A1* | 2/2021 | Yi | H04W 52/383 |
| 2022/0046555 A1* | 2/2022 | Khoshnevisan | H04W 72/0453 |

FOREIGN PATENT DOCUMENTS

| | | | |
|---|---|---|---|
| WO | 2020199956 A1 | 10/2020 | |
| WO | 2021022513 A1 | 2/2021 | |

OTHER PUBLICATIONS

3rd Generation Partnership Project, "Medium Access Control (MAC) protocal specification", 3GPP TS 38.321 v16.2.0, Sophia-Antipolis Cedex, France (Sep. 30, 2020), 154 pages.
Samsung, "Moderator summary #2 for multi-beam enhancement", 3GPP TSG RAN 2G1 #103-e, e-meeting, R1-2009499, Oct. 26-Nov. 13, 2020, 41 pages.
Corresponding European Patent Application No. 21216711.8, Extended European Search Report dated May 13, 2022.
European Office Action for European Patent Application 21216711. 8, dated Oct. 12, 2022, 6 pages.

* cited by examiner

| C₇ | C₆ | C₅ | C₄ | C₃ | C₂ | C₁ | R |
|---|---|---|---|---|---|---|---|

| | | |
|---|---|---|
| P | V | PH (Type 2, SpCell of the other MAC entity) |
| MPE or R | | $P_{CMAX,f,c}$ 1 |
| P | V | PH (Type 1, PCell) |
| MPE or R | | $P_{CMAX,f,c}$ 2 |
| P | V | PH (Type X, Serving Cell 1) |
| MPE or R | | $P_{CMAX,f,c}$ 3 |

...

| | | |
|---|---|---|
| P | V | PH (Type X, Serving Cell n) |
| MPE or R | | $P_{CMAX,f,c}$ m |

FIG. 6

| C₇ | C₆ | C₅ | C₄ | C₃ | C₂ | C₁ | R |
|----|----|----|----|----|----|----|----|
| C₁₅ | C₁₄ | C₁₃ | C₁₂ | C₁₁ | C₁₀ | C₉ | C₈ |
| C₂₃ | C₂₂ | C₂₁ | C₂₀ | C₁₉ | C₁₈ | C₁₇ | C₁₆ |
| C₃₁ | C₃₀ | C₂₉ | C₂₈ | C₂₇ | C₂₆ | C₂₅ | C₂₄ |

| P | V | PH (Type 2, SpCell of the other MAC entity) |
|---|---|---|
| MPE or R | | $P_{CMAX,f,c}$ 1 |
| P | V | PH (Type 1, PCell) |
| MPE or R | | $P_{CMAX,f,c}$ 2 |
| P | V | PH (Type X, Serving Cell 1) |
| MPE or R | | $P_{CMAX,f,c}$ 3 |

...

| P | V | PH (Type X, Serving Cell n) |
|---|---|---|
| MPE or R | | $P_{CMAX,f,c}$ m |

FIG. 7

| C7=0 | C6=0 | C5=0 | C4=0 | C3=1 | C2=0 | C1=1 | R |
|------|------|------|------|------|------|------|------|
| T7=0 | T6=0 | T5=0 | T4=0 | T3=0 | T2=0 | T1=1 | T0=1 |
| ⋮ | | | | | | | |
| P | V=0 | | | PH PCell 1 | | | |
| | | | | $P_{CMAX, p1}$ | | | |
| P | V=0 | | | PH PCell 2 | | | |
| | | | | $P_{CMAX, p2}$ | | | |
| P | V=0 | | | PH SCell 1_1 | | | |
| | | | | $P_{CMAX, s1}$ | | | |
| P | V=1 | | | PH SCell 1_2 | | | |
| P | V=0 | | | PH SCell 3 | | | |
| | | | | $P_{CMAX, s3}$ | | | |
| MPE or R | | | | | | | |
| MPE or R | | | | | | | |
| MPE or R | | | | | | | |
| MPE or R | | | | | | | |
| MPE or R | | | | | | | |

FIG. 13

| P | T=1 | PH PCell_1 |
|---|---|---|
| | MPE or R | P_CMAX |
| P | V | PH PCell_2 |
| | | ((MPE or R) + P_CMAX_2) or R |

FIG. 14

| P | V | PH PCell_1 | ((MPE or R) + $P_{CMAX}$) or R | PH PCell 2 | ((MPE or R) + $P_{CMAX\_2}$) or R |
| --- | --- | --- | --- | --- | --- |
| P | V | | | | |

FIG. 15

METHOD AND APPARATUS FOR MULTI-TRANSMISSION/RECEPTION POINT POWER HEADROOM REPORTING IN A WIRELESS COMMUNICATION SYSTEM

CROSS-REFERENCE TO RELATED APPLICATIONS

The present Application claims the benefit of U.S. Provisional Patent Application Ser. No. 63/130,544 filed on Dec. 24, 2020, the entire disclosure of which is incorporated herein in its entirety by reference. The present Application also claims the benefit of U.S. Provisional Patent Application Ser. No. 63/131,156 filed on Dec. 28, 2020, the entire disclosure of which is incorporated herein in its entirety by reference. The present Application also claims the benefit of U.S. Provisional Patent Application Ser. No. 63/130,549 filed on Dec. 24, 2020, the entire disclosure of which is incorporated herein in its entirety by reference. The present Application also claims the benefit of U.S. Provisional Patent Application Ser. No. 63/131,160 filed on Dec. 28, 2020, the entire disclosure of which is incorporated herein in its entirety by reference.

FIELD

This disclosure generally relates to wireless communication networks, and more particularly, to a method and apparatus for multi-Transmission/Reception Point (TRP) power headroom reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives an uplink (UL) grant. The UL grant is indicative of a first Physical Uplink Shared Channel (PUSCH) transmission on a first Transmission/Reception Point (TRP) of a first cell. The UL grant is indicative of a second PUSCH transmission on a second TRP of the first cell. The UE transmits a Power Headroom Reporting (PHR) Medium Access Control (MAC) Control Element (CE). Based on the UL grant, the PHR MAC CE is indicative of a first Type 1 power headroom (PH), associated with the first TRP, based on a real PUSCH transmission and is indicative of a second Type 1 PH, associated with the second TRP, based on a reference PUSCH transmission. The second PUSCH transmission is performed after transmitting the PHR MAC CE.

In an example from the perspective of a UE, the UE receives a UL grant. The UL grant is indicative of a first PUSCH transmission on a first TRP of a first cell. The UL grant is indicative of a second PUSCH transmission on a second TRP of the first cell. The UE transmits a PHR MAC CE. Based on the UL grant, the PHR MAC CE is indicative of a first PH, associated with the first TRP, based on a real PUSCH transmission and is indicative of a second PH, associated with the second TRP, based on a reference PUSCH transmission. The second PUSCH transmission is performed after transmitting the PHR MAC CE.

BRIEF DESCRIPTION OF THE DRAWINGS

FIG. 6 illustrates a multiple entry PHR MAC CE according to one exemplary embodiment.

FIG. 7 illustrates a multiple entry PHR MAC CE according to one exemplary embodiment.

FIG. 13 illustrates a multi-Transmission/Reception Point (TRP) PHR MAC CE according to one exemplary embodiment.

FIG. 14 illustrates a multi-TRP PHR MAC CE according to one exemplary embodiment.

FIG. 15 illustrates a multi-TRP PHR MAC CE according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193133 New WID: Further enhancements on MIMO for NR; 3GPP RAN1#103-e chairman's Notes; 3GPP TS 38.321, V16.2.0; 3GPP TS 38.331, V16.2.0; 3GPP 38.133, v16.5.0; 3GPP TS 38.213, V16.2.0; 3GPP TS 38.214 v16.2.0. The standards and documents listed above are hereby expressly incorporated by reference in their entirety.

Figure 1:
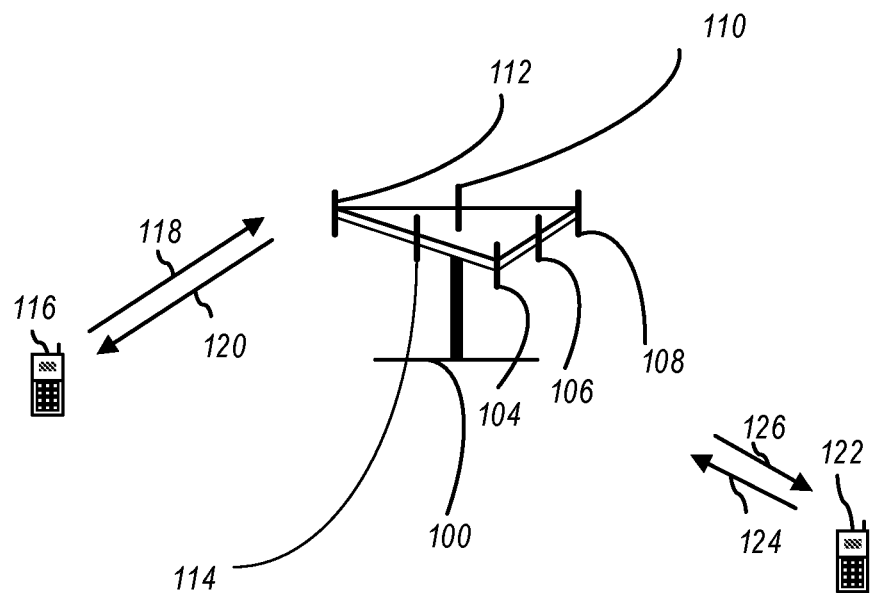
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
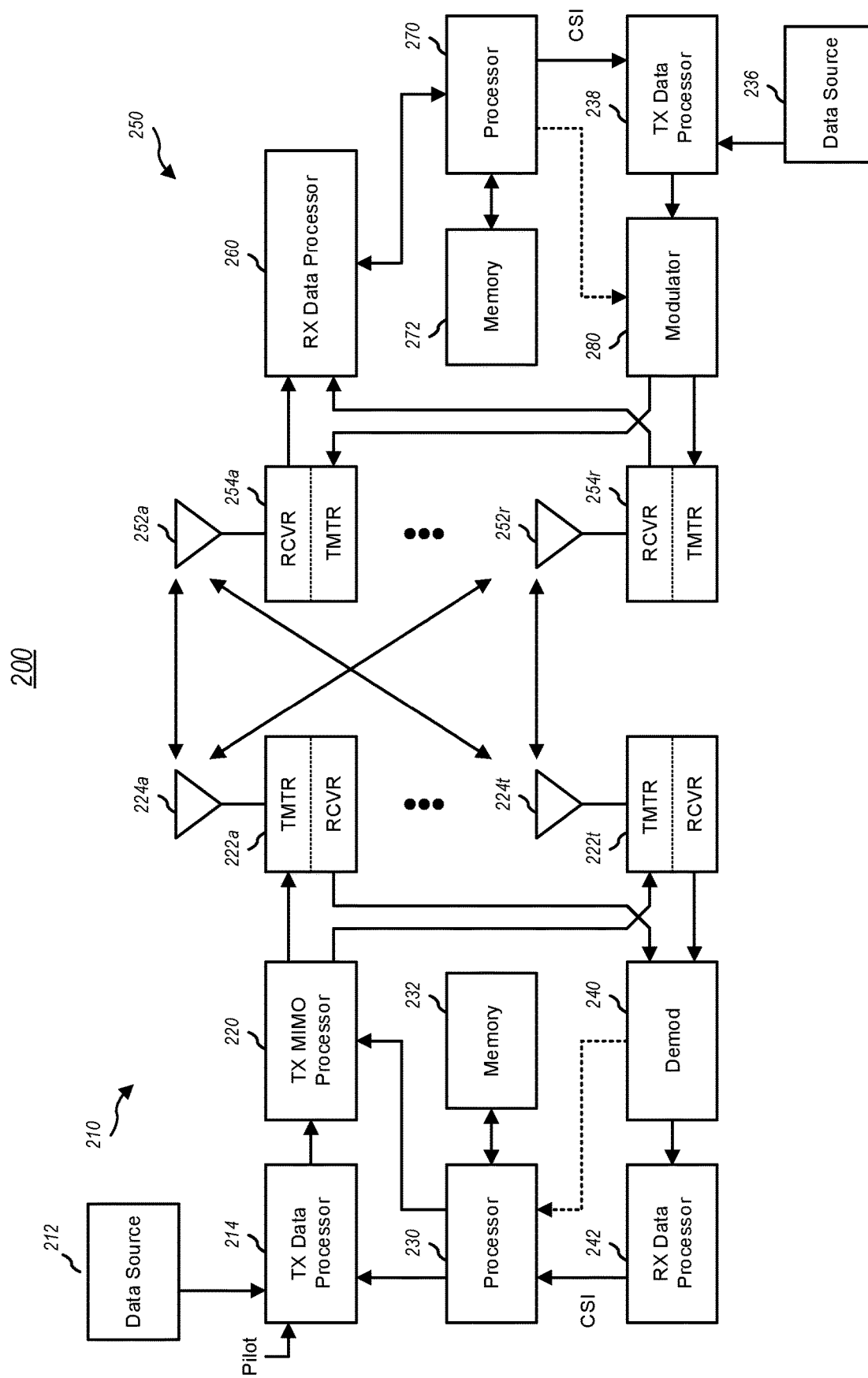
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
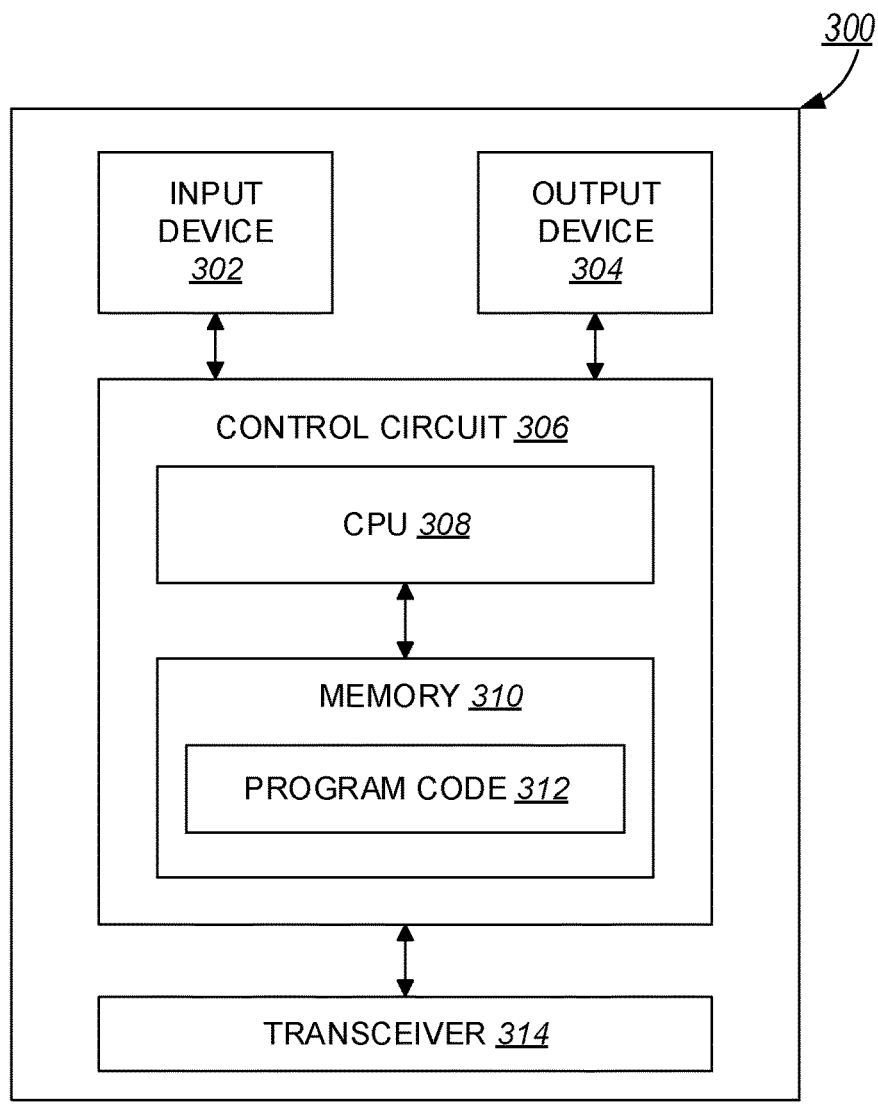
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
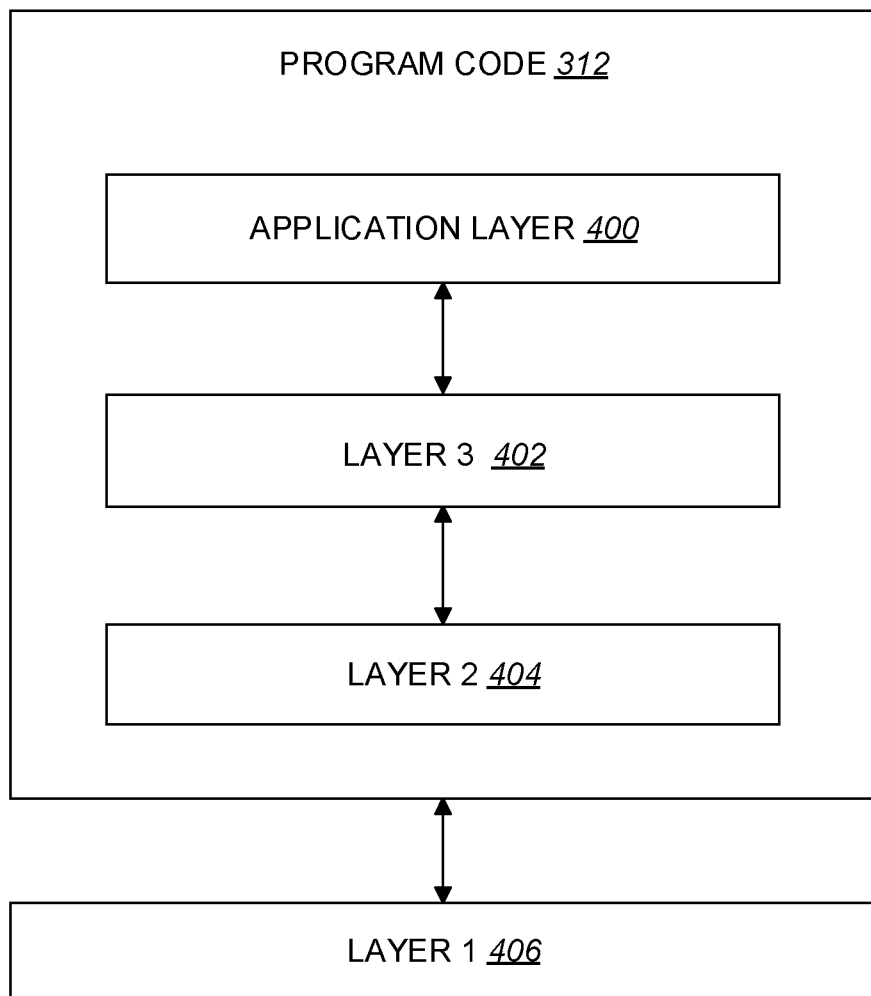
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In Work item description (WID) for further enhancements on MIMO for NR in RP-193133 New WID, beam management considering multi-Transmission/Reception Point (TRP) and/or multi-panel operation may be considered to be an objective. One or more parts of RP-193133 New WID are quoted below:

3 Justification

The Rel-15 NR includes a number of MIMO features that facilitate utilization of a large number of antenna elements at base station for both sub-6 GHz and over-6 GHz frequency bands. The Rel-16 NR enhances Rd-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core part WI or Testing Part WI

The work item aims to specify the further enhancements identified for NR MIMO. The detailed objectives are as follows:

[ . . . ]

1. Enhancement on the support for multi-TRP deployment, targeting both FR1 and FR2:
   a. Identify and specify features to improve reliability and robustness for channels other than PDSCH (that is, PDCCH, PUSCH, and PUCCH) using multi-TRP and/or multi-panel, with Rel.16 reliability features as the baseline
   b. Identify and specify QCL/TCI-related enhancements to enable inter-cell multi-TRP operations, assuming multi-DCI based multi-PDSCH reception
   c. Evaluate and, if needed, specify beam-management-related enhancements for simultaneous multi-TRP transmission with multi-panel reception

[ . . . ]

Figure 5:
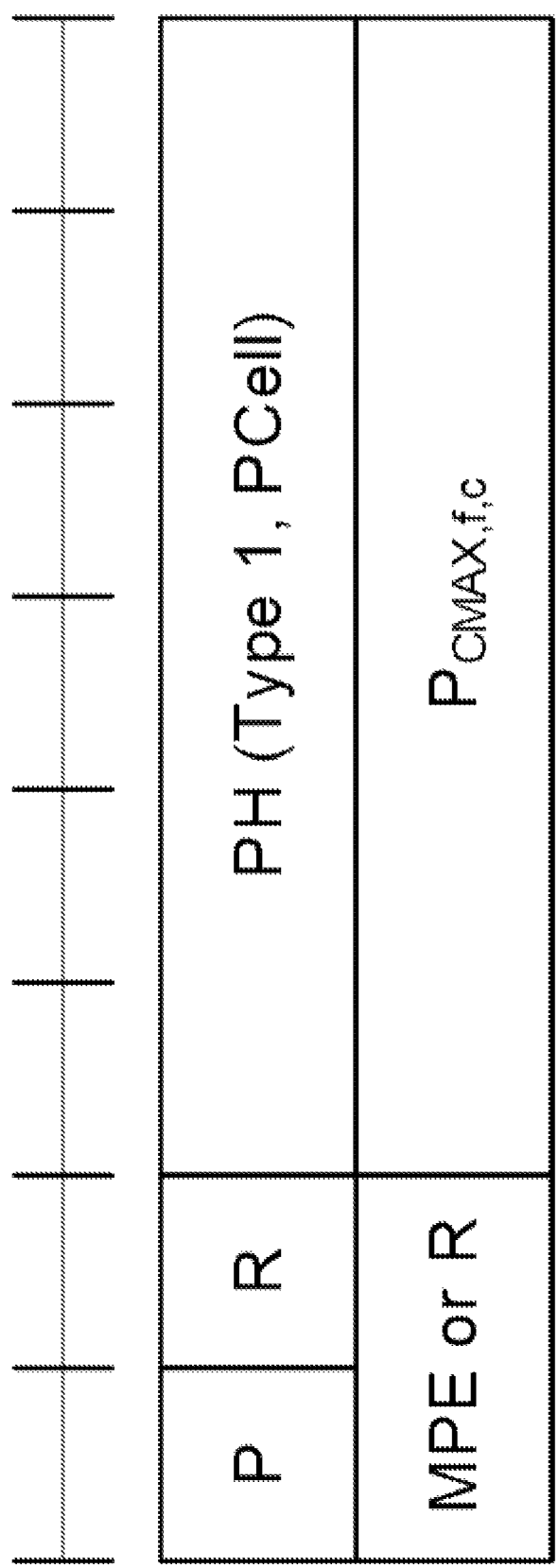
FIG. 5 illustrates a single entry Power Headroom Reporting (PHR) Medium Access Control (MAC) Control Element (CE) according to one exemplary embodiment.

In 3GPP specification 3GPP TS 38.321, V16.2.0, uplink (UL) transmission and Power Headroom Reporting (PHR) are introduced. Notably, FIG. 6.1.3.8-1 of Section 6.1.3.8 of 3GPP TS 38.321, V16.2.0, entitled "Single Entry PHR MAC CE", is reproduced herein as FIG. 5. FIG. 6.1.3.9-1 of Section 6.1.3.9 of 3GPP TS 38.321, V16.2.0, entitled "Multiple Entry PHR MAC CE with the highest ServCellIndex of Serving Cell with configured uplink is less than 8", is reproduced herein as FIG. 6. FIG. 6.1.3.9-2 of Section 6.1.3.9 of 3GPP TS 38.321, V16.2.0, entitled "Multiple Entry PHR MAC CE with the highest ServCellIndex of Serving Cell with configured uplink is equal to or higher than 8", is reproduced herein as FIG. 7. One or more parts of 3GPP TS 38.321, V16.2.0 are quoted below:

5.4 UL-SCH Data Transfer 5.4.1 UL Grant Reception

Uplink grant is either received dynamically on the PDCCH, in a Random Access Response, configured semi-persistently by RRC or determined to be associated with the PUSCH resource of MSGA as specified in clause 5.1.2a. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1>if an uplink grant for this Serving Cell has been received on the PDCCH for the MAC entity's C-RNTI or Temporary C-RNTI; or 1>if an uplink grant has been received in a Random Access Response:

2>if the uplink grant is for MAC entity's C-RNTI and if the previous uplink grant delivered to the HARQ entity for the same HARQ process was either an uplink grant received for the MAC entity's CS-RNTI or a configured uplink grant:

3>consider the NDI to have been toggled for the corresponding HARQ process regardless of the value of the NDI.

2>if the uplink grant is for MAC entity's C-RNTI, and the identified HARQ process is configured for a configured uplink grant:

[ . . . ]

2>deliver the uplink grant and the associated HARQ information to the HARQ entity.

1>else if an uplink grant for this PDCCH occasion has been received for this Serving Cell on the PDCCH for the MAC entity's CS-RNTI:

2>if the NDI in the received HARQ information is 1:

3>consider the NDI for the corresponding HARQ process not to have been toggled;

[ . . . ]

3>deliver the uplink grant and the associated HARQ information to the HARQ entity.

2>else if the NDI in the received HARQ information is 0:

3>if PDCCH contents indicate configured grant Type 2 deactivation:

4>trigger configured uplink grant confirmation.

3>else if PDCCH contents indicate configured grant Type 2 activation:

4>trigger configured uplink grant confirmation;

4>store the uplink grant for this Serving Cell and the associated HARQ information as configured uplink grant;

4>initialise or re-initialise the configured uplink grant for this Serving Cell to start in the associated PUSCH duration and to recur according to rules in clause 5.8.2;

[ . . . ]

5.4.2 HARQ Operation 5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response or for UL transmission for MSGA payload, HARQ process identifier 0 is used.

NOTE: When a single DCI is used to schedule multiple PUSCH, the UE is allowed to map generated TB(s) internally to different HARQ processes in case of LBT failure(s), i.e. UE may transmit a new TB on any HARQ process in the grants that have the same TBS, the same RV and the NDIs indicate new transmission.

The number of transmissions of a TB within a bundle of the dynamic grant or configured grant is given by REPETITION_NUMBER as follows:

For a dynamic grant, REPETITION_NUMBER is set to a value provided by lower layers, as specified in clause 6.1.2.1 of TS 38.214 [7];

For a configured grant, REPETITION_NUMBER is set to a value provided by lower layers, as specified in clause 6.1.2.3 of TS 38.214 [7].

If REPETITION_NUMBER>1, after the first transmission within a bundle, REPETITION_NUMBER−1 HARQ retransmissions follow within the bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to REPETITION_NUMBER for a dynamic grant or configured uplink grant. Each transmission within a bundle is a separate uplink grant delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For each uplink grant, the HARQ entity shall:

1>identify the HARQ process associated with this grant, and for each identified HARQ process:

2>if the received grant was not addressed to a Temporary C-RNTI on PDCCH, and the NDI provided in the associated HARQ information has been toggled compared to the value in the previous transmission of this TB of this HARQ process; or 2>if the uplink grant was received on PDCCH for the C-RNTI and the HARQ buffer of the identified process is empty; or 2>if the uplink grant was received in a Random Access Response (i.e. in a MAC RAR or a fallback RAR); or 2>if the uplink grant was determined as specified in clause 5.1.2a for the transmission of the MSGA payload; or 2>if the uplink grant was received on PDCCH for the C-RNTI in ra-Response Window and this PDCCH successfully completed the Random Access procedure initiated for beam failure recovery; or 2>if the uplink grant is part of a bundle of the configured uplink grant, and may be used for initial transmission according to clause 6.1.2.3 of TS 38.214 [7], and if no MAC PDU has been obtained for this bundle:
[ . . . ]
    4>obtain the MAC PDU to transmit from the Multiplexing and assembly entity, if any;
3>if a MAC PDU to transmit has been obtained:
    4>if the uplink grant is not a configured grant configured with autonomousTx; or
    4>if the uplink grant is a prioritized uplink grant:
        5>deliver the MAC PDU and the uplink grant and the HARQ information of the TB to the identified HARQ process;
        5>instruct the identified HARQ process to trigger a new transmission;
    [ . . . ]
2>else (i.e. retransmission):
    [ . . . ]
    4>deliver the uplink grant and the HARQ information (redundancy version) of the TB to the identified HARQ process;
    4>instruct the identified HARQ process to trigger a retransmission;
    [ . . . ]
5.4.2.2 HARQ Process Each HARQ process is associated with a HARQ buffer.

New transmissions are performed on the resource and with the MCS indicated on PDCCH or indicated in the Random Access Response (i.e. MAC RAR or fallbackRAR), or signalled in RRC or determined as specified in clause 5.1.2a for MSGA payload. Retransmissions are performed on the resource and, if provided, with the MCS indicated on PDCCH, or on the same resource and with the same MCS as was used for last made transmission attempt within a bundle, or on stored configured uplink grant resources and stored MCS when cg-RetransmissionTimer is configured. Retransmissions with the same HARQ process may be performed on any configured grant configuration if the configured grant configurations have the same TBS.

[ . . . ]

If the HARQ entity requests a new transmission for a TB, the HARQ process shall:
1>store the MAC PDU in the associated HARQ buffer;
1>store the uplink grant received from the HARQ entity;
1>generate a transmission as described below.

If the HARQ entity requests a retransmission for a TB, the HARQ process shall:
1>store the uplink grant received from the HARQ entity;
1>generate a transmission as described below.

To generate a transmission for a TB, the HARQ process shall:
[ . . . ]
    3>instruct the physical layer to generate a transmission according to the stored uplink grant.
[ . . . ]
5.4.6 Power Headroom Reporting The Power Headroom reporting procedure is used to provide the serving gNB with the following information:
Type 1 power headroom: the difference between the nominal UE maximum transmit power and the estimated power for UL-SCH transmission per activated Serving Cell;
Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
Type 3 power headroom: the difference between the nominal UE maximum transmit power and the estimated power for SRS transmission per activated Serving Cell;
MPE P-MPR: the power backoff applied by the UE to meet the MPE FR2 requirements for a Serving Cell.
[ . . . ]

A Power Headroom Report (PHR) shall be triggered if any of the following events occur:
phr-ProhibitTimer expires or has expired and the path loss has changed more than phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission;
NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].
phr-PeriodicTimer expires;
upon configuration or reconfiguration of the power headroom reporting functionality by upper layers, which is not used to disable the function;
activation of an SCell of any MAC entity with configured uplink of which firstActiveDownlinkBWP-Id is not set to dormant BWP;
addition of the PSCell (i.e. PSCell is newly added or changed);
phr-ProhibitTimer expires or has expired, when the MAC entity has UL resources for new transmission, and the following is true for any of the activated Serving Cells of any MAC entity with configured uplink:
    there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.
Upon switching of activated BWP from dormant BWP to non-dormant DL BWP of an SCell of any MAC entity with configured uplink;
if mpe-Reporting is configured, mpe-ProhibitTimer is not running, and the measured P-MPR applied to meet MPE requirements as specified in TS 38.101-2 [15] is more than or equal to mpe-Threshold for at least one activated Serving Cell since the last transmission of a PHR in this MAC entity.
NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.
NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If mpe-Reporting is configured, the MAC entity shall:
1>if the measured P-MPR applied to meet MPE requirements as specified in TS 38.101-2 [15] is more than or equal to mpe-Threshold for at least one activated Serving Cell and mpe-ProhibitTimer is not running:
2>trigger MPE P-MPR reporting for this Serving Cell.

If the MAC entity has UL resources allocated for a new transmission the MAC entity shall:
1>if it is the first UL resource allocated for a new transmission since the last MAC reset:
2>start phr-Periodic Timer;
1>if the Power Headroom reporting procedure determines that at least one PHR has been triggered and not cancelled; and
1>if the allocated UL resources can accommodate the MAC CE for PHR which the MAC entity is configured to transmit, plus its subheader, as a result of LCP as defined in clause 5.4.3.1:
2>if multiplePHR with value true is configured:
3>for each activated Serving Cell with configured uplink associated with any MAC entity of which the active DL BWP is not dormant BWP:
4>obtain the value of the Type 1 or Type 3 power headroom for the corresponding uplink carrier as specified in clause 7.7 of TS 38.213 [6] for NR Serving Cell and clause 5.1.1.2 of TS 36.213 [17] for E-UTRA Serving Cell;
4>if this MAC entity has UL resources allocated for transmission on this Serving Cell; or
4>if the other MAC entity, if configured, has UL resources allocated for transmission on this Serving Cell and phr-ModeOtherCG is set to real by upper layers:
5>obtain the value for the corresponding $P_{CMAX,f,c}$ field from the physical layer.
5>if mpe-Reporting is configured:
6>obtain the P-MPR value for the corresponding MPE field from the physical layer;
6>set the corresponding P field according to the obtained P-MPR value.
3>if phr-Type2OtherCell with value true is configured:
4>if the other MAC entity is E-UTRA MAC entity:
5>obtain the value of the Type 2 power headroom for the SpCell of the other MAC entity (i.e. E-UTRA MAC entity);
5>if phr-ModeOtherCG is set to real by upper layers:
6>obtain the value for the corresponding $P_{CMAX,f,c}$ field for the SpCell of the other MAC entity (i.e. E-UTRA MAC entity) from the physical layer.
3>instruct the Multiplexing and Assembly procedure to generate and transmit the Multiple Entry PHR MAC CE as defined in clause 6.1.3.9 based on the values reported by the physical layer.
2>else (i.e. Single Entry PHR format is used):
3>obtain the value of the Type 1 power headroom from the physical layer for the corresponding uplink carrier of the PCell;
3>obtain the value for the corresponding $P_{CMAX,f,c}$ field from the physical layer;
3>if mpe-Reporting is configured:
4>obtain the P-MPR value for the corresponding MPE field from the physical layer;
4>set the corresponding P field according to the obtained P-MPR value.
3>instruct the Multiplexing and Assembly procedure to generate and transmit the Single Entry PHR MAC CE as defined in clause 6.1.3.8 based on the values reported by the physical layer.
2>if MPE P-MPR reporting has been triggered:
3>start or restart the mpe-ProhibitTimer;
3>cancel triggered MPE P-MPR reporting for Serving Cells included in the PHR MAC CE.
2>start or restart phr-PeriodicTimer;
2>start or restart phr-ProhibitTimer;
2>cancel all triggered PHR(s).

6.1.3.8 Single Entry PHR MAC CE

The Single Entry PHR MAC CE is identified by a MAC subheader with LCID as specified in Table 6.2.1-2.

It has a fixed size and consists of two octets defined as follows (FIG. 6.1.3.8-1):

R: Reserved bit, set to 0;
Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);
P: If mpe-Reporting is configured this field indicates the applied power backoff to meet MPE requirements, as specified in TS 38.101-2 [15]. The MAC entity shall set the P field to 0 if the backoff is less than P_MPR_0 as specified in TS 38.133 [11] and set the P field to 1 otherwise. If mpe-Reporting is not configured this field indicates whether the MAC entity applies power backoff due to power management (as allowed by $P\text{-}MPR_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;
$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);
MPE: If mpe-Reporting is configured and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting is not configured or if the P field is set to 0, R bits are present instead.

FIG. 6.1.3.8-1: Single Entry PHR MAC CE

TABLE 6.1.3.8-1

Power Headroom levels for PHR

| PH | Power Headroom Level |
|---|---|
| 0 | POWER HEADROOM_0 |
| 1 | POWER HEADROOM_1 |
| 2 | POWER HEADROOM_2 |

TABLE 6.1.3.8-1-continued

Power Headroom levels for PHR

| PH | Power Headroom Level |
|---|---|
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

6.1.3.9 Multiple Entry PHR MAC CE

The Multiple Entry PHR MAC CE is identified by a MAC subheader with LCID as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

Power Headroom (PH): This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

P: If mpe-Reporting is configured this field indicates the applied power backoff to meet MPE requirements, as specified in TS 38.101-2 [15]. The MAC entity shall set the P field to 0 if the backoff is less than P_MPR_0 as specified in TS 38.133 [11] and set the P field to 1 otherwise. If mpe-Reporting is not configured this field indicates whether the MAC entity applies power backoff due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

MPE: If mpe-Reporting is configured and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting is not configured or if the P field is set to 0, R bits are present instead.

FIG. 6.1.3.9-1: Multiple Entry PHR MAC CE with the Highest ServCellIndex of Serving Cell with Configured Uplink is Less than 8

FIG. 6.1.3.9-2: Multiple Entry PHR MAC CE with the Highest ServCellIndex of Serving Cell with Configured Uplink is Equal to or Higher than 8

Mapping between power headroom reported value and measured quantity value is discussed in 3GPP 38.133, v16.5.0, one or more parts of which are quoted below:

10.1.17.1.1 Power Headroom Report Mapping

The power headroom reporting range is from −32 . . . +38 dB. Table 10.1.17.1-1 defines the report mapping.

TABLE 10.1.17.1-1

Power headroom report mapping

| Reported value | Measured quantity value (dB) |
|---|---|
| POWER HEADROOM_0 | PH < −32 |
| POWER HEADROOM_1 | −32 ≤ PH < −31 |
| POWER HEADROOM_2 | −31 ≤ PH < −30 |
| POWER HEADROOM_3 | −30 ≤ PH < −29 |
| ... | ... |
| POWER HEADROOM_53 | 20 ≤ PH < −21 |
| POWER HEADROOM_54 | 21 ≤ PH < −22 |
| POWER HEADROOM_55 | 22 ≤ PH < −24 |
| POWER HEADROOM_56 | 24 ≤ PH < −26 |
| POWER HEADROOM_57 | 26 ≤ PH < −28 |
| POWER HEADROOM_58 | 28 ≤ PH < −30 |
| POWER HEADROOM_59 | 30 ≤ PH < −32 |
| POWER HEADROOM_60 | 32 ≤ PH < −34 |
| POWER HEADROOM_61 | 34 ≤ PH < −36 |
| POWER HEADROOM_62 | 36 ≤ PH < −38 |
| POWER HEADROOM_63 | PH ≥ 38 |

10.1.18 $P_{CMAX,c,f}$

The UE is required to report the UE configured maximum output power ($P_{CMAX,c,f}$) together with the power headroom. This clause defines the requirements for the $P_{CMAX,c,f}$ reporting.

10.1.18.1 Report Mapping

The $P_{CMAX,c,f}$ reporting range is defined from −29 dBm to 33 dBm with 1 dB resolution. Table 10.1.18.1-1 defines the reporting mapping.

TABLE 10.1.18.1-1

Mapping of $P_{CMAX,c,f}$

| Reported value | Measured quantity value | Unit |
|---|---|---|
| PCMAX_C_00 | $P_{CMAX,c,f}$ < −29 | dBm |
| PCMAX_C_01 | −29 ≤ $P_{CMAX,c,f}$ < −28 | dBm |
| PCMAX_C_02 | −28 ≤ $P_{CMAX,c,f}$ < −27 | dBm |
| ... | ... | ... |
| PCMAX_C_61 | 31 ≤ $P_{CMAX,c,f}$ < 32 | dBm |
| PCMAX_C_62 | 32 ≤ $P_{CMAX,c,f}$ < 33 | dBm |
| PCMAX_C_63 | 33 ≤ $P_{CMAX,c,f}$ | dBm |

Radio Resource Control (RRC) configurations for Power Headroom Reporting (PHR) is discussed in 3GPP TS 38.331, V16.2.0, one or more parts of which are quoted below:

PHR-Config

The IE PHR-Config is used to configure parameters for power headroom reporting.

| PHR-Config information element |
|---|
| -- ASN1START |
| -- TAG-PHR-CONFIG-START |
| PHR-Config ::=                    SEQUENCE { |
|     phr-PeriodicTimer             ENUMERATED {sf10, sf20, sf50, sf100, sf200,sf500, sf1000, infinity}, |
|     phr-ProhibitTimer             ENUMERATED {sf0, sf10, sf20, sf50, sf100,sf200, sf500, 5f1000}, |
|     phr-Tx-PowerFactorChange      ENUMERATED {dB1, dB3, dB6, infinity}, |
|     multiplePHR                   BOOLEAN, |
|     dummy                         BOOLEAN, |
|     phr-Type2OtherCell            BOOLEAN, |
|     phr-ModeOtherCG               ENUMERATED {real, virtual}, |
|     ..., |
|     [[ |
|     mpe-Reporting-FR2-r16         SetupRelease { MPE-Config-FR2-r16 }                         OPTIONAL    -- Need M |
|     ]] |
| } |
| [...] |

| PHR-Config field descriptions |
|---|
| multiplePHR |
| Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases. |

| PHR-Config field descriptions |
| --- |
| phr-ModeOtherCG |
| Indicates the mode (i.e. real or virtual) used for the PHR of the activated cells that are part of the other Cell Group (i.e. MCG or SCG), when DC is configured. If the UE is configured with only one cell group (no DC), it ignores the field. |
| phr-Periodic Timer |
| Value in number of subframes for PHR reporting as specified in TS 38.321 [3]. Value sf10 corresponds to 10 subframes, value sf20 corresponds to 20 subframes, and so on. |
| phr-Prohibit Timer |
| Value in number of subframes for PHR reporting as specified in TS 38.321 [3]. Value sf0 corresponds to 0 subframe, value sf10 corresponds to 10 subframes, value sf20 corresponds to 20 subframes, and so on. |
| phr-Tx-PowerFactorChange |
| Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell). |
| phr-Type2OtherCell |
| If set to true, the UE shall report a PHR type 2 for the SpCell of the other MAC entity. See TS 38.321 [3], clause 5.4.6. Network sets this field to false if the UE is not configured with an E-UTRA MAC entity. |

SRS-Config

The IE SRS-Config is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).

| SRS-Config information element |
| --- |
| ```
-- ASN1START
-- TAG-SRS-CONFIG-START
SRS-Config ::=                                         SEQUENCE {
    srs-ResourceSetToReleaseList                       SEQUENCE
(SIZE(1..maxNrofSRS-ResourceSets)) OF SRS-ResourceSetId
OPTIONAL,        -- Need N
    srs-ResourceSetToAddModList                        SEQUENCE
(SIZE(1..maxNrofSRS-ResourceSets)) OF SRS-ResourceSet
OPTIONAL,        -- Need N
    srs-ResourceToReleaseList                          SEQUENCE
(SIZE(1..maxNrofSRS-Resources)) OF SRS-ResourceId
OPTIONAL,        -- Need N
    srs-ResourceToAddModList                           SEQUENCE
(SIZE(1..maxNrofSRS-Resources)) OF SRS-Resource
OPTIONAL,        -- Need N
    tpc-Accumulation                                   ENUMERATED {disabled}
OPTIONAL,        -- Need S
    ...,
}
SRS-ResourceSet ::=                                    SEQUENCE {
    srs-ResourceSetId                                      SRS-ResourceSetId,
    srs-ResourceIdList                                     SEQUENCE
(SIZE(1..maxNrofSRS-ResourcesPerSet)) OF SRS-ResourceId            OPTIONAL, -
- Cond Setup
    resourceType                                       CHOICE {
        aperiodic                                          SEQUENCE {
            aperiodicSRS-ResourceTrigger                       INTEGER
(1..maxNrofSRS-TriggerStates-1),
            csi-RS                                             NZP-CSI-RS-
ResourceId                                             OPTIONAL, -- Cond
NonCodebook
            slotOffset                                     INTEGER (1..32)
OPTIONAL, -- Need S
            ...,
            [[
``` |

| SRS-Config information element |
| --- |

```
            aperiodicSRS-ResourceTriggerList              SEQUENCE
(SIZE(1..maxNrofSRS-TriggerStates-2))
                                                         OF INTEGER
(1..maxNrofSRS-TriggerStates-1)       OPTIONAL    -- Need M
            ]]
        },
        semi-persistent                                  SEQUENCE {
            associatedCSI-RS                             NZP-CSI-RS-
ResourceId                                               OPTIONAL, -- Cond
NonCodebook
            ...
        }
        periodic                                         SEQUENCE {
            associatedCSI-RS                             NZP-CSI-RS-
ResourceId                                               OPTIONAL, -- Cond
NonCodebook
            ...
        }
    },
    usage                                                ENUMERATED
{beamManagement, codebook, nonCodebook, antennaSwitching},
    alpha                                                Alpha
OPTIONAL, -- Need S
    p0                                                   INTEGER (-202..24)
OPTIONAL, -- Cond Setup
    pathlossReferenceRS                                  PathlossReferenceRS-Config
OPTIONAL, -- Need M
    srs-PowerControlAdjustmentStates                     ENUMERATED { sameAsFci2,
separateClosedLoop}                                      OPTIONAL, -- Need S
    ...,
    [[
    pathlossReferenceRSList-r16                          SetupRelease {
PathlossReferenceRSList-r16}                                 OPTIONAL -- Need M
    ]]
}
PathlossReferenceRS-Config ::=                           CHOICE {
    ssb-Index                                                SSB-Index,
    csi-RS-Index                                             NZP-CSI-RS-ResourceId
}
...
PathlossReferenceRSList-r16 ::=                          SEQUENCE (SIZE
(1..maxNrofSRS-PathlossReferenceRS-r16)) OF PathlossReferenceRS-r16
PathlossReferenceRS-r16 ::=                              SEQUENCE {
    srs-PathlossReferenceRS-Id-r16                           SRS-
PathlossReferenceRS-Id-r16,
    pathlossReferenceRS-r16                                  PathlossReferenceRS-
Config
}
SRS-PathlossReferenceRS-Id-r16 ::=                       INTEGER (0..maxNrofSRS-
PathlossReferenceRS-1-r16)
SRS-PosResourceSet-r16 ::=                               SEQUENCE {
    srs-PosResourceSetId-r16                                 SRS-PosResourceSetId-
r16,
    srs-PosResourceIdList-r16                            SEQUENCE
(SIZE(1..maxNrofSRS-ResourcesPerSet)) OF SRS-PosResourceId-r16
OPTIONAL, -- Cond Setup
    resourceType-r16                                     CHOICE {
        aperiodic-r16                                        SEQUENCE {
            aperiodicSRS-ResourceTriggerList-r16                 SEQUENCE
(SIZE(1..maxNrofSRS-TriggerStates-1))
                                                         OF INTEGER
(1..maxNrofSRS-TriggerStates-1)       OPTIONAL,   -- Need M
            ...
        },
        semi-persistent-r16                                  SEQUENCE {
            ...
        },
        periodic-r16                                         SEQUENCE {
            ...
        }
    },
    alpha-r16                                            Alpha
OPTIONAL, -- Need S
    p0-r16                                               INTEGER (-202..24)
OPTIONAL, -- Cond Setup
    pathlossReferenceRS-Pos-r16                          CHOICE {
        ssb-IndexServing-r16                                 SSB-Index,
```

-continued

| SRS-Config information element | |
|---|---|
| ssb-Ncell-r16 | SSB-InfoNcell-r16, |
| dl-PRS-r16 | DL-PRS-Info-r16 |
| } | |
| OPTIONAL, -- Need M | |
| ... | |
| } | |
| SRS-ResourceSetId ::= | INTEGER (0..maxNrofSRS- |
| ResourceSets–1) | |
| SRS-Resource ::= | SEQUENCE { |
| srs-ResourceId | SRS-ResourceId, |
| ... | |
| } | |

| SRS-Resource field descriptions |
|---|
| resource Type |
| Periodicity and offset for semi-persistent and periodic SRS resource (see IS 38.214 [19], clause 6.2.1). For CLI SRS-RSRP measurement, only 'periodic' is applicable for resourceType. SRS-ResourceSet field descriptions alpha |
| alpha value for SRS power control (see TS 38.213 [13], clause 7.3). When the field is absent the UE applies the value 1. pathlossReferenceRS |
| A reference signal (e.g. a CSI-RS config or a SS block) to be used for SRS path loss estimation (see IS 38.213 [13], clause 7.3). resource Type |
| Time domain behavior of SRS resource configuration, see IS 38.214 [19], clause 6.2.1. The network configures SRS resources in the same resource set with the same time domain behavior on periodic, aperiodic and semi-persistent SRS. srs-ResourceIdList |
| The IDs of the SRS-Resources used in this SRS-ResourceSet. If this SRS-ResourceSet is configured with usage set to codebook, the srs-ResourceIdList contains at most 2 entries. If this SRS-ResourceSet is configured with usage set to nonCodebook, the srs-ResourceIdList contains at most 4 entries. srs-ResourceSetId |
| The ID of this resource set. It is unique in the context of the BWP in which the parent SRS- Con fig is defined. |

Reporting of Power headroom (PH) is discussed in 3GPP TS 38.213, V16.2.0, one or more parts of which are quoted below:

7.1 Physical Uplink Shared Channel 7.1.1 UE Behaviour

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) = \text{[dBm]}$$

$$\min \begin{cases} P_{CMAX,f,c}(i), \\ P_{O\_PUSCH,b,f,c}(j) + 10\log_{10}(2^\mu \cdot M^{PUSCH}_{RB,b,f,c}(i)) + \\ \alpha_{b,f,c}(j) \cdot PL_{b,f,c}(q_d) + \Delta_{TF,b,f,c}(i) + f_{b,f,c}(i, l) \end{cases}$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

If a UE established dedicated RRC connection using a Type-1 random access procedure, as described in Clause 8, and is not provided P0-PUSCH-AlphaSet or for a PUSCH transmission scheduled by a RAR UL grant as described in Clause 8.3, $j=0$, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg3}$, where $P_{O\_PRE}$ is provided by preambleReceivedTargetPower [11, TS 38.321] and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell c If a UE established dedicated RRC connection using a Type-2 random access procedure, as described in Clause 8, and is not provided P0-PUSCH-AlphaSet, or for a PUSCH transmission for Type-2 random access procedure as described in Clause 8.1A, $j=0$, $P_{O\_UE\_PUSCH,b,f,c}(0)=0$, and
$P_{O\_NOMINAL\_PUSCH,f,c}(0)=P_{O\_PRE}+\Delta_{MsgA\_PUSCH}$, where $P_{O\_PRE}$ is provided by preambleReceivedTargetPower and $\Delta_{MsgA\_PUSCH}$ is provided by msgADeltaPreamble, or $\Delta_{MsgA\_PUSCH}=\Delta_{PREAMBLE\_Msg3}$ dB if msgADeltaPreamble is not provided, for carrier f of serving cell c For a PUSCH (re)transmission configured by ConfiguredGrantConfig, $j=1$, $P_{O\_NOMINAL\_PUSCH,f,c}(1)$ is provided by p0-NominalWithoutGrant, or $P_{O\_NOMINAL\_PUSCH,f,c}(1)=P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c For $j \in \{2, \ldots, J-1\}=S_j$, a $P_{O\_NOMINAL\_PUSCH,f,c}(j)$ value, applicable for all $j \in S_j$, is provided by p0-NominalWithGrant, or $P_{O\_NOMINAL\_PUSCH,f,c}(j)=P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if a DCI format scheduling the PUSCH transmission includes a SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,b,f,c}(j)$ from the p0-PUSCH-AlphaSetId value that is mapped to the SRI field value. If the DCI format also includes a open-loop power control parameter set indication field and a value of the open-loop power control parameter set indication field is '1', the UE determines a value of $P_{O\_UE\_PUSCH,b,f,c}(j)$ from a first value in P0-PUSCH-Set-r16 with a p0-PUSCH-SetId-r16 value mapped to the SRI field value.

If the PUSCH transmission is scheduled by a DCI format that does not include an SRI field, or if SRI-PUSCH-PowerControl is not provided to the UE, $j=2$, If P0-PUSCH-Set-r16 is provided to the UE and the DCI format includes an open-loop power control parameter set indication field, the UE determines a value of $P_{O\_UE\_PUSCH,b,f,c}(j)$ from a first P0-PUSCH-AlphaSet in p0-AlphaSets if a value of the open-loop power control parameter set indication field is '0' or '00' a first value in P0-PUSCH-Set-r16 with the lowest p0-PUSCH-SetID value if a value of the open-loop power control parameter set indication field is '1' or '01' a second value in P0-PUSCH-Set-r16 with the lowest p0-PUSCH-SetID value if a value of the open-loop power control parameter set indication field is '10' else, the UE determines $P_{O\_UE\_PUSCH,b,f,c}(j)$ from the value of the first P0-PUSCH-AlphaSet in p0-AlphaSets For $\alpha_{b,f,c}(j)$ For $j=0$, if $P_{O\_NOMINAL\_PUSCH,f,c}(0)=P_{O\_PRE}+\Delta_{MsgA\_PUSCH}$ and msgA-Alpha is provided, $\Delta_{b,f,c}(0)$ is the value of msgA-Alpha elseif $P_{O\_NOMINAL\_PUSCH,f,c}(0)=P_{O\_PRE}+\Delta_{PREAMBLE\_Msg3}$ or msgA-Alpha is not provided, and msg3-Alpha is provided, $\alpha_{b,f,c}(0)$ is the value of msg3-Alpha else, $\alpha_{b,f,c}(0)=1$ For $j=1$, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c For $j=S_j$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if a DCI format scheduling the PUSCH transmission includes a SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the PUSCH transmission is scheduled by a DCI format that does not include a SRI field, or if SRI-PUSCH-PowerControl is not provided to the UE, $j=2$, and the UE determines $\alpha_{b,f,c}(j)$ from the value of the first P0-PUSCH-AlphaSet in p0-AlphaSets $M_{RB,b,f,c}^{PUSCH}(i)$ is the bandwidth of the PUSCH resource assignment expressed in number of resource blocks for PUSCH transmission occasion i on active UL BWP b of carrier f of serving cell c and μ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Clause 12, of carrier f of serving cell c If the UE is not provided PUSCH-PathlossReferenceRS and enableDefaultBeamPlForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS If the PUSCH transmission is scheduled by a RAR UL grant as described in Clause 8.3, or for a PUSCH transmission for Type-2 random access procedure as described in Clause 8.1A, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControl-Id in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If the PUSCH transmission is scheduled by a DCI format 0_0, and if the UE is provided a spatial setting by PUCCH-SpatialRelationInfo for a PUCCH resource with a lowest index for active UL BWP b of each carrier f and serving cell c, as described in Clause 9.2.2, the UE uses the same RS resource index $q_d$ as for a PUCCH transmission in the PUCCH resource with the lowest index If the PUSCH transmission is scheduled by a DCI format 0_1, and if the UE is provided enableDefaultBeamPlForSRS and is not provided PUSCH-PathlossReferenceRS and PUSCH-PathlossReferenceRS-r16, the UE uses the same RS resource index $q_d$ as for a SRS resource set with an SRS resource associated with the PUSCH transmission If
  the PUSCH transmission is scheduled by a DCI format 0_0 and the UE is not provided a spatial setting for a PUCCH transmission, or
  the PUSCH transmission is scheduled by a DCI format 0_1 that does not include an SRI field, or
  SRI-PUSCH-PowerControl is not provided to the UE, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If
  the PUSCH transmission is scheduled by a DCI format 0_0 on serving cell c,
  the UE is not provided PUCCH resources for the active UL BWP of serving cell c, and
  the UE is provided enableDefaultBeamPlForPUSCH0_0
  the UE determines a RS resource index $q_d$ providing a periodic RS resource with 'QCL-TypeD' in the TCI state or the QCL assumption of a CORESET with the lowest index in the active DL BWP of the serving cell c If
  the PUSCH transmission is scheduled by a DCI format 0_0 on serving cell c,
  the UE is not provided a spatial setting for PUCCH resources on the active UL BWP of the primary cell [11, TS 38.321], and
  the UE is provided enableDefaultBeamPlForPUSCH0_0
  the UE determines a RS resource index $q_d$ providing a periodic RS resource with 'QCL-TypeD' in the TCI state or the QCL assumption of a CORESET with the lowest index in the active DL BWP of serving cell c For a PUSCH transmission configured by ConfiguredGrantConfig, if rrc-ConfiguredUplinkGrant is included in ConfiguredGrantConfig, a RS resource index $q_d$ is provided by a value of pathlossReferenceIndex included in rrc-ConfiguredUplinkGrant where the RS resource is either on serving cell c or, if provided, on a serving cell indicated by a value of pathlossReferenceLinking For a PUSCH transmission configured by ConfiguredGrantConfig that does not include rrc-ConfiguredUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include a SRI field, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If the UE is provided enablePLRSupdateForPUSCHSRS, a mapping between sri-PUSCH-PowerControlId and PUSCH-PathlossReferenceRS-Id values can be updated by a MAC CE as described in [11, TS38.321]

For a PUSCH transmission scheduled by a DCI format that does not include a SRI field, or for a PUSCH transmission configured by ConfiguredGrantConfig and activated, as described in Clause 10.2, by a DCI format that does not include a SRI field, a RS resource index $q_d$ is determined from the PUSCH-PathlossReferenceRS-Id mapped to sri-PUSCH-PowerControlId=0

$PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-BlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$\Delta_{TF,b,f,c}(i)=10\ \log_{10}((2^{BPRE\cdot K_s}-1)\cdot\beta_{offset}^{PUSCH})$ for $K_S=1.25$ and $\Delta_{TF,b,f,c}(i)=0$ for $K_S=0$ where $K_S$ is provided by deltaMCS for each UL BWP b of each carrier f and serving cell c. If the PUSCH transmission is over more than one layer [6, TS 38.214], $\Delta_{TF,b,f,c}(i)=0$. BPRE and $\beta_{offset}^{PUSCH}$, for active UL BWP b of each carrier f and each serving cell c, are computed as below $$BPRE = \sum_{r=0}^{C-1} K_r/N_{RE}$$

for PUSCH with UL-SCH data and $BPRE=Q_m\cdot R/\beta_{offset}^{PUSCH}$ for CSI transmission in a PUSCH without UL-SCH data, where C is a number of transmitted code blocks, $K_r$ is a size for code block r, and $N_{RE}$ is a number of resource elements determined as $$N_{RE} = M_{RB,b,f,c}^{PUSCH}(i)\cdot \sum_{j=0}^{N_{symb,b,f,c}^{PUSCH}(i)-1} N_{sc,data}^{RB}(i,j),$$

where $N_{symb,b,f,c}^{PUSCH}(i)$ is a number of symbols for PUSCH transmission occasion i on active UL BWP b of carrier f of serving cell c, $N_{sc,data}^{RB}(i,j)$ is a number of subcarriers excluding DM-RS subcarriers and phase-tracking RS samples [4, TS 38.211] in PUSCH symbol j and assuming no segmentation for a nominal repetition in case the PUSCH transmission is with repetition Type B, $0\leq j<N_{symb,b,f,c}^{PUSCH}(i)$, and C, $K_r$ are defined in [5, TS 38.212]

$\beta_{offset}^{PUSCH}=1$ when the PUSCH includes UL-SCH data and $\beta_{offset}^{PUSCH}=\beta_{offset}^{CSI,1}$, as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}(i,l)$ for active UL BWP b of carrier f of serving cell c in PUSCH transmission occasion i $\delta_{PUSCH,b,f,c}(i,l)$ is a TPC command value included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI, as described in Clause 11.3

$l\in\{0, 1\}$ if the UE is configured with twoPUSCH-PC-AdjustmentStates and $l=0$ if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of $l\in\{0, 1\}$ is provided to the UE by powerControlLoopToUse If the UE is provided SRI-PUSCH-PowerControl, the UE obtains a mapping between a set of values for the SRI field in a DCI format scheduling the PUSCH transmission and the l value(s) provided by sri-PUSCH-ClosedLoopIndex and determines the l value that is mapped to the SRI field value If the PUSCH transmission is scheduled by a DCI format that does not include an SRI field, or if an SRI-PUSCH-PowerControl is not provided to the UE, $l=0$ If the UE obtains one TPC command from a DCI format 2_2 with CRC scrambled by a TPC-PUSCH-RNTI, the l value is provided by the closed loop indicator field in DCI format 2_2

$$f_{b,f,c}(i,l) = f_{b,f,c}(i-i_0, l) + \sum_{m=0}^{C(D_i)-1} \delta_{PUSCH,b,f,c}(m,l)$$

is the PUSCH power control adjustment state l for active UL BWP b of carrier f of serving cell c and PUSCH transmission occasion i if the UE is not provided tpc-Accumulation, where The $\delta_{PUSCH,b,f,c}$ values are given in Table 7.1.1-1

$$\sum_{m=0}^{C(D_i)-1} \delta_{PUSCH,b,f,c}(m,l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of serving cell c If the UE has reached maximum power for active UL BWP b of carrier f of serving cell c at PUSCH transmission occasion $i-i_0$ and $$\sum_{m=0}^{C(D_i)-1} \delta_{PUSCH,b,f,c}(m, l) \geq 0,$$

then $f_{b,f,c}(i,l)=f_{b,f,c}(i-i_0,l)$

If UE has reached minimum power for active UL BWP b of carrier f of serving cell c at PUSCH transmission occasion $i-i_0$ and $$\sum_{m=0}^{C(D_i)-1} \delta_{PUSCH,b,f,c}(m, l) \leq 0,$$

then $f_{b,f,c}(i,l)=f_{b,f,c}(i-i_0,l)$

A UE resets accumulation of a PUSCH power control adjustment state l for active UL BWP b of carrier f of serving cell c to $f_{b,f,c}(k, l)=0$, $k=0,1, \ldots, i$ If a configuration for a corresponding $P_{O\_UE\_PUSCH,b,f,c}(j)$ value is provided by higher layers If a configuration for a corresponding $\alpha_{b,f,c}(j)$ value is provided by higher layers where l is determined from the value of j as If j>1 and the UE is provided higher SRI-PUSCH-PowerControl, l is the sri-PUSCH-ClosedLoopIndex value(s) configured in any SRI-PUSCH-PowerControl with the sri-P0-PUSCH-AlphaSetId value corresponding to j If j>1 and the UE is not provided SRI-PUSCH-PowerControl or j=0, l=0

If j=1, l is provided by the value of powerControlLoopToUse $f_{b,f,c}(i,l)=\delta_{PUSCH,b,f,c}(i,l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

If the UE receives a random access response message in response to a PRACH transmission or a MsgA transmission on active UL BWP b of carrier f of serving cell c as described in Clause 8

$f_{b,f,c}(0,l)=\Delta P_{rampup,b,f,c}+\delta_{msg2,b,f,c}$, where l=0 and $\delta_{msg\ 2,b,f,c}$ is a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallbackRAR, on active UL BWP b of carrier f in the serving cell c, and $$\Delta P_{rampup,b,f,c} =$$

$$\min\left[\left\{\max\left(0, P_{CMAX,f,c} - \begin{pmatrix} 10\log_{10}(2^\mu \cdot M_{RB,b,f,c}^{PUSCH}(0)) + \\ P_{O\_PUSCH,b,f,c}(0) + \alpha_{b,f,c}(0) \cdot PL_c + \\ \Delta_{TF,b,f,c}(0) + \delta_{msg2,b,f,c} \end{pmatrix}\right)\right\}, \Delta P_{rampuprequested,b,f,c}\right]$$

and $\Delta P_{rampuprequested,b,f,c}$ is provided by higher layers and corresponds to the total power rampup requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

If the UE transmits the PUSCH in PUSCH transmission occasion i on active UL BWP b of carrier f of serving cell c as described in Clause 8.1A, $f_{b,f,c}(0,l)=\Delta P_{rampup,b,f,c}$, where l=0, and $$\Delta P_{rampup,b,f,c} =$$

$$\min\left[\left\{\max\left(0, P_{CMAX,f,c} - \begin{pmatrix} 10\log_{10}(2^\mu \cdot M_{RB,b,f,c}^{PUSCH}(i)) + \\ P_{O\_PUSCH,b,f,c}(0) + \alpha_{b,f,c}(0) \cdot PL_c(i) + \\ \Delta_{TF,b,f,c}(i) \end{pmatrix}\right)\right\}, \Delta P_{rampuprequested,b,f,c}\right]$$

and $\Delta P_{rampuprequested,b,f,c}$ is provided by higher layers and corresponds to the total power rampup requested by higher layers, $M_{RB,b,f,c}^{PUSCH}(i)$ is the bandwidth of the PUSCH resource assignment expressed in number of resource blocks, and $\Delta_{TF,b,f,c}(i)$ is the power adjustment of the PUSCH transmission in PUSCH transmission occasion i 7.3 Sounding Reference Signals For SRS, a UE splits a linear value $\hat{P}_{SRS,b,f,c}(i,q_s,l)$ of the transmit power $P_{SRS,b,f,c}(i,q_s,l)$ on active UL BWP b of carrier f of serving cell c equally across the configured antenna ports for SRS.

7.3.1 UE Behaviour

If a UE transmits SRS based on a configuration by SRS-ResourceSet on active UL BWP b of carrier f of serving cell c using SRS power control adjustment state with index l, the UE determines the SRS transmission power $P_{SRS,b,f,c}(i,q_s,l)$ in SRS transmission occasion i as $$P_{SRS,b,f,c}(i, q_s, l) = \min\left\{\begin{matrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{matrix}\right\} [dBm]$$

where,
- $P_{CMAX,f,c}(i)$ is the UE configured maximum output power defined in [8, TS 38.101-1], [8-2, TS38.101-2] and [TS 38.101-3] for carrier f of serving cell c in SRS transmission occasion i
- $P_{O\_SRS,b,f,c}(q_s)$ is provided by p0 for active UL BWP b of carrier f of serving cell c and SRS resource set $q_s$ provided by SRS-ResourceSet and SRS-ResourceSetId
- $M_{SRS,b,f,c}(i)$ is a SRS bandwidth expressed in number of resource blocks for SRS transmission occasion i on active UL BWP b of carrier f of serving cell c and μ is a SCS configuration defined in [4, TS 38.211]
- $\alpha_{SRS,b,f,c}(q_s)$ is provided by alpha for active UL BWP b of carrier f of serving cell c and SRS resource set $q_s$
- $PL_{b,f,c}(q_d)$ is a downlink pathloss estimate in dB calculated by the UE using RS resource index $q_d$ as described in Clause 7.1.1 for the active DL BWP of serving cell c and SRS resource set $q_s$ [6, TS 38.214]. The RS resource index $q_d$ is provided by pathlossReferenceRS associated with the SRS resource set $q_s$ and is either an ssb-Index providing a SS/PBCH block index or a csi-RS-Index providing a CSI-RS resource index. If the UE is provided enablePLRSupdateForPUSCHSRS, a MAC CE [11, TS 38.321] can provide by SRS-PathlossReferenceRS-Id a corresponding RS resource index $q_d$ for aperiodic or semi-persistent SRS resource set $q_s$
  If the UE is not provided pathlossReferenceRS or SRS-PathlossReferenceRS, or before the UE is provided dedicated higher layer parameters, the UE calculates $PL_{b,f,c}(q_d)$ using a RS resource obtained from an SS/PBCH block with same SS/PBCH block index as the one the UE uses to obtain MIB
  If the UE is provided pathlossReferenceLinking, the RS resource is on a serving cell indicated by a value of pathlossReferenceLinking
  If the UE
    is not provided pathlossReferenceRS or SRS-PathlossReferenceRS,
    is not provided spatialRelationInfo, and
    is provided enableDefaultBeamPlForSRS, and
    is not provided CORESETPoolIndex value of 1 for any CORESET, or is provided CORESETPoolIndex value of 1 for all CORESETs, in ControlResourceSet and no codepoint of a TCI field, if any, in a DCI format of any search space set maps to two TCI states [5, TS 38.212]the UE determines a RS resource index $q_d$ providing a periodic RS resource with 'QCL-TypeD' in
      the TCI state or the QCL assumption of a CORESET with the lowest index in the active DL BWP, if CORESETs are provided in the active DL BWP of serving cell c
      the active PDSCH TCI state with lowest ID [6, TS 38.214] in the active DL BWP, if CORESETs are not provided in the active DL BWP of serving cell c
- For the SRS power control adjustment state for active UL BWP b of carrier f of serving cell c and SRS transmission occasion i
  $h_{b,f,c}(i,l) = f_{b,f,c}(i,l)$, where $f_{b,f,c}(i,l)$ is the current PUSCH power control adjustment state as described in Clause 7.1.1, if srs-PowerControlAdjustmentStates indicates a same power control adjustment state for SRS transmissions and PUSCH transmissions; or $$h_{b,f,c}(i) = h_{b,f,c}(i-i_0) + \sum_{m=0}^{C(S_i)-1} \delta_{SRS,b,f,c}(m)$$

if the UE is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where
The $\delta_{SRS,b,f,c}$ values are given in Table 7.1.1-1
$\delta_{SRS,b,f,c}(m)$ is jointly coded with other TPC commands in a PDCCH with DCI format 2_3, as described in Clause 11.4

$$\sum_{m=0}^{C(S_i)-1} \delta_{SRS,b,f,c}(m)$$

is a sum of TPC command values in a set $S_i$ of TPC command values with cardinality $C(S_i)$ that the UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i
if the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission
if the SRS transmission is semi-persistent or periodic, $K_{SRS}(i)$ is a number of $K_{SRS,min}$ symbols equal to the product of a number of symbols per slot, $N_{symb}^{slot}$, and the minimum of the values provided by k2 in PUSCH-ConfigCommon for active UL BWP b of carrier f of serving cell c
If the UE has reached maximum power for active UL BWP b of carrier f of serving cell c at SRS transmission occasion $i-i_0$ and $$\sum_{m=0}^{C(S_i)-1} \delta_{SRS,b,f,c}(m) \geq 0,$$

then $h_{b,f,c}(i) = h_{b,f,c}(i-i_0)$
If UE has reached minimum power for active UL BWP b of carrier f of serving cell c at SRS transmission occasion $i-i_0$ and $$\sum_{m=0}^{C(S_i)-1} \delta_{SRS,b,f,c}(m) \leq 0,$$

then $h_{b,f,c}(i) = h_{b,f,c}(i-i_0)$
If a configuration for a $P_{O\_SRS,b,f,c}(q_s)$ value or for a $\alpha_{SRS,b,f,c}(q_s)$ value for a corresponding SRS power control adjustment state l for active UL BWP b of carrier f of serving cell c is provided by higher layers $h_{b,f,c}(k)=0$, $k=0, 1, \ldots, i$ Else $h_{b,f,c}(0) = \Delta P_{rampup,b,f,c} + \delta_{msg\ 2,b,f,c}$ where $\delta_{msg2,b,f,c}$ is the TPC command value indicated in the random access response grant corresponding to the random access preamble that the UE transmitted on active UL BWP b of carrier f of the serving cell c, and $$\Delta P_{rampup,b,f,c} = \min\left[\max\left(\begin{array}{l}0,\\ P_{CMAX,f,c} - (P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d))\end{array}\right),\ \Delta P_{rampuprequested,b,f,c}\right];$$

where $\Delta P_{rampupregu\ ested,b,f,c}$ is provided by higher layers and corresponds to the total power ramp-up requested by higher layers from the first to the last preamble for active UL BWP b of carrier f of serving cell c.

$h_{b,f,c}(i) = \delta_{SRS,b,f,c}(i)$ if the UE is not configured for PUSCH transmissions on active UL BWP b of carrier f of serving cell c, or if srs-PowerControlAdjustmentStates indicates separate power control adjustment states between SRS transmissions and PUSCH transmissions, and tpc-Accumulation is provided, and the UE detects a DCI format 2_3 $K_{SRS,\ min}$ symbols before a first symbol of SRS transmission occasion i, where absolute values of $\delta_{SRS,\ b,f,c}$ are provided in Table 7.1.1-1 if srs-PowerControlAdjustmentStates indicates a same power control adjustment state for SRS transmissions and PUSCH transmissions, the update of the power control adjustment state for SRS transmission occasion i occurs at the beginning of each SRS resource in the SRS resource set $q_s$; otherwise, the update of the power control adjustment state SRS transmission occasion i occurs at the beginning of the first transmitted SRS resource in the SRS resource set $q_s$.

If a UE transmits SRS based on a configuration by SRS-PosResourceSet-r16 on active UL BWP b of carrier f of serving cell c, the UE determines the SRS transmission power $P_{SRS,b,f,c}(i, q_s)$ in SRS transmission occasion i as SRS resource set $q_s$ [6, TS 38.214]. A configuration for RS resource index $q_d$ associated with SRS resource set $q_s$ is provided by pathlossReferenceRS-Pos-r16 if a ssb-IndexNcell-r16 is provided, referenceSignalPower is provided by ss-PBCH-BlockPower-r16 if a dl-PRS-ResourceId-r16 is provided, referenceSignalPower is provided by dl-PRS-ResourcePower-r16

If the UE determines that the UE is not able to accurately measure $PL_{b,f,c}(q_d)$, or the UE is not provided with pathlossReferenceRS-Pos-r16, the UE calculates $PL_{b,f,c}(q_d)$ using a RS resource obtained from the SS/PBCH block of the serving cell that the UE uses to obtain MIB The UE indicates a capability for a number of pathloss estimates that the UE can simultaneously maintain for all SRS resource sets provided by SRS-PosResourceSet-r16 in addition to the up to four pathloss estimates that the UE maintains per serving cell for PUSCH/PUCCH transmissions and for SRS transmissions configured by SRS-Resource.

7.7 Power Headroom Report

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c.

A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format 0_0 or DCI format 0_1 scheduling an initial transmission of a transport block since a power headroom report was triggered if the power headroom report is reported on a PUSCH triggered by the first DCI. Otherwise, $$P_{SRS,b,f,c}(i, q_s) = \min\left\{\begin{array}{l} P_{CMAX,f,c}(i),\\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d)\end{array}\right\}\ [dBm]$$

where, $P_{O\_SRS,b,f,c}(q_s)$ and $\alpha_{SRS,b,f,c}(q_s)$ are provided by p0-r16 and alpha-r16 respectively, for active UL BWP b of carrier f of serving cell c, and SRS resource set $q_s$ is indicated by SRS-PosResourceSetId-r16 from SRS-PosResourceSet-r16, and $PL_{b,f,c}(q_d)$ is a downlink pathloss estimate in dB calculated by the UE, as described in Clause 7.1.1 in case of an active DL BWP of a serving cell c, using RS resource indexed $q_d$ in a serving or non-serving cell for a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2} = T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant.

[ . . . ]

If a UE is configured with a SCG and if phr-ModeOtherCG for a CG indicates 'virtual' then, for power headroom reports transmitted on the CG, the UE computes PH assuming that the UE does not transmit PUSCH/PUCCH on any serving cell of the other CG. For NR-DC when both the MCG and the SCG operate either in FR1 or in FR2 and for a power headroom report transmitted on the MCG or the SCG, the UE computes PH assuming that the UE does not transmit PUSCH/PUCCH on any serving cell of the SCG or the MCG, respectively.

If the UE is configured with a SCG,

For computing power headroom for cells belonging to MCG, the term 'serving cell' in this clause refers to serving cell belonging to the MCG.

For computing power headroom for cells belonging to SCG, the term 'serving cell' in this clause refers to serving cell belonging to the SCG. The term 'primary cell' in this clause refers to the PSCell of the SCG.

If the UE is configured with a PUCCH-SCell,

For computing power headroom for cells belonging to primary PUCCH group, the term 'serving cell' in this clause refers to serving cell belonging to the primary PUCCH group.

For computing power headroom for cells belonging to secondary PUCCH group, the term 'serving cell' in this clause refers to serving cell belonging to the secondary PUCCH group. The term 'primary cell' in this clause refers to the PUCCH-SCell of the secondary PUCCH group.

[ . . . ]

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \text{ [dB]}$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are defined in Clause 7.1.1.

If a UE is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

For a UE configured with EN-DC/NE-DC and capable of dynamic power sharing, if E-UTRA Dual Connectivity PHR [14, TS 36.321] is triggered, the UE provides power headroom of the first PUSCH, if any, on the determined NR slot as described in clause 7.7.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects the earliest DCI format 0_0 or DCI format 0_1 scheduling an initial transmission of a transport block after a power headroom report was triggered Or the second PUSCH transmission is after the first uplink symbol of the first PUSCH transmission minus $T'_{proc,2} = T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [dB]}$$

where $\tilde{P}_{CMAX,f,c}(i)$ is computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3]. The remaining parameters are defined in Clause 7.1.1 where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0.

7.7.3 Type 3 PH Report

If a UE determines that a Type 3 power headroom report for an activated serving cell is based on an actual SRS transmission then, for SRS transmission occasion i on active UL BWP b of carrier f of serving cell c and if the UE is not configured for PUSCH transmissions on carrier f of serving cell c and the resource for the SRS transmission is provided by SRS-Resource, the UE computes a Type 3 power headroom report as $$PH_{type3,b,f,c}(i,q_s) = P_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d) + h_{b,f,c}(i)\} \text{ [dB]}$$

where $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are defined in Clause 7.3.1 with corresponding values provided by SRS-ResourceSet.

If the UE determines that a Type 3 power headroom report for an activated serving cell is based on a reference SRS transmission then, for SRS transmission occasion i on UL BWP b of carrier f of serving cell c, and if the UE is not configured for PUSCH transmissions on UL BWP b of carrier f of serving cell c and a resource for the reference SRS transmission is provided by SRS-Resource, the UE computes a Type 3 power headroom report as $$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \text{ [dB]}$$

where $q_s$ is an SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$ and $h_{b,f,c}(i)$ are defined in Clause 7.3.1 with corresponding values obtained from SRS-ResourceSetId=0 for UL BWP b. $\tilde{P}_{CMAX,f,c}(i)$ is computed assuming MPR=0 dB, A-MPR=0 dB, P-MPR=0 dB and $\Delta T_C$=0 dB. MPR, A-MPR, P-MPR and $\Delta T_C$ are defined in [8-1, TS 38.101-1], [8-2, TS38.101-2] and [8-3, TS 38.101-3].

If a UE is configured with two UL carriers for a serving cell and the UE determines a Type 3 power headroom report for the serving cell based on a reference SRS transmission and a resource for the reference SRS is provided by SRS-Resource, the UE computes a Type 3 power headroom report for the serving cell assuming a reference SRS transmission on the UL carrier provided by pucch-Config. If pucch-Config is not provided to the UE for any of the two UL carriers, the UE computes a Type 3 power headroom report for the serving cell assuming a reference SRS transmission on the non-supplementary UL carrier.

In RAN1#103-e meeting, agreements and working assumptions have been made regarding multi-Transmission/Reception Point (TRP) Physical Uplink Shared Channel (PUSCH) enhancements. At least some of the agreements and/or working assumptions are quoted below from 3GPP RAN1#103-e chairman's Notes:

Agreement
For single DCI based M-TRP PUSCH repetition schemes, support codebook based PUSCH transmission with following enhancements.
  Support the indication of two SRIs.
    Alt1: Bit field of SRI shall be enhanced.
    Alt2: No changes on SRI field
  Support the Indication of Two TPMIs.
    The same number of layers are applied for both TPMIs if two TPMIs are indicated
    The number of SRS ports between two TRPs should be same.
    FFS: Details on indicating two TPMIs (e.g, one TPMI field or two TPMI fields)
  Increase the maximum number of SRS resource sets to two
Agreement
For single DCI based M-TRP PUSCH repetition schemes, support non-codebook based PUSCH transmission with following considerations.
  Increase the maximum number of SRS resource sets to two, and associated CSI-RS resource can be configured per SRS resource set.
  FFS: Enhancements on SRI field in DCI to indicate the two beams for repetitions
Agreement
For single DCI based M-TRP PUSCH repetition Type B, at least nominal repetitions are used to map beams
  Further study details and applicability of each mapping method
  Further study the slot based beam mapping in the cases of nominal repetition across slot boundaries
Agreement
For PUSCH Multi-TRP Enhancements,
  For per TRP closed-loop power control for PUSCH, further study the following alternatives when the "closedLoopIndex" values are different.
    Option.1: A single TPC field is used in DCI formats 0_1/0_2, and the TPC value applied for both PUSCH beams
    Option.2: A single TPC field is used in DCI formats 0_1/0_2, and the TPC value applied for one of two PUSCH beams at a slot.
    Option 3: A second TPC field is added in DCI formats 0_1/0_2.
    Option 4: A single TPC field is used in DCI formats 0_1/0_2, and indicates two TPC values applied to two PUSCH beams, respectively.
  FFS: Transition period for beam/power/frequency change.
Agreement
Support both type 1 and type 2 CG PUSCH transmission towards MTRP. Further study the following alternatives,
  Alt.1: Single CG Configuration
    Repetitions of a TB transmitted towards MTPR on multiple PUSCH transmission occasions of single CG configuration.
    At least for codebook-based CG PUSCH, support configuring 2 SRIs/TPMIs.
  Alt.2: Multiple CG configurations
    Repetitions of a TB transmitted towards MTRP on more than one PUSCH transmission occasions, where one or more transmission occasions are from one CG configuration and another one or more PUSCH transmission occasions are from another CG configuration.
    1 SRI/TPMI is configured/indicated for each CG configuration.
Agreement
For M-TRP PUSCH reliability enhancement, further discuss multi-DCI based PUSCH transmission/repetition scheme(s) considering the following aspects.
  The same TB is repeated towards multiple TRPs with different beams, where one or more PUSCH repetitions are scheduled by one DCI and another one or more PUSCH repetitions are scheduled by another DCI.
  FFS: Details related to timeline restrictions and beam mapping
  Changes on Rel-15/16 MCS, TBS determination, and UL resource allocation are not expected from this scheme.
Agreement
For single DCI based PUSCH multi-TRP enhancements, support the following RV mapping for PUSCH repetition Type A,
  DCI indicates the first RV for the first PUSCH repetition, and the RV pattern (0 2 3 1) is applied separately to PUSCH repetitions of different TRPs with a possibility of configuring RV offset for the starting RV for the second TRP (The same method as PDSCH scheme 4)

FFS: Reuse of the same method for PUSCH repetition Type B.

Working Assumption

For single DCI based M-TRP PUSCH repetition Type A and B, it is possible to configure either cyclic mapping or sequential mapping of UL beams The support of cyclic mapping can be optional UE feature for the cases when the number of repetitions is larger than 2.

FFS: Support of half-half mapping.

FFS: Additional considerations on mapping patterns (including required beam switching gaps)

In NR enhanced multiple-input and multiple-output (eMIMO) work item, multi-Transmission/Reception Point (TRP) operation is introduced. A UE may perform communication with a cell of a network (e.g., gNB) via multiple TRPs (e.g., multiple transmission and/or reception points) of the cell. In Rel-16 (e.g., 3GPP release 16), multi-Physical Downlink Shared Channel (PDSCH) transmission is introduced. Two Transmission Configuration Indicator (TCI) states (e.g., two activated TCI states) for receiving PDSCH transmission occasions (e.g., two PDSCH transmission occasions) may be indicated to the UE (e.g., the UE may be configured with the two TCI states for receiving PDSCH transmissions, such as two PDSCH transmissions, on the PDSCH transmission occasions). In some examples, each TCI state of the two TCI states may be associated with a PDSCH transmission. The PDSCH transmissions (e.g., the two PDSCH transmissions) may have non-overlapping frequency and/or time domain resource allocation. For example, resource allocation for a PDSCH transmission of the PDSCH transmissions may not overlap in time domain and/or frequency domain with another PDSCH transmission of the PDSCH transmissions. In NR release 17 Work item description (WID) for enhancements on MIMO (RP-193133 New WID), multi-TRP transmission for Physical Uplink Control Channel (PUCCH), Physical Uplink Shared Channel (PUSCH) and Physical Downlink Control Channel (PDCCH) is introduced. A goal of multi-TRP PUSCH may be for the UE to transmit a same set of data via multiple PUSCHs to a network to increase reliability (e.g., the UE may transmit the same set of data via the multiple PUSCHs using spatial diversity of multiple TCI states and/or beams, and thus may increase a likelihood that the same set of data is successfully transmitted and/or received). In NR and LTE, the UE may be configured with one or more Power Headroom Reporting (PHR) configurations for performing one or more PHR procedures. The UE may use a PHR procedure to provide (to a network, for example) information comprising Type 1 Power Headroom (PH), Type-2 PH, Type-3 PH, and Maximum Permissible Exposure (MPE)-Maximum Power Reduction (MPR). For example, performing the PHR procedure may comprise reporting (e.g., transmitting) the information (to a network, for example). In some systems (e.g., current systems), in the PHR procedure, the information may be reported and/or determined (e.g., calculated) per serving cell. For example, for each serving cell of the UE (e.g., each serving cell that the UE is configured with and/or that the UE communicates with), the UE may determine (e.g., calculate) and/or report information comprising Type 1 PH, Type-2 PH, Type-3 PH, and/or MPE-MPR. In NR Rel-17 (e.g., NR release 17), with introduction of multi-TRP and multi-PUSCH transmission (e.g., transmission of data via multiple PUSCHs, multiple TRPs and/or multiple PUCCHs), power control may be handled separately among different TRPs (e.g., different TRPs in a single cell). The UE may perform Sounding Reference Signal (SRS) transmissions on different TRPs of one cell using different transmission powers (e.g., the UE may perform a first SRS transmission on a first TRP of the one cell using a first transmission power, and the UE may perform a second SRS transmission on a second TRP of the cell using a second transmission power, wherein the first transmission power is different from the second transmission power). Some systems (e.g., current systems) are associated with a PHR mechanism with which the UE may not report an accurate PH report of a cell to the gNB since different TRPs in the cell may be associated with different PH levels, thereby leading to inaccurate power control from the gNB (e.g., in these systems, a PH report of a cell may not indicate different PH levels for the different TRPs). In the present disclosure, one or more techniques and/or mechanisms are provided to enhance and handle PHR with multi-TRP uplink (UL) transmissions.

A first concept of the present disclosure is that a UE may generate a PHR Medium Access Control (MAC) Control Element (CE) (e.g., a multi-TRP PHR MAC CE) in response to a triggered PHR (e.g., a triggered PHR that is not cancelled) associated with a TRP of a cell (and/or in response to another event and/or entity in addition to the triggered PHR associated with the TRP of the cell). The UE may communicate with the cell (e.g., perform transmission, such as UL transmission, with the cell) via multiple TRPs comprising a first TRP and a second TRP. A TRP of the multiple TRPs (and/or each TRP of the multiple TRPs) may provide network coverage and/or may communicate (e.g., directly communicate) with UEs. A TRP of the multiple TRPs (and/or each TRP of the multiple TRPs) may be controlled by a base station and/or may communicate with the base station via fronthaul.

In some examples, the multi-TRP PHR MAC CE (generated by the UE) may be a single entry multi-TRP PHR MAC CE.

The multi-TRP PHR MAC CE may indicate a PH level (e.g., at least one PH level) associated with a TRP of a cell. For example, the multi-TRP PHR MAC CE may comprise a field indicating a PH level associated with the first TRP of a cell (and/or may comprise one or more other fields and/or information in addition to the field indicating the PH level). The field may be a PH field (e.g., a Type 1 PH field or a Type 3 PH field). The PH level may indicate a measured value associated with (e.g., for) the first TRP of the cell. Each value of the PH level may be associated with a range of values corresponding to the measured value (e.g., the value of the PH level may be indicative of a range comprising the measured value). The PH level (and/or each PH level indicated by the multi-TRP PHR MAC CE and/or each value indicated by the PH level) may indicate a PH report determined (e.g., computed) by a lower layer (e.g., a physical layer) of the UE. The measured value may be a PH (e.g., a PH report) of the first TRP of the cell. The PH may be a Type 1 PH, a Type 2 PH, or a Type 3 PH.

The measured value may indicate a difference between a UE maximum transmit power and an estimated power for Uplink Shared Channel (UL-SCH) transmission (and/or PUSCH transmission) associated with a TRP (e.g., the first TRP). For example, the measured value may indicate a Type 1 PH. Alternatively and/or additionally, the measured value may indicate a difference between a UE maximum transmit power and an estimated power for SRS transmission associated with the TRP (e.g., the measured value may indicate a Type 3 PH).

The measured value may be determined (e.g., derived) based on a maximum output power (e.g., a UE configured maximum output power) for a carrier of the cell, wherein the carrier may be a carrier of the TRP of the cell (e.g., the maximum output power may correspond to $P_{CMAX,f,c}(i)$ in 3GPP TS 38.213, V16.2.0). Alternatively and/or additionally, the measured value may be determined (e.g., derived) based on preambleReceivedTargetPower, msg3-DeltaPreamble, msgADeltaPreamble, p0-NominalWithoutGrant and/or p0-PUSCH-Alpha.

The measured value may be determined (e.g., derived) based on a bandwidth of a PUSCH resource assignment on an active UL Bandwidth Part (BWP) (e.g., an active UL BWP of the TRP) of the cell. For example, the measured value may be determined (e.g., derived) based on a logarithm of the bandwidth.

The measured value may be determined (e.g., derived) based on a downlink (DL) pathloss associated with the serving cell (e.g., the downlink pathloss may be associated with the TRP of the serving cell). The downlink pathloss may be determined (e.g., calculated) using a reference signal (e.g., a pathloss reference signal) associated with an active DL BWP.

The UE may determine (e.g., calculate) multiple pathloss values (e.g., different pathloss values) for multiple TRPs (e.g., different TRPs) of a cell. For example, the UE may determine (e.g., calculate) a first pathloss (e.g., a first pathloss value) for the first TRP of the cell using a first DL reference signal, and the UE may determine (e.g., calculate) a second pathloss (e.g., a second pathloss value) for the second TRP of the cell using a second DL reference signal. The first DL reference signal and the second DL reference signal may be associated with different TRPs (and/or different Control Resource Set (CORESET) pools). For example, the first DL reference signal may be associated with a TRP (e.g., the first TRP) that is different from a TRP (e.g., the second TRP) associated with the second DL reference signal. Alternatively and/or additionally, the first DL reference signal may be associated with a CORESET pool that is different from a CORESET pool associated with the second DL reference signal.

The measured value may be determined (e.g., derived) based on a PUSCH power control adjustment state (e.g., $f_{b,f,c}(i, 1)$) for an active UL BWP of a TRP of the cell.

A network may provide and/or configure multiple PUSCH power control adjustment states (e.g., different PUSCH power control adjustment states) for multiple TRPs (e.g., different TRPs) in a cell. For example, the network may indicate to the UE (e.g., instruct the UE) to apply a first PUSCH power control adjustment state, f1, to the first TRP of the cell, and apply a second PUSCH power control adjustment state, f2, to the second TRP of the cell.

If the UE determines to compute a Type 1 PH for the TRP of the cell based on an actual PUSCH transmission (e.g., the Type 1 PH may correspond to a real PH), the measured value (e.g., an i-th Type 1 PH of the TRP) may be determined (e.g., derived) based on the following formula (defined in 3GPP TS 38.213, V16.2.0):

$$PH_{type1,b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \text{ [dB]}$$

If the UE determines to compute a Type 1 PH for the TRP of the cell based on a reference PUSCH transmission (e.g., the Type 1 PH may correspond to a virtual PH), the measured value (e.g., an i-th Type 1 PH of the TRP) may be determined (e.g., derived) based on the following formula (defined in 3GPP TS 38.213, V16.2.0):

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [dB]}$$

In one example, a UE may determine (e.g., calculate) an i-th first PH (e.g., an i-th first Type 1 PH) for the first TRP using a first pathloss (e.g., $PL(q_1)$) derived from a DL reference signal $q_1$. The UE may determine (e.g., calculate) the i-th first PH using a first PUSCH power control adjustment state (e.g., f(i, 1)). The UE may determine (e.g., calculate) an i-th second PH (e.g., an i-th second Type 1 PH) for the second TRP using a second pathloss (e.g., $PL(q_2)$) derived from a DL reference signal $q_2$. The UE may determine (e.g., calculate) the i-th second PH using a second PUSCH power control adjustment state (e.g., f(i, 2)).

In a first example, the i-th first PH is a PH (e.g., a PH report) based on an actual PUSCH transmission and the i-th second PH is a PH (e.g., a PH report) based on a reference PUSCH transmission. In a second example, the i-th first PH is a PH (e.g., a PH report) based on a reference PUSCH transmission and the i-th second PH is a PH (e.g., a PH report) based on an actual PUSCH transmission.

If the UE determines to compute a Type 3 PH for the TRP of the cell based on an actual SRS transmission (e.g., the Type 3 PH may correspond to a real PH), the measured value (e.g., an i-th Type 3 PH of the TRP) may be determined (e.g., derived) based on the following formula (defined in 3GPP TS 38.213, V16.2.0):

$$PH_{type3,b,f,c}(i,q_s) = P_{CMAX,f,c}(i) - \{P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i)\} \text{ [dB]}$$

If the UE determines to compute a Type 3 PH for the TRP of the cell based on a reference SRS transmission (e.g., the Type 3 PH may correspond to a virtual PH), the measured value (e.g., the i-th Type 3 PH of the TRP) may be derived based on a formula (defined in [6]):

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \text{ [dB]}$$

In one example, a UE may determine (e.g., calculate) an i-th first PH (e.g., an i-th first Type 3 PH) for the first TRP using a first pathloss (e.g., $PL(q_1)$) derived from a DL reference signal $q_1$. The UE may determine (e.g., calculate) the i-th first PH (e.g., the i-th first Type 3 PH) using a first SRS power control adjustment state (e.g., h(i, 1)). The UE may calculate an i-th second PH (e.g., an i-th second Type 3 PH) for the second TRP using a second pathloss (e.g., $PL(q_2)$) derived from a DL reference signal $q_2$. The UE may determine (e.g., calculate) the i-th second PH (e.g., the i-th second Type 3 PH) using a second SRS power control adjustment state (e.g., h(i, 2)).

In a first example, the i-th first PH is a PH (e.g., a PH report) based on an actual SRS transmission and the i-th second PH is a PH (e.g., a PH report) based on a reference SRS transmission. In a second example, the i-th first PH is a PH (e.g., a PH report) based on a reference SRS transmission and the i-th second PH is a PH (e.g., a PH report) based on an actual SRS transmission.

A UE may receive an activation signaling (e.g., a PUSCH activation MAC CE) indicating one or more codepoints. In some examples, each codepoint of the one or more codepoints is associated with one or more PUSCHs (e.g., one PUSCH or two PUSCHs), one or more UL TCI states (e.g., one UL TCI state or two UL TCI states), one or more UL beams (e.g., one UL beam or two UL beams) and/or one or more spatial relations associated with PUSCH (e.g., one spatial relation or two spatial relations). For example, each codepoint of the one or more codepoints may be associated with activating one or more PUSCHs (e.g., one PUSCH or two PUSCHs), activating one or more UL TCI states (e.g., one UL TCI state or two UL TCI states), activating one or more UL beams (e.g., one UL beam or two UL beams) and/or activating one or more spatial relations associated with PUSCH (e.g., one spatial relation or two spatial relations). The UE may determine whether to report and/or indicate one PH for a cell or to report and/or indicate two PHs for the cell based on whether or not a DL signaling (e.g., Downlink Control Indicator (DCI)) indicates a codepoint associated with two UL TCI states (e.g., two activated UL TCI states) and/or two UL beams. Two activated UL TCI states and/or two UL beams may be associated with two activated TRPs of the cell. Alternatively and/or additionally, the DL signaling being indicative of a codepoint associated with two UL TCI states (e.g., two activated UL TCI states) and/or two UL beams may imply that the cell is associated with two activated TRPs. In an example, the UE may determine to report and/or indicate two PHs for the cell based on the DL signaling being indicative of a codepoint associated with two UL TCI states (e.g., two activated UL TCI states) and/or two UL beams. Alternatively and/or additionally, the UE may determine to report and/or indicate one PH for the cell based on the DL signaling being indicative of a codepoint associated with one UL TCI state (e.g., one activated UL TCI state) and/or one UL beam. The term "signaling" as used herein may correspond to at least one of a signal, a set of signals, a transmission, a message, etc.

The UE may determine whether to report, indicate and/or compute one PH for a cell or to report, indicate and/or compute two PHs for the cell based on whether a DL signaling (e.g., DCI) indicates one codepoint (e.g., SRS Resource Indicator (SRI)) associated with one or more UL TCI states (e.g., one or more activated UL TCI states) and/or one or more UL beams (for different TRPs, for example) or the DL signaling indicates multiple codepoints (e.g., SRI) associated with one or more UL TCI states (e.g., one or more activated UL TCI states) and/or one or more UL beams (for different TRPs, for example).

The UE may determine whether to report one PH for a cell or to report two PHs for the cell based on a configuration (e.g., a network configuration, such as a configuration that is provided to the UE by a network). For example, the configuration may comprise one or more pathloss reference signals for the cell. Whether the UE reports one PH for the cell or reports two PHs for the cell may be based on a number of pathloss reference signals of the one or more pathloss reference signals. In an example, if the number of pathloss reference signals is larger than (or equal to) a threshold, the UE may report and/or indicate two PHs for the cell (e.g., the UE may report and/or indicate two PHs for the cell based on a determination that the number of pathloss reference signals is larger than or equal to the threshold). Alternatively and/or additionally, if the number of pathloss reference signals is smaller than the threshold, the UE may report and/or indicate one PH for the cell (e.g., the UE may report and/or indicate one PH for the cell based on a determination that the number of pathloss reference signals is smaller than the threshold). Alternatively and/or additionally, the configuration may comprise a parameter (e.g., a cell-specific parameter associated with the cell) indicative of a number of PH reports (for the cell, for example) that the UE indicates in a multi-TRP PHR MAC CE. In an example, if the number of PH reports is two, the UE may report and/or indicate two PHs for the cell (e.g., the UE may report and/or indicate two PHs for the cell based on the number of PH reports being two). Alternatively and/or additionally, if the number of PH reports is one, the UE may report and/or indicate one PH for the cell (e.g., the UE may report and/or indicate one PH for the cell based on the number of PH reports being one).

In one embodiment, a multi-TRP PHR MAC CE may be indicative of (e.g., may comprise) one PH level (e.g., only one PH level) for each cell of one or more cells. For example, for each cell of the one or more cells, the multi-TRP PHR MAC CE may be indicative of (e.g., may comprise) only one PH level. A UE may generate the multi-TRP PHR MAC CE in response to a triggered PHR (e.g., a triggered PHR that is not cancelled) associated with a TRP of a cell of the one or more cells (and/or in response to another event and/or entity in addition to the triggered PHR associated with the TRP of the cell). The UE may communicate with the one or more cells (e.g., perform UL transmissions and/or DL transmissions). For example, the UE may communicate with a cell of the one or more cells via one or more TRPs (e.g., one TRP or two TRPs). The UE may perform multi-TRP PUSCH transmissions with the one or more cells. A PH level (indicated by the multi-TRP PHR MAC CE, for example) associated with a cell of the one or more cells may indicate a measured value (e.g., Type 1 PH or Type 3 PH) for a TRP of the cell.

In an example, the UE communicates with a first cell via two TRPs comprising a first TRP and a second TRP. The UE determines (e.g., derives) a first PH level (associated with a first Type 1 PH report or a first Type 3 PH report, for example) for the first TRP and a second PH level (associated with a second Type 1 PH report or a second Type 3 PH report, for example) for the second TRP (e.g., the UE may determine the first PH level and/or the second PH level in response to a triggered PHR). In some examples, when generating the multi-TRP PHR MAC CE, the UE indicates the first PH level for the first TRP of the first cell and does not indicate the second PH level for the second TRP of the first cell. For example, the UE may generate the multi-TRP PHR MAC CE such that the multi-TRP PHR MAC CE indicates the first PH level for the first TRP of the first cell and does not indicate the second PH level for the second TRP of the first cell.

Alternatively and/or additionally, the UE may compute a first PH report (e.g., the UE may only compute the first PH report) and may not compute a second PH report. Alternatively and/or additionally, the UE may determine (e.g., derive) and indicate the first PH level (e.g., the UE may only determine and indicate the first PH level). For example, the UE may determine (e.g., derive) the first PH level for the first TRP (e.g., the UE may only determine the first PH level) and may not determine (e.g., derive) the second PH level (in response to a triggered PHR, for example). The UE may generate the multi-TRP PHR MAC CE such that the multi-TRP PHR MAC CE indicates the first PH level for the first TRP of the first cell (without indicating a PH level for the second TRP of the first cell).

In an example, the UE communicates with a first cell via two TRPs comprising a first TRP and a second TRP. The UE determines (e.g., derives) a first PH level (associated with a first Type 1 PH report or a first Type 3 PH report, for example) for the first TRP and a second PH level (associated with a second Type 1 PH report or a second Type 3 PH report, for example) for the second TRP (e.g., the UE may determine the first PH level and/or the second PH level in response to a triggered PHR). The UE may select a PH level from among the first PH level and the second PH level. For example, the selected PH level (e.g., the first PH level or the second PH level) may be selected for inclusion in the multi-TRP PHR MAC CE. In an example, when generating the multi-TRP PHR MAC CE, the UE indicates the selected PH level and does not indicate the other PH level (e.g., in an example in which the selected PH level is the first PH level, the UE indicates the first PH level and does not indicate the second PH level). For example, the UE may generate the multi-TRP PHR MAC CE such that the multi-TRP PHR MAC CE indicates the selected PH level and does not indicate the other PH level (e.g., in an example in which the selected PH level is the first PH level, the multi-TRP PHR MAC CE indicates the first PH level and does not indicate the second PH level).

In some examples, the UE may select the selected PH level (for inclusion in the multi-TRP PHR MAC CE, for example) based on a first value of the first PH level and a second value of the second PH level. For example, the UE may select the selected PH level based upon a determination that a value of the selected PH level is higher than a value of the other PH level. In an example, the UE may include and/or indicate the first PH level (in the multi-TRP PHR MAC CE, for example) based on the first value of the first PH level being higher than the second value of the second PH level (e.g., the selected PH level may be the first PH level if the first PH level is higher than the second PH level). Alternatively and/or additionally, the UE may select the selected PH level based upon a determination that a value of the selected PH level is lower than a value of the other PH level. In an example, the UE may include and/or indicate the first PH level (in the multi-TRP PHR MAC CE, for example) based on the first value of the first PH level being lower than the second value of the second PH level (e.g., the selected PH level may be the first PH level if the first PH level is lower than the second PH level).

In some examples, the UE may select the selected PH level (for inclusion in the multi-TRP PHR MAC CE, for example) based on a first value of a first PH report (e.g., a PH report associated with the first PH level, such as the first Type 1 PH report or the first Type 3 PH report) and a second value of the second PH report (e.g., a PH report associated with the second PH level, such as the second Type 1 PH report or the second Type 3 PH report). For example, the UE may select the selected PH level based upon a determination that a value of a PH report associated with the selected PH level is higher than a value of a PH report associated with the other PH level. In an example, the UE may include and/or indicate the first PH level (in the multi-TRP PHR MAC CE, for example) based on the first value of the first PH report being higher than the second value of the second PH report (e.g., the selected PH level may be the first PH level if the first value is higher than the second value). Alternatively and/or additionally, the UE may select the selected PH level based upon a determination that a value of a PH report associated with the selected PH level is lower than a value of a PH report associated with the other PH level. In an example, the UE may include and/or indicate the first PH level (in the multi-TRP PHR MAC CE, for example) based on the first value of the first PH report being lower than the second value of the second PH report (e.g., the selected PH level may be the first PH level if the first value is lower than the second value).

In some examples, the UE may determine whether to compute a PH (e.g., a PH report) for a TRP based on a real PUSCH transmission or to compute the PH based on a reference PUSCH transmission based on whether or not the UE has received a DCI and/or a UL grant on the TRP (e.g., based on whether or not the UE has received a DCI and/or a UL grant on the TRP after the UE triggered a PHR). In an example, the UE may compute the PH for the TRP based on a real PUSCH transmission if the UE has received a DCI and/or a UL grant on the TRP (e.g., if the UE has received a DCI and/or a UL grant on the TRP after the UE triggered the PHR). The UE may compute the PH for the TRP based on a reference PUSCH transmission if the UE has not received a DCI or UL grant on the TRP (e.g., if the UE has not received a DCI or UL grant on the TRP after the UE triggered the PHR).

Alternatively and/or additionally, the UE may determine whether to compute a PH (e.g., a PH report) for a TRP based on a real PUSCH transmission or to compute the PH based on a reference PUSCH transmission based on whether or not the UE has received a DCI and/or a UL grant on a panel associated with the TRP (e.g., based on whether or not the UE has received a DCI and/or a UL grant on the panel after the UE triggered a PHR). In an example, the UE may compute the PH for the TRP based on a real PUSCH transmission if the UE has received a DCI and/or a UL grant on the panel associated with the TRP (e.g., if the UE has received a DCI and/or a UL grant on the panel after the UE triggered the PHR). The UE may compute the PH for the TRP based on a reference PUSCH transmission if the UE has not received a DCI or UL grant on the panel associated with the TRP (e.g., if the UE has not received a DCI or UL grant on the panel after the UE triggered the PHR).

In some examples, the UE may select the selected PH level (for inclusion in the multi-TRP PHR MAC CE, for example) based on a first type of PUSCH transmission used to compute the first PH report (associated with the first PH level) and/or a second type of PUSCH transmission used to compute the second PH report (associated with the second PH level). For example, the UE may select the selected PH level based upon a determination that a type of PUSCH transmission used to compute a PH report associated with the selected PH level is a real PUSCH transmission (and/or is not a reference PUSCH transmission). In an example, the UE may include and/or indicate the first PH level (in the multi-TRP PHR MAC CE, for example) based on the first type of PUSCH transmission being a real PUSCH transmission (and/or not being a reference PUSCH transmission) (e.g., the selected PH level may be the first PH level if the first PH report associated with the first PH level is computed using a real PUSCH transmission). Alternatively and/or additionally, the UE may not include and/or indicate a PH level (in the multi-TRP PHR MAC CE, for example) based on a determination that the PH level is associated with a PH report that is computed using a reference PUSCH transmission (and/or computed using a type of PUSCH transmission that is not a real PUSCH transmission) (e.g., the selected PH level may not be the first PH level if the first PH report associated with the first PH level is computed using a reference PUSCH transmission). A PH report that is computed using a reference PUSCH transmission may be a virtual PH.

In an example, the UE may compute the first PH report of the first TRP of the first cell based on a real PUSCH transmission on the first TRP. The UE may compute the second PH report of the second TRP of the first cell based on a reference PUSCH transmission. The UE may include and/or indicate the first PH level associated with the first PH report (e.g., the first PH level may be a first PH report level that is indicative of the first PH report) in the multi-TRP PHR MAC CE and may not include and/or indicate the second PH report in the multi-TRP PHR MAC CE (based on a determination that the first PH report is computed based on the real PUSCH transmission and the second PH report is computed based on the reference PUSCH transmission, for example). In another example, the first PH report may be a first Type 3 PH report of the first TRP of the first cell and the second PH report may be a second Type 1 PH report of the second TRP of the first cell. The UE may compute the first Type 3 PH report of the first TRP based on a real SRS transmission on the first TRP. The UE may compute the second Type 1 PH report of the second TRP based on a reference PUSCH transmission. The UE may include and/or indicate a first Type 3 PH report level (that indicates the first Type 3 PH report) in the multi-TRP PHR MAC CE and the UE may not include and/or indicate the second Type 1 PH report in the multi-TRP PHR MAC CE.

In some examples, the UE may select the selected PH level (for inclusion in the multi-TRP PHR MAC CE, for example) based on a first timing of a first transmission associated with the first PH level and a second timing of a second transmission associated with the second PH level. In some examples, the first PH level may be based on the first transmission (e.g., the first PH level and/or the first PH report associated with the first PH level may be computed based on the first transmission). In some examples, the second PH level may be based on the second transmission (e.g., the second PH level and/or the second PH report associated with the second PH level may be computed based on the second transmission). In an example, the first transmission may be a first real transmission (e.g., a first real PUSCH transmission) and/or the second transmission may be a second real transmission (e.g., a second real PUSCH transmission). In some examples, the UE may use the first timing of the first transmission and the second timing of the second transmission to select the selected PH level (for inclusion in the multi-TRP PHR MAC CE, for example) if both the first transmission and the second transmission are real transmissions (and/or are not reference transmissions). The term "timing" as used herein may correspond to at least one of a time, a time unit, a slot, a mini-slot, a symbol (e.g., an OFDM symbol), etc.

For example, the UE may select the selected PH level based on a determination that a timing of a transmission associated with the selected PH level is earlier than a timing of a transmission associated with the other PH level. In an example, the UE may include and/or indicate the first PH level (in the multi-TRP PHR MAC CE, for example) based on the first timing of the first transmission being earlier than the second timing of the second transmission in time domain (e.g., the selected PH level may be the first PH level if the first transmission is performed earlier than the second transmission).

Alternatively and/or additionally, the UE may include a PH level for the first cell in the multi-TRP PHR MAC CE, wherein the PH level is based on (e.g., indicates an average of) measured PH reports associated with the first TRP (e.g., TRP1) and the second TRP (e.g., TRP2). For example, the PH level included and/or indicated in the multi-TRP PHR MAC CE may be an average of the first PH report associated with the first TRP and the second PH report associated with the second TRP.

In some examples, the PHR MAC CE (e.g., the multi-TRP PHR MAC CE) may indicate and/or comprise multiple PH levels for a cell (e.g., for each cell, such as for each cell of one or more cells with which the UE communicates). Each PH level of the multiple PH levels may be associated with a measured PH report associated with a TRP of a cell. The multi-TRP PHR MAC CE may indicate a PH (e.g., one PH) for each TRP of a cell (e.g., one cell). For example, the multi-TRP PHR MAC CE may indicate a PH (e.g., one PH) for all TRPs of the cell (e.g., the multi-TRP PHR MAC CE may indicate a PH, such as one PH for each TRP of all TRPs of the cell). The multiple PH levels may comprise a Type 1 PH (e.g., a Type 1 PH report) based on a real PUSCH transmission (associated with a first TRP of the cell, for example) and a Type 1 PH (e.g., a Type 1 PH report) based on a reference PUSCH transmission (associated with a second TRP of the cell, for example). Whether to determine (e.g., calculate) the multiple PH levels for the cell based on the real PUSCH transmission or to determine (e.g., calculate) the multiple PH levels for the cell based on the reference PUSCH transmission may be based on a received UL grant indicating one or more PUSCH transmissions on the cell (such as based on one or more timings, such as one or more slots, of the one or more PUSCH transmissions). The multiple PH levels may comprise a Type 3 PH (e.g., a Type 3 PH report) based on a real SRS transmission (associated with a first TRP of the cell, for example) and a Type 3 PH (e.g., a Type 3 PH report) based on a reference SRS transmission (associated with a second TRP of the cell, for example).

For example, the UE may communicate with the cell via a first TRP and a second TRP. The UE may include two PH levels in a multi-TRP PHR MAC CE for the cell. Each PH level of the two PH levels indicates a measured PH report for the first TRP and the second TRP, respectively.

Figure 8:
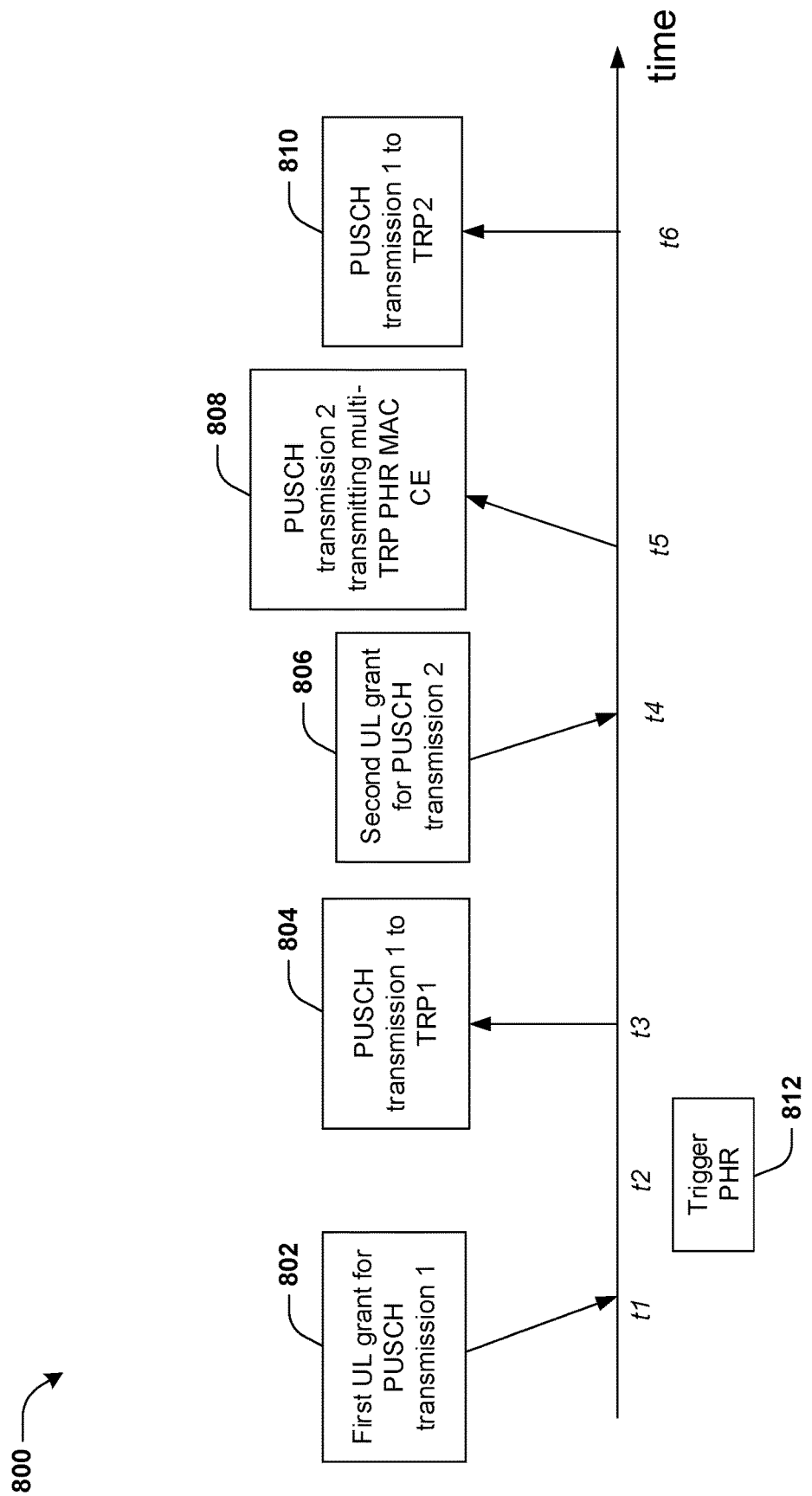
FIG. 8 is a diagram illustrating an exemplary scenario associated with power headroom reporting according to one exemplary embodiment.

An example scenario 800 associated with PHR is shown in FIG. 8. A UE performs communication (e.g., communication comprising UL transmission and/or DL transmission) with a cell via multiple TRPs (e.g., two TRPs) comprising TRP1 and TRP2. At timing t1, the UE receives a first UL grant 802, from a network (e.g., gNB), indicating a first PUSCH transmission 804 comprising PUSCH transmission 1 to TRP1 at timing t3 and a second PUSCH transmission 810 comprising PUSCH transmission 1 to TRP2 at timing t6 (e.g., the first UL grant 802 may schedule the first PUSCH transmission 804 at the timing t3 and the second PUSCH transmission 810 at the timing t6). For example, the first UL grant 802 indicates multi-TRP PUSCH transmissions. The first PUSCH transmission 804 and the second PUSCH transmission 810 may not be performed in a same slot (e.g., the timing t3 and the timing t6 may be different slots and/or may be within different slots). The first PUSCH transmission 804 and the second PUSCH transmission 810 may be used to transmit the same transport block (TB) and/or the same data to different TRPs (e.g., TRP1 and TRP2). At timing t2, the UE triggers 812 a PHR (e.g., a PHR of the cell and/or one or more other serving cells of the UE). At timing t4, the UE receives a second UL grant 806 for a third PUSCH transmission 808 comprising PUSCH transmission 2 at timing t5, wherein the second UL grant 806 indicates a UL resource that may accommodate (e.g., be used for) a MAC CE for PHR (as a result of Logical Channel Prioritization (LCP), for example).

In some examples, the UE may determine to compute a Type 1 PH report for TRP1 based on a real PUSCH transmission (e.g., the first PUSCH transmission 804 comprising PUSCH transmission 1 to TRP1 at the timing t3). In an example, the determination to compute the Type 1 PH report for TRP1 based on the real PUSCH transmission (e.g., the first PUSCH transmission 804) may be in response to triggering 812 the PHR. According to Section 7.7.1 in 3GPP TS 38.213, V16.2.0, a Type 1 PH report for a cell may be determined (e.g., calculated) based on an actual PUSCH transmission (e.g., the real PUSCH transmission, such as the first PUSCH transmission 804) when (and/or if) a slot to provide the Type 1 PH report overlaps with (e.g., fully overlaps with) a slot to perform a PUSCH transmission (e.g., the real PUSCH transmission, such as the first PUSCH transmission 804) on the cell. For example, the third PUSCH transmission 808 (e.g., PUSCH transmission 2) may be performed in the same slot as the first PUSCH transmission 804 (e.g., PUSCH transmission 1 to TRP1).

In some examples, the UE may determine to compute a Type 1 PH report for TRP2 based on a reference PUSCH transmission. For example, the UE may use the reference PUSCH transmission (rather than a real PUSCH transmission, for example) to compute the Type 1 PH report for TRP2 based on (e.g., due to) a timing of transmitting the second PUSCH transmission 810 comprising PUSCH transmission 1 to TRP2. In an example, the UE may use the reference PUSCH transmission to compute the Type 1 PH report for TRP2 based on (e.g., due to) the second PUSCH transmission 810 (comprising a real PUSCH transmission corresponding to PUSCH transmission 1 to TRP2, for example) occurring at the timing t6, which is not before the timing t4 (at which the second UL grant 806 is received). For example, the UE may use the reference PUSCH transmission to compute the Type 1 PH report for TRP2 based on (e.g., due to) the second PUSCH transmission 810 (comprising the real PUSCH transmission, for example) not being transmitted before the timing t4 (at which the second UL grant 806 is received). A slot to perform the second PUSCH transmission 810 (e.g., PUSCH transmission 1 to TRP2) may be after a slot to provide the Type 1 PH report for TRP2 (e.g., a slot corresponding to the timing t6 associated the second PUSCH transmission 810 is after a slot corresponding to the timing t5 associated with the third PUSCH transmission 808). Accordingly, the third PUSCH transmission 808 (e.g., PUSCH transmission 2) may not be performed in a same slot as the second PUSCH transmission 810 (e.g., PUSCH transmission 1 to TRP2).

Alternatively, in some examples, the UE may not compute a Type 1 PH report for TRP2. For example, the UE may not compute a Type 1 PH report for TRP2 based on a determination that a real transmission (e.g., the first PUSCH transmission 804 comprising PUSCH transmission 1 to TRP1 at the timing t3) has occurred for TRP1 and/or that a real PH (e.g., Type 1 PH report based on the real transmission associated with TRP1) has been computed for TRP1.

Alternatively, in some examples, in the example scenario 800, the UE may determine to compute a PH report for TRP2 based on a real PUSCH transmission (e.g., the UE may determine to compute a real PH). In an example, the UE may determine to compute the PH report (e.g., the real PH) based on the real PUSCH transmission in response to triggering 812 the PHR. The UE may determine to compute a real PH report (e.g., a PH report for TRP2 that is based on a real PUSCH transmission) for TRP2 based on the first UL grant 802 indicating the second PUSCH transmission 810 (e.g., PUSCH transmission 1 for TRP2). For example, the UE may determine to compute a real PH report for TRP2 based on the UE having received the first UL grant 802 and the first UL grant 802 being indicative of the second PUSCH transmission 810.

Alternatively and/or additionally, the UE may determine to compute a real PH report for TRP2 based on the first UL grant 802 being received (by the UE) on TRP2 (e.g., the first UL grant 802 is transmitted via a reference signal associated with TRP2).

In some examples, such as where the UE determines to compute a real PH report for TRP2, for computing the real PH report for TRP2, the UE may consider the first PUSCH transmission 804 (e.g., PUSCH transmission 1 to TRP1) to be a real transmission for determining (e.g., deriving) the PH for TRP2. For example, the UE may compute the real PH report for TRP2 based on the first PUSCH transmission 804 (e.g., PUSCH transmission 1 to TRP1).

At the timing t5, the UE may perform the third PUSCH transmission 808 (e.g., PUSCH transmission 2). For example, the UE may transmit the third PUSCH transmission 808 to the cell and/or to one or more other serving cells of the UE. The third PUSCH transmission 808 comprises transmitting a multi-TRP PHR MAC CE. The multi-TRP PHR MAC CE may comprise a first PH level, of the cell, that indicates a PH report (e.g., a measured PH value) of TRP1. The multi-TRP PHR MAC CE may comprise a second PH level, of the cell, that indicates a PH report of TRP2 (such as in an example in which the UE determines to compute the PH report for TRP2 and/or the UE determines to include and/or indicate the PH report in the multi-TRP PHR MAC CE). Alternatively, in some examples, the multi-TRP PHR MAC CE may not comprise a PH level of the cell that indicates a PH report of TRP2.

Figure 9:
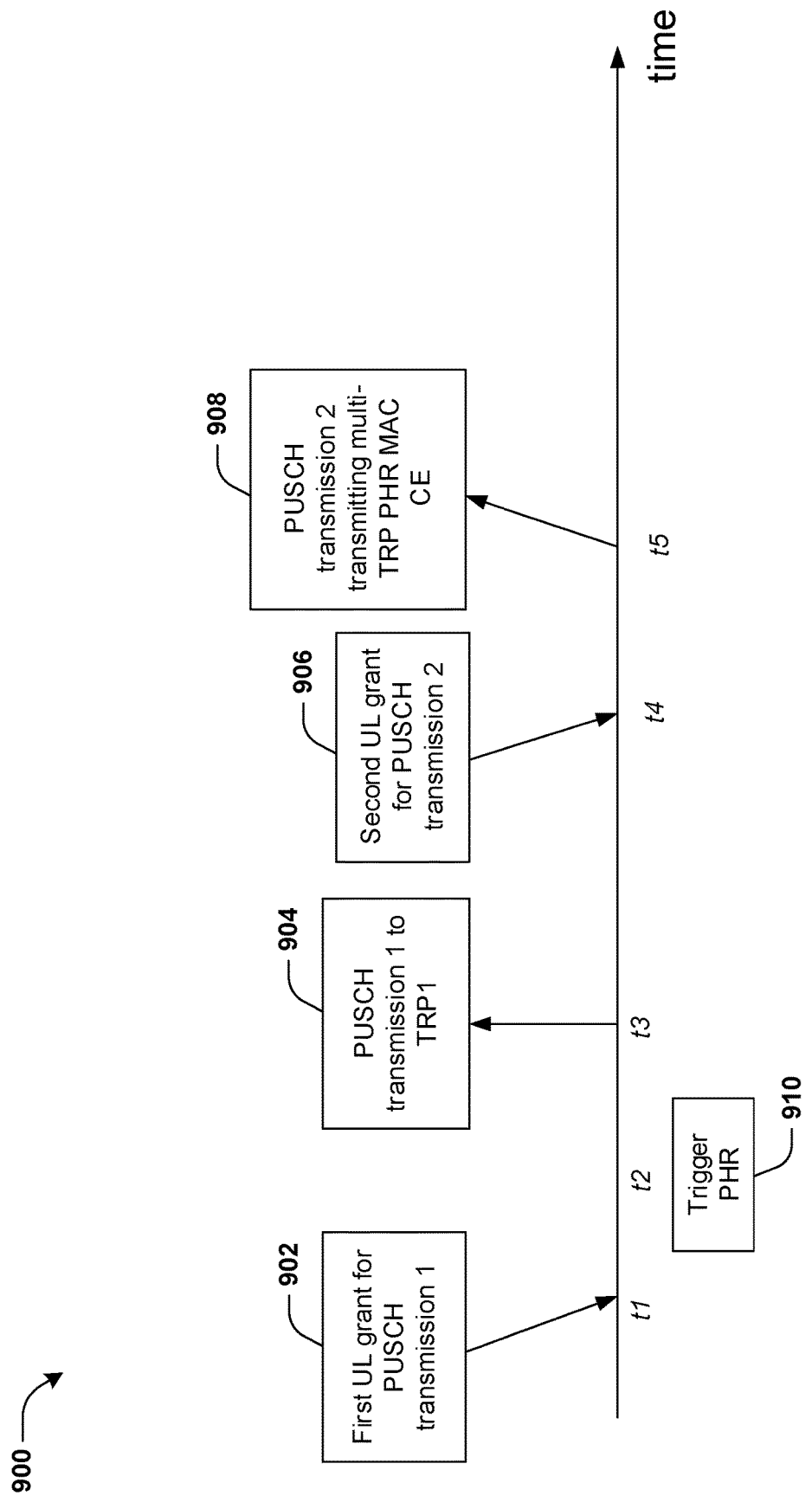
FIG. 9 is a diagram illustrating an exemplary scenario associated with power headroom reporting according to one exemplary embodiment.

An example scenario 900 associated with PHR is shown in FIG. 9. A UE performs communication (e.g., communication comprising UL transmission and/or DL transmission) with a cell via multiple TRPs (e.g., two TRPs) comprising TRP1 and TRP2. At timing t1, the UE receives a first UL grant 902, from a network (e.g., gNB), indicating a first PUSCH transmission 904 comprising PUSCH transmission 1 to TRP1 at timing t3 (e.g., the first UL grant 902 may schedule the first PUSCH transmission 904 at the timing t3). The first UL grant 902 does not indicate a PUSCH transmission to TRP2 (e.g., the first UL grant 902 does not schedule a PUSCH transmission to TRP2). For example, the first UL grant 902 indicates single-TRP PUSCH transmission. At timing t2, the UE triggers 910 a PHR (e.g., a PHR of the cell and/or one or more other serving cells of the UE). At timing t4, the UE receives a second UL grant 906 for a second PUSCH transmission 908 comprising PUSCH transmission 2 at timing t5, wherein the second UL grant 906 indicates a UL resource that may accommodate (e.g., be used for) a MAC CE for PHR (as a result of LCP, for example).

In some examples, the UE may determine to compute a Type 1 PH report for TRP1 based on a real PUSCH transmission (e.g., the first PUSCH transmission 904 comprising PUSCH transmission 1 to TRP1 at the timing t3). In an example, the determination to compute the Type 1 PH report for TRP1 based on the real PUSCH transmission (e.g., the first PUSCH transmission 804) may be in response to triggering 910 the PHR. According to Section 7.7.1 in 3GPP TS 38.213, V16.2.0, a Type 1 PH report for a cell may be determined (e.g., calculated) based on an actual PUSCH transmission (e.g., the real PUSCH transmission, such as the first PUSCH transmission 902) when (and/or if) a slot to provide the Type 1 PH report overlaps with (e.g., fully overlaps with) a slot to perform a PUSCH transmission (e.g., the real PUSCH transmission, such as the first PUSCH transmission 904) on the cell. For example, the second PUSCH transmission 908 (e.g., PUSCH transmission 2) may be performed in the same slot as the first PUSCH transmission 904 (e.g., PUSCH transmission 1 to TRP1).

In some examples, the UE may determine to compute a Type 1 PH report for TRP2 based on a reference PUSCH transmission. For example, the UE may use the reference PUSCH transmission (rather than a real PUSCH transmission, for example) to compute the Type 1 PH report for TRP2 based on (e.g., due to) to there being no transmission (e.g., no PUSCH transmission) on TRP2 between the timing t2 (at which the PHR is triggered 910) and the timing t4 (at which the second UL grant 906 is received). Alternatively, in some examples, the UE may not compute a Type 1 PH report for TRP2. For example, the UE may not compute a Type 1 PH report for TRP2 based on (e.g., due to) to there being no transmission (e.g., no PUSCH transmission) on TRP2 between the timing t2 (at which the PHR is triggered 910) and the timing t4 (at which the second UL grant 906 is received).

At the timing t5, the UE may perform the second PUSCH transmission 908 (e.g., PUSCH transmission 2). For example, the UE may transmit the second PUSCH transmission 908 to the cell and/or to one or more other serving cells of the UE. The second PUSCH transmission 908 comprises transmitting a multi-TRP PHR MAC CE. The multi-TRP PHR MAC CE may comprise a first PH level, of the cell, that indicates a PH report (e.g., a measured PH value) of TRP1. The multi-TRP PHR MAC CE may comprise a second PH level, of the cell, that indicates a PH report of TRP2 (such as in an example in which the UE determines to compute the PH report for TRP2 and/or determines to include and/or indicate the PH report in the multi-TRP PHR MAC CE). Alternatively, in some examples, the multi-TRP PHR MAC CE may not comprise a PH level of the cell that indicates a PH report of TRP2.

Figure 10:
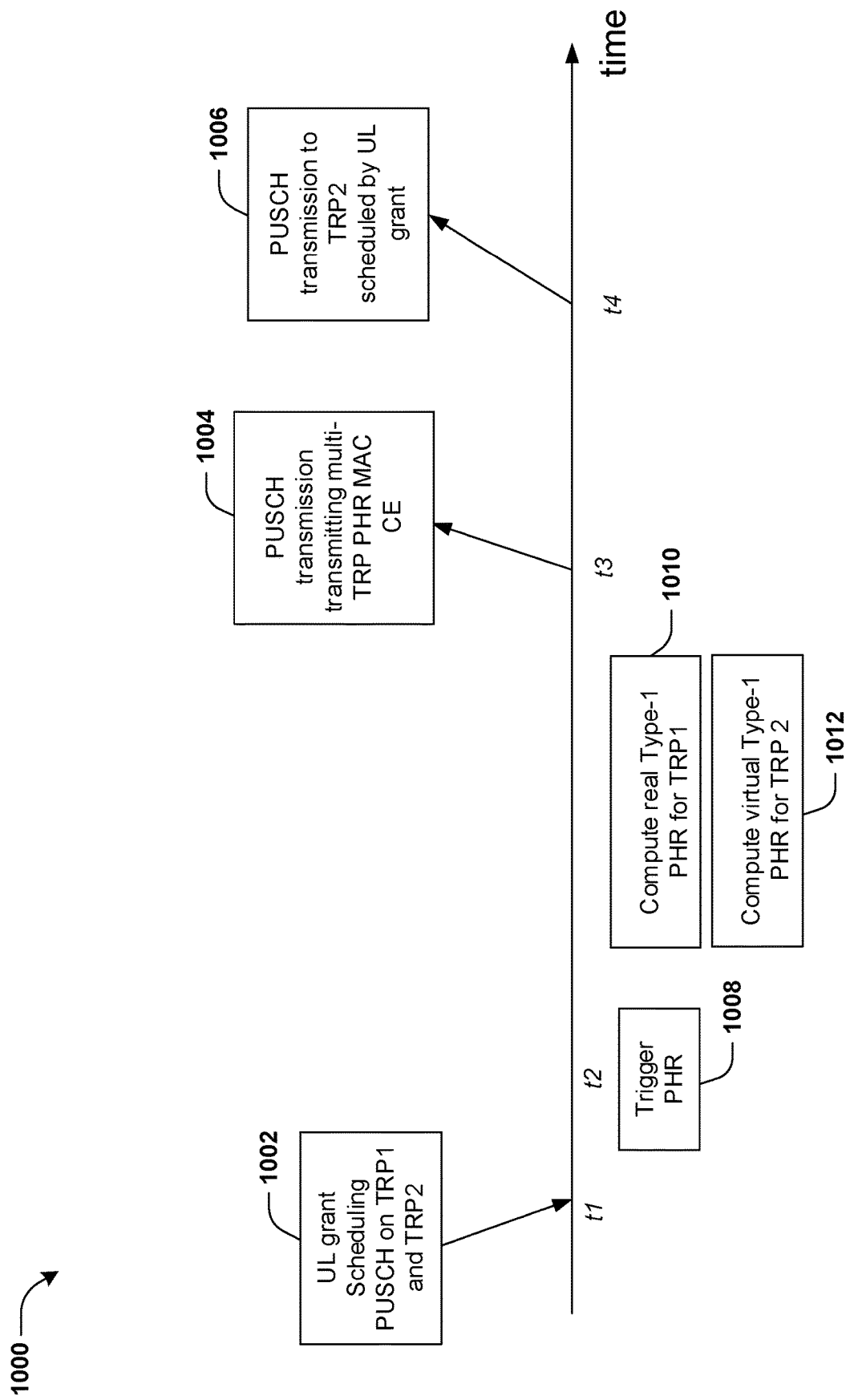
FIG. 10 is a diagram illustrating an exemplary scenario associated with power headroom reporting according to one exemplary embodiment.

An example scenario 1000 associated with PHR is shown in FIG. 10. A UE may perform multi-TRP operation on TRP1 and TRP2 on a cell. At timing t1, the UE may receive, from a network, a UL grant 1002 scheduling a first PUSCH transmission on TRP1 and a second PUSCH transmission 1006 on TRP2. The second PUSCH transmission 1006 may be performed at timing t4 (e.g., the UL grant 1002 may indicate that the second PUSCH transmission 1006 is to be performed at the timing t4). At timing t2, the UE may trigger 1008 a PHR. The UE may compute 1010 a first Type 1 PH for TRP1 based on a real transmission and compute 1012 a second Type 1 PH for TRP2 based on a reference transmission (e.g., the UE may compute 1012 the second Type 1 PH for TRP2 based on the reference transmission in a scenario in which the second PUSCH transmission 1006 is performed later than transmission of a PHR MAC CE). In an example, the UE may compute 1010 the first Type 1 PH for TRP1 and/or compute 1012 the second Type 1 PH for TRP2 when generating the PHR MAC CE. The UE transmits the PHR MAC CE via a third PUSCH transmission 1004 at timing t3. The second PUSCH transmission 1006 may be performed later than the third PUSCH transmission 1004 (comprising transmission of the PHR MAC CE). In some examples, the second PUSCH transmission 1006 may not be performed in a same slot as the third PUSCH transmission 1004 (comprising the transmission of the PHR MAC CE).

Figure 11:
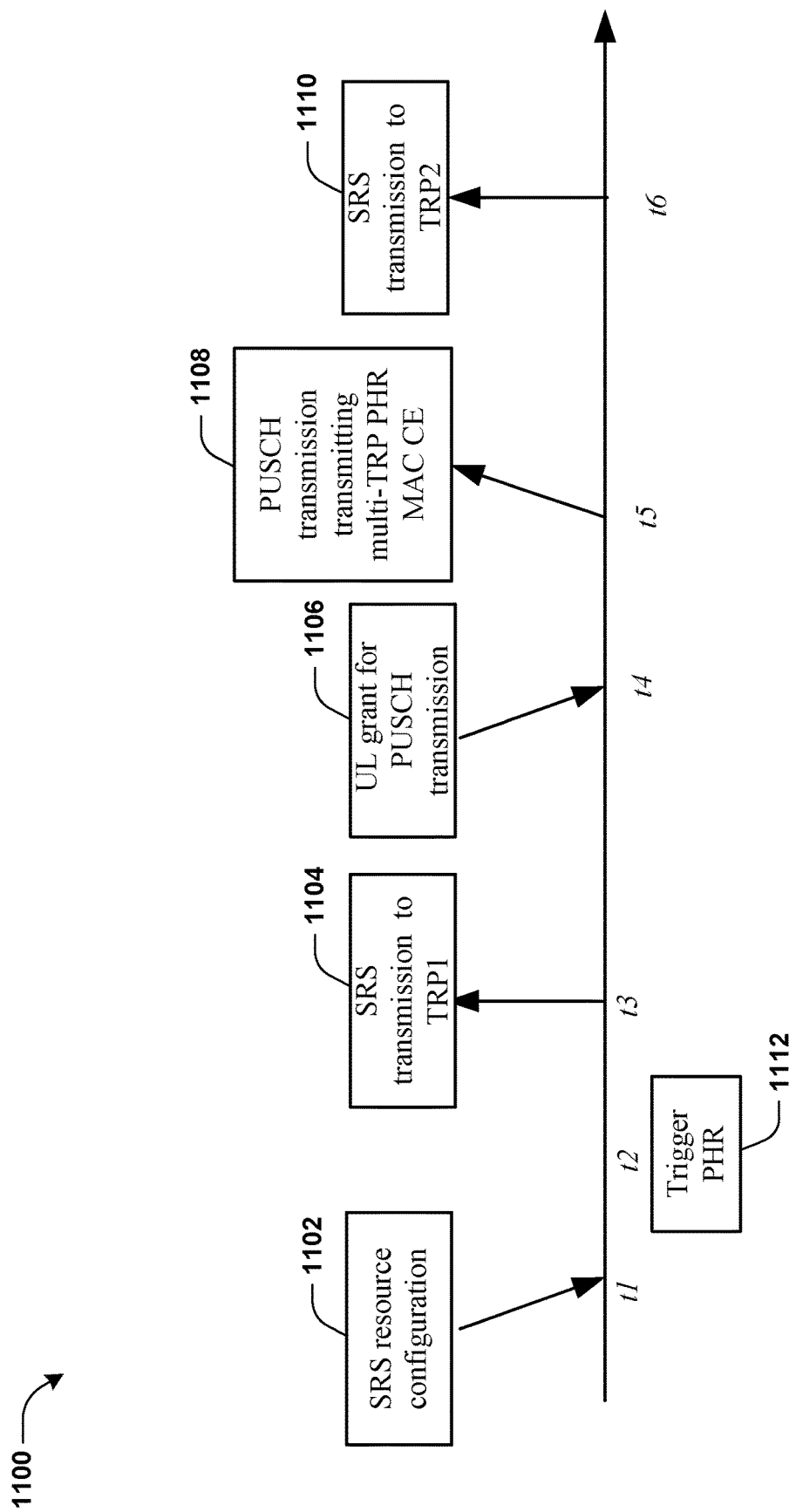
FIG. 11 is a diagram illustrating an exemplary scenario associated with power headroom reporting according to one exemplary embodiment.

An example scenario 1100 associated with PHR is shown in FIG. 11. A UE may perform multi-TRP operation on TRP1 and TRP2 on a cell. At timing t1, the UE may receive one or more SRS resource configurations 1102 (e.g., SRS-config), from a network (e.g., gNB), indicating one or more SRS resources comprising a first SRS transmission 1104 to TRP1 at timing t3 and a second SRS transmission 1110 to TRP2 at timing t6 (e.g., the one or more SRS resources may be used for performing the first SRS transmission 1104 and the second SRS transmission 1110). In an example, the first SRS transmission 1104 comprises SRS transmission 1 to TRP1 and the second SRS transmission 1110 comprises SRS transmission 1 to TRP2. In an example, the first SRS transmission 1104 and the second SRS transmission 1110 may be used to transmit the same SRS and/or the same data to different TRPs (e.g., TRP1 and TRP2). At timing t2, the UE may trigger 1112 a PHR (e.g., a PHR of the cell and/or one or more other serving cells of the UE). At timing t4, the UE may receive an UL grant 1106 for a PUSCH transmission at timing t5 (e.g., PUSCH transmission on the cell or one or more other cells), wherein the UL grant 1106 may indicate a UL resource that may accommodate (e.g., be used for) a MAC CE for PHR (as a result of LCP, for example).

In some examples, the UE may determine to compute a Type 3 PH report for TRP1 based on a real SRS transmission (e.g., the first SRS transmission 1104 comprising SRS transmission 1 to TRP1 at the timing t3). In some examples, the UE may determine to compute a Type 3 PH report for TRP2 based on a reference SRS transmission. For example, the UE may use the reference SRS transmission (rather than a real SRS transmission, for example) to compute the Type 3 PH report for TRP2 based on (e.g., due to) a timing of transmitting the second SRS transmission 1110 comprising SRS transmission 1 to TRP2. In an example, the UE may use the reference SRS transmission to compute the Type 3 PH report for TRP2 based on (e.g., due to) the second SRS transmission 1110 (comprising a real SRS transmission corresponding to SRS transmission 1 to TRP2, for example) occurring at the timing t6, which is not before the timing t4 (at which the UL grant 1106 is received). A slot to perform the second SRS transmission 1110 (e.g., SRS transmission 1 to TRP2) may be after a slot to provide the Type 3 PH report for TRP2 (e.g., a slot corresponding to the timing t6 associated with the second SRS transmission 1110 is after a slot corresponding to the timing t5 associated with the PUSCH transmission 1108). Accordingly, the second SRS transmission 1110 (e.g., SRS transmission 1 to TRP2) may not be performed in a same slot as the PUSCH transmission 1108.

Alternatively, in some examples, the UE may not compute a Type 3 PH report for TRP2. For example, the UE may not compute a Type 3 PH report for TRP2 based on a determination that a real transmission (e.g., the first SRS transmission 1104 comprising SRS transmission 1 to TRP at the timing t3) has occurred for TRP1 and/or that a real PH (e.g., Type 3 PH report based on the real transmission associated with TRP1) has been computed for TRP1.

At the timing t5, the UE may perform the PUSCH transmission 1108. For example, the UE may transmit the PUSCH transmission 1108 to the cell and/or to one or more other serving cells of the UE. The PUSCH transmission 1108 comprises transmitting a multi-TRP PHR MAC CE. The multi-TRP PHR MAC CE may include a first PH level, of the cell, that indicates a PH report (e.g., a measured PH value) of TRP1. The multi-TRP PHR MAC CE may comprise a second PH level of TRP2 (e.g., a PH level, of the cell, that indicates a PH report of TRP2). For example, the multi-TRP PHR MAC CE may comprise the second PH level of TRP2 in an example in which the UE determines to compute the PH report for TRP2 and/or the UE determines to include and/or indicate the PH report in the multi-TRP PHR MAC CE. Alternatively, in some examples, the multi-TRP PHR MAC CE may not comprise a PH level of the cell that indicates a PH report of TRP2.

Figure 12:
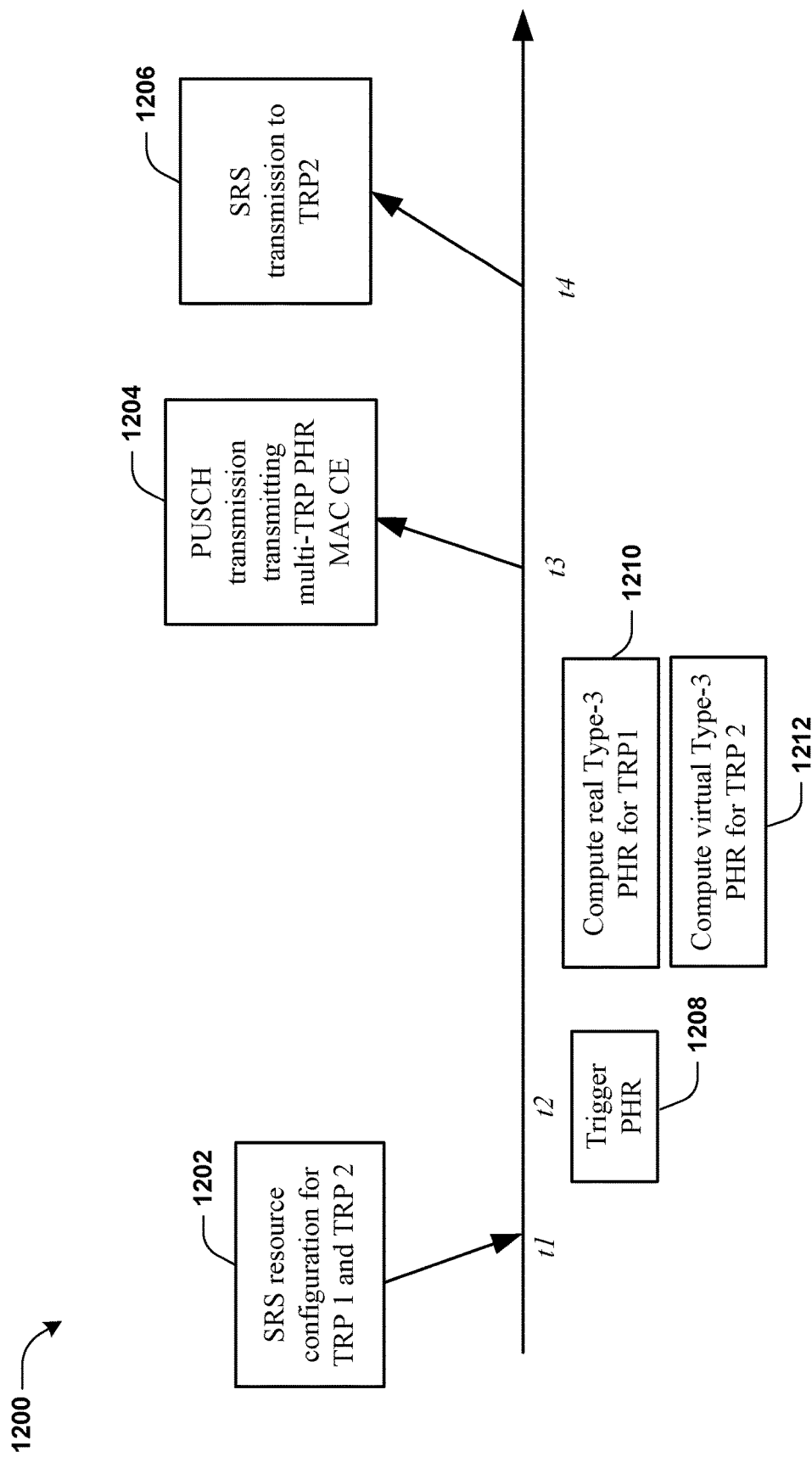
FIG. 12 is a diagram illustrating an exemplary scenario associated with power headroom reporting according to one exemplary embodiment.

An example scenario 1200 associated with PHR is shown in FIG. 12. A UE may perform multi-TRP operation on TRP1 and TRP2 on a Cell. At timing t1, the UE may receive, from a network, a SRS configuration 1202 indicating a first SRS resource associated with a first SRS transmission on TRP1 and a second SRS resource associated with a second SRS transmission 1206 on TRP2. The second SRS transmission 1206 may be performed at timing t4 (e.g., the SRS configuration 1202 may indicate that the second SRS transmission 1206 is to be performed at the timing t4). At timing t2, the UE may trigger 1208 a PHR. The UE may compute 1210 a first Type 3 PH for TRP1 based on a real transmission and compute 1212 a second Type 3 PH for TRP2 based on a reference transmission (e.g., the UE may compute 1212 the second Type 3 PH for TRP2 based on the reference transmission in a scenario in which the second SRS transmission 1206 is performed later than transmission of a PHR MAC CE). In an example, the UE may compute 1210 the first Type 3 PH for TRP1 and/or compute 1212 the second Type 3 PH for TRP2 when generating the PHR MAC CE. The UE transmits the PHR MAC CE via a PUSCH transmission 1204 at timing t3. The second SRS transmission 1206 may be performed later than the PUSCH transmission 1204 (comprising transmission of the PHR MAC CE). In some examples, the second SRS transmission 1206 may not be performed in a same slot as the PUSCH transmission 1204 (comprising transmission of the PHR MAC CE).

In some examples, the UE may determine whether to report one PH level or to report two PH levels for a cell based on whether or not the UE computes multiple PH levels (for two TRPs, for example) based on real transmission (e.g., two real transmissions associated with the two TRPs) for the cell (and/or based on other information in addition to whether or not the UE computes multiple PH levels based on real transmission for the cell). In some examples, the determination of whether to report one PH level or to report two PH levels is performed in response to a triggered PHR. The UE may report two PH levels if the UE computes two PH levels based on real transmissions (such as where the UE computes a first PH level based on a first real transmission on a first TRP and computes a second PH level based on a second real transmission on a second TRP). The UE may report one PH level for the cell if less than two PH levels (e.g., one PH level or no PH level) associated with the cell are computed based on real transmission (such as where one or more PH levels associated with the cell are based on reference transmission).

In some examples, PH may be Type 1 PHR or Type 3 PHR.

The multi-TRP PHR MAC CE may comprise an indicator for each cell of which an associated PH level (e.g., at least one associated PH level) is included in the multi-TRP PHR MAC CE. For example, for each cell of which an associated PH level is included in the multi-TRP PHR MAC CE, the multi-TRP PHR MAC CE may comprise an indicator associated with the cell. The indicator of the cell may indicate whether or not the multi-TRP PHR MAC CE comprises one or more PH levels for the cell. In an example in which the PHR MAC CE (e.g., the multi-TRP PHR MAC CE) is a single-cell PHR MAC CE, the PHR MAC CE may indicate one or more PH levels of a single cell (e.g., only the single cell), such as a Primary Cell (PCell).

In some examples, the UE may perform communication with one or more cells. The UE may perform communication with each cell of the one or more cells via one or more TRPs (e.g., at least one of the UE may perform communication with a first cell of the one or more cells via one or more first TRPs, the UE may perform communication with a second cell of the one or more cells via one or more second TRPs, etc.). The UE may include one PH level (e.g., one Type 1 PH level or one Type 3 PH level), such as a PH field, for a cell that is with one communicating (and/or activated) TRP (e.g., the UE may include and/or indicate the one PH level in a PHR MAC CE). The UE may include one or more PH levels (e.g., one or more Type 1 and/or Type 3 PH levels) for a cell that is with multiple communicating (and/or activated) TRPs (e.g., the UE may include and/or indicate the one or more PH levels in a PHR MAC CE).

An example of a multi-TRP PHR MAC CE is shown in FIG. 13. A UE performs communication (e.g., communication comprising DL transmission and/or UL transmission) with cells comprising a PCell and two Secondary Cells (SCells) associated with SCell index 1 and SCell index 3. In some examples, the cells may comprise one or more other cells (other than the PCell and the two SCells) in addition to the PCell and the two SCells. The UE may perform communication (e.g., UL transmission) with the PCell via a first set of two TRPs (e.g., the UE may perform one or more UL transmissions to the PCell via the first set of two TRPs). The UE may perform communication (e.g., UL transmission) with SCell 1 (e.g., SCell 1 is an SCell, of the two SCells, with SCell index 1) via a second set of two TRPs. The UE may perform communication (e.g., UL transmission) with SCell 3 (e.g., SCell 3 is an SCell, of the two SCells, with SCell index 3) via a single TRP. The UE performs multi-TRP PUSCH with PCell and SCell 1. The UE performs single TRP PUSCH transmission with SCell 3. The multi-TRP PHR MAC CE may comprise an octet (comprising bits C1 to C7) indicating presence of at least one PH field (indicating PH level, for example) for a cell. C1 being set to 1 (as shown in FIG. 13) indicates that a PH for SCell 1 is reported (via the multi-TRP PHR MAC CE, for example). C3 being set to 1 (as shown in FIG. 13) indicates that a PH for SCell 3 is reported (via the multi-TRP PHR MAC CE, for example). C2 being set to 0 (as shown in FIG. 13) indicates that a PH for an SCell with index 2 is not reported (via the multi-TRP PHR MAC CE, for example). The multi-TRP PHR MAC CE comprises a second octet (comprising bits T0 to T7) indicating that the MAC CE (e.g., the multi-TRP PHR MAC CE) comprises one or more PH fields for a cell. T0 being set to 1 (as shown in FIG. 13) indicates that the MAC CE comprises two PH fields for the PCell (e.g., each PH field of the two PH fields may be associated with a TRP of the PCell, such as where each PH field of the two PH fields comprises a PH level associated with a TRP of the PCell). T3 being set to 0 (as shown in FIG. 13) indicates that the MAC CE comprises one PH field for SCell 3 (e.g., the one PH field for SCell 3 may indicate a PH of one TRP for SCell 3). The multi-TRP PHR MAC CE comprises a V field associated with each PH reported for a cell and/or for a TRP. The V field being set to 1 indicates that the associated PH field is determined (e.g., derived and/or calculated) based on a reference PUSCH transmission. Alternatively and/or additionally, the V field being set to 0 indicates that the associated PH field is determined (e.g., derived and/or calculated) based on a real PUSCH transmission. For example, the MAC CE is indicative of two PH levels in two PH fields for the PCell, wherein the two PH fields comprise PH PCell 1 and PH PCell 2, and/or wherein both are determined (e.g., derived and/or calculated) based on real PUSCH transmissions (e.g., PH PCell 1 is determined based on a first real PUSCH transmission and PH PCell 2 is determined based on a second real PUSCH transmission). For PHs determined (e.g., derived and/or calculated) based on real transmissions, the MAC CE comprises a (UE) maximum transmit power (e.g., a nominal (UE) maximum transmit power), wherein the (UE) maximum transmit power may be associated with a TRP and/or a cell associated with a PH. For example, the MAC CE indicates $P_{CMAX,p1}$ and $P_{CMAX,p2}$ for two TRPs of the PCell (e.g., $P_{CMAX, p1}$ may be a first (UE) maximum transmit power indicated for a first TRP of the PCell and/or $P_{CMAX, p2}$ may be a second (UE) maximum transmit power indicated for a second TRP of the PCell). Alternatively, in some examples, the MAC CE may indicate one (UE) maximum transmit power for each reported cell (e.g., in an example in which a cell has two TRPs, the MAC CE may indicate one (UE) maximum transmit power for both TRPs of the cell). For SCell 1, the MAC CE may indicates two PH fields comprising PH SCell 1_1 and PH SCell 1_2. The PH SCell 1_1 is determined (e.g., derived and/or calculated) based on a real PUSCH transmission (as indicated by V=0 in the MAC CE of FIG. 13, for example) while the PH SCell 1_2 is determined (e.g., derived and/or calculated) based on a reference transmission (as indicated by V=1 in the MAC CE of FIG. 13, for example). In some examples, the MAC CE does not comprise a (UE) maximum transmit power for a TRP associated with PH SCell 1_2. The PH fields may be Type 1 and/or Type 3 PHs.

In some examples, if the multi-TRP PHR MAC CE indicates multiple PHs for a cell, an order of the multiple PHs (e.g., an order with which the multiple PHs are reported, such as an order with which the multiple PHs are indicated in the multi-TRP PHR MAC CE) may be based on an order of reported TRPs of the cell. For example, the UE includes PHs (and/or information, comprising V field, P field and/or MPE field associated with PHs) of TRPs based on an ascending or descending order of CORESET pool indexes associated with the TRPs and/or associated with the reported PHs.

Alternatively and/or additionally, the UE may include (in the multi-TRP PHR MAC CE, for example) PHs of TRPs of a cell based on an ascending or descending order of timings of transmissions (e.g., real transmissions) associated with the PHs. In an example in which the UE includes (in the multi-TRP PHR MAC CE, for example) PHs of TRPs of a cell based on an ascending order of timings of transmissions associated with the PHs, the UE may include a first PH for a cell in the multi-TRP PHR MAC CE preceding a second PH of the cell in the multi-TRP PHR MAC CE (e.g., the first PH may be above the second PH in the multi-TRP PHR MAC CE) if a first transmission based on which the first PH is computed is performed before a second transmission based on which the second PH is computed.

In some examples, the UE may include (in the multi-TRP PHR MAC CE, for example) PHs of TRPs based on an ascending or descending order of pathloss reference signal indexes associated with the TRPs. In an example in which the UE includes (in the multi-TRP PHR MAC CE, for example) PHs of TRPs of a cell based on an ascending order of pathloss reference signal indexes associated with the PHs, the UE may include a first PH for a cell in the multi-TRP PHR MAC CE preceding a second PH of the cell in the multi-TRP PHR MAC CE (e.g., the first PH may be above the second PH in the multi-TRP PHR MAC CE) if a first pathloss reference signal index associated with the first PH is lower than a second pathloss reference signal index associated with the second PH.

In some examples, the UE may include (in the multi-TRP PHR MAC CE, for example) PHs of TRPs based on an ascending or descending order of TCI state indexes associated with the TRPs. In an example in which the UE includes (in the multi-TRP PHR MAC CE, for example) PHs of TRPs of a cell based on an ascending order of TCI state indexes associated with the PHs, the UE may include a first PH for a cell in the multi-TRP PHR MAC CE preceding a second PH of the cell in the multi-TRP PHR MAC CE (e.g., the first PH may be above the second PH in the multi-TRP PHR MAC CE) if a first TCI state index associated with the first PH is lower than a second TCI state index associated with the second PH.

In some examples, the MAC CE (e.g., the multi-TRP PHR MAC CE) comprises an indication (e.g., an explicit indication) of which TRP is associated with (e.g., belongs to) a PH.

The multi-TRP PHR MAC CE may indicate TRP information associated with each reported PH level (e.g., each PH level indicated by the multi-TRP PHR MAC CE). For example, the TRP information may indicate a reference signal index associated with a TRP of a cell (e.g., a pathloss reference signal and/or a Sounding Reference Signal (SRS) indicator). For example, the TRP information may indicate a reference signal index associated with the reported PH level. Alternatively and/or additionally, the TRP information may indicate a CORESET pool index. The CORESET pool index may be associated with a TRP of a cell. In an example, for a reported PH level (e.g., for each PH level indicated by the multi-TRP PHR MAC CE), the multi-TRP PHR MAC CE may indicate a TRP associated with the reported PH level by indicating a reference signal index associated with the TRP (e.g., a pathloss reference signal and/or a SRS indicator) and/or a CORESET pool index (associated with the TRP, for example).

In some examples, an indicator may be used to indicate which TRP is reported (for single value PHR, for example).

The multi-TRP PHR MAC CE may indicate one or more TRPs, one or more UL beams and/or one or more PUSCHs for which one or more PH levels are reported (via the multi-TRP PHR MAC CE, for example) for a cell (e.g., the multi-TRP PHR MAC CE may comprise an indicator indicating the one or more TRPs, the one or more UL beams and/or the one or more PUSCHs for which one or more PH levels are reported). For example, the MAC CE (e.g., the multi-TRP PHR MAC CE) may comprise an octet, where each bit of the octet indicates whether a first TRP or a second TRP is reported in the MAC CE (e.g., the bit may be indicative of whether a PH level associated with the first TRP is reported in the multi-TRP PHR MAC CE or a PH level associated with the second TRP is reported in the multi-TRP PHR MAC CE). For example, the bit being set to 0 may indicate that a PH for a first TRP (e.g., TRP1 and/or a TRP associated with CORESET pool index 0) is reported (via the multi-TRP PHR MAC CE, for example). The bit being set to 1 may indicate that a PH for a second TRP (e.g., TRP2 and/or a TRP associated with CORESET pool index 1) is reported (via the multi-TRP PHR MAC CE, for example).

In some examples, for each reported PH level (e.g., each PH level indicated by the multi-TRP PHR MAC CE), the multi-TRP PHR MAC CE may comprise a P field. The P field may indicate whether or not a TRP and/or a cell (e.g., a TRP and/or a cell associated with a PH level associated with the P field) applies a backoff (due to power management, for example). If the UE applies backoff on the TRP and/or the cell (e.g., the reported TRP and/or the reported cell), the multi-TRP PHR MAC CE comprises a MPE field indicating an index associated with one or more backoff values applied (e.g., one or more backoff values with which the backoff is applied).

In some examples, a C field in the MAC CE (e.g., the multi-TRP PHR MAC CE) indicates whether or not a first TRP is reported (e.g., whether or not the MAC CE indicates a PH level associated with the first TRP).

In some examples, a T field (in the multi-TRP PHR MAC CE, for example) indicates whether or not a second TRP is reported (e.g., whether or not the MAC CE indicates a PH level associated with the second TRP).

In some examples, the multi-TRP PHR MAC CE may comprise multiple sets of indicators (e.g., two set of indicators) comprising a first set of indicators and a second set of indicators. Each indicator of the first set of indicators may indicate whether or not a PH level associated with a first TRP of a cell is reported in the MAC CE. Each indicator of the second set of indicators may indicate whether or not a PH level associated with a second TRP of a cell is reported in the MAC CE.

For example, in FIG. 13, the C field (e.g., the C field may comprise the first set of indicators) in the multi-TRP PHR MAC CE may indicate whether or not PH for a first TRP (e.g., a TRP associated with CORESET pool index 0) is reported for one or more cells (e.g., whether or not a PH for a first TRP is included in the multi-TRP PHR MAC CE). For example, the C field may indicate that a PH level associated with a first TRP for cell 1 (e.g., SCell 1) and a PH level associated with a first TRP for cell 3 (e.g., SCell 3) are reported (e.g., C1 being set to 1 may indicate that a PH level associated with the first TRP of cell 1 is included in the multi-TRP PHR MAC CE and C3 being set to 1 may indicate that a PH level associated with the first TRP of cell 3 is included in the multi-TRP PHR MAC CE). A reserved bit "R" (in the C field, for example) may be used to indicate whether or not PH for a first TRP is reported for the PCell. The T field (e.g., the T field may comprise the second set of indicators) in the multi-TRP PHR MAC CE may indicate whether or not PH for a second TRP is reported for one or more cells (e.g., whether or not a PH for a second TRP is included in the multi-TRP PHR MAC CE). For example, the T field may indicate that a PH level associated with a second TRP for cell 1 and a PH level associated with a second TRP for the PCell are reported, wherein a PH level associated with a second TRP for cell 3 is not reported (e.g., T0 being set to 1 may indicate that a PH level associated with the second TRP of the PCell is included in the multi-TRP PHR MAC CE, T1 being set to 1 may indicate that a PH level associated with the second TRP of cell 1 is included in the multi-TRP PHR MAC CE and T3 being set to 0 may indicate that a PH level associated with a second TRP of cell 3 is not included in the multi-TRP PHR MAC CE).

Alternatively and/or additionally, a multi-TRP PHR MAC CE may comprise two PH levels for a PCell. The multi-TRP PHR MAC CE may be a single-cell PHR MAC CE. The single-cell PHR MAC CE may indicate one or more PH levels of a single cell (e.g., only a single cell), such as a PCell. The multi-TRP PHR MAC CE (e.g., the single-cell PHR MAC CE) may indicate one or more PHs for a single cell. The multi-TRP PHR MAC CE (e.g., the single-cell PHR MAC CE) may be a fixed size (e.g., 4 bytes for two TRP PHR or 2 bytes for one TRP PHR).

An example of a multi-TRP PHR MAC CE is shown in FIG. 14. For example, the multi-TRP PHR MAC CE may be a single-cell PHR MAC CE. The multi-TRP PHR MAC CE comprises a first PH level (e.g., PH PCell_1) and a second PH level (e.g., PH PCell_2). In some examples, the first PH level is computed based on a real transmission (e.g., the PH PCell_1 is Type 1 PH or Type 3 PH). The multi-TRP PHR MAC CE may comprise a T field indicating whether or not the MAC CE (e.g., the multi-TRP PHR MAC CE) reports a second PH level for the PCell. For example, T being set to 1 (as shown in FIG. 14) may indicate that the MAC CE indicates the second PH level (e.g., PH PCell_2). The MAC CE indicates a (UE) maximum transmit power (e.g., a single (UE) maximum transmit power) for the PCell (e.g., $P_{CMAX}$).

The (UE) maximum transmit power may be the same (e.g., indicated in a same field) for both TRPs (e.g., the (UE) maximum transmit power may be the same and/or may be indicated in the same field for both a first TRP of the PCell and a second TRP of the PCell). The MAC CE may comprise a V field indicating whether the first PH level and/or the second PH level are computed based on a real transmission (e.g., a real PUSCH transmission or a real SRS transmission) or the first PH level and/or the second PH level are computed based on a reference transmission (e.g., a reference PUSCH transmission or a reference SRS transmission). For example, the V field associated with the second PH being set to 1 may indicate that the second PH is based on a reference transmission. Another example of the multi-TRP PHR MAC CE is shown in FIG. 15, where the MAC CE (e.g., the multi-TRP PHR MAC CE) is a fixed size. The MAC CE comprises a first V field for the first PH and a second V field for the second PH. The first V field may indicate whether the first PH "PH PCell_1" is computed based on a real transmission or the first PH "PH PCell_1" is computed based on a reference transmission. The second V field may indicate whether the second PH "PH PCell_1" is computed based on a real transmission or the second PH "PH PCell_2" is computed based on a reference transmission. For example, the first V field may be set to 1 to indicate that a measured value associated with PH PCell_1 (e.g., the measured value may be indicated by PH PCell_1) is computed based on a reference transmission. An octet (of the MAC CE) indicating (UE) maximum transmit power and/or MPE may be a reserved value if a V field (e.g., the first V field and/or the second V field) is set to 1. The MAC CE may indicate (UE) maximum transmit power and/or MPE if a V field (e.g., the first V field and/or the second V field) is set to 0. Alternatively and/or additionally, the MAC CE may indicate a (UE) maximum transmit power if the V field is set to 1.

In some examples, for each reported PH level (e.g., each PH level indicated by the multi-TRP PHR MAC CE), the multi-TRP PHR MAC CE may comprise a P field. The P field may indicate whether or not a TRP and/or a cell (e.g., a TRP and/or a cell associated with a PH level associated with the P field) applies a backoff (due to power management, for example). If the UE applies backoff on the TRP and/or the cell (e.g., the reported TRP and/or the reported cell), the multi-TRP PHR MAC CE comprises a MPE field indicating an index associated with one or more backoff values applied (e.g., one or more backoff values with which the backoff is applied).

The UE may determine whether or not to use a single-cell PHR MAC CE based on a network configuration. The network configuration may be multiplePHR. The UE may determine to use a single-cell PHR MAC CE based on multiplePHR being set to false (and/or based on other information in addition to multiplePHR being set to false). For example, the UE may determine to use a single-cell PHR MAC CE if multiplePHR is set to false (e.g., the UE may generate a multi-TRP PHR MAC CE that is a single-cell PHR MAC CE if multiplePHR is set to false, wherein the multi-TRP PHR MAC CE may indicate one or more PH levels of a single cell). The UE may determine not to use a single-cell PHR MAC CE based on multiplePHR being set to true. For example, the UE may determine to use a multi-TRP PHR MAC CE that is not a single-cell PHR MAC CE if multiplePHR is set to true (e.g., the UE may generate a multi-TRP PHR MAC CE that is not a single-cell PHR MAC CE if multiplePHR is set to true, wherein the multi-TRP PHR MAC CE may indicate one or more PH levels of multiple cells).

The UE may determine, based on a network configuration, whether to indicate and/or include (in a multi-TRP PHR MAC CE, for example) one PH level or to indicate and/or include (in the multi-TRP PHR MAC CE, for example) two PH levels.

In an example, the UE may use a single-cell PHR MAC CE if the UE is not operating in carrier aggregation. For example, the UE may generate a multi-TRP PHR MAC CE that is a single-cell PHR MAC CE if the UE is not operating in carrier aggregation, wherein the multi-TRP PHR MAC CE may indicate one or more PH levels of a single cell.

In some examples, for a cell with a first TRP and a second TRP, a multi-TRP PHR MAC CE (indicative of one or more PH levels of the cell, for example) may indicate an offset associated with the second TRP. The offset may indicate a difference between a second PH level of the second TRP of the cell and a first PH level of the first TRP of the cell. For example, the multi-TRP PHR MAC CE may indicate the first PH level for the first TRP, and indicate the offset (for the second TRP, for example). In an example, the second PH level (of the second TRP) may be determined based on the first PH level (of the first TRP) and the offset. For example, the second PH may be equal to the first PH subtracted by the offset. Alternatively and/or additionally, the second PH may be equal to a sum of the first PH and the offset.

In some examples, the UE may determine whether to use a multi-TRP PHR MAC CE format (according to one or more of the techniques provided herein, for example) or a multiple entry PHR MAC CE format (e.g., as described in 3GPP TS 38.321, V16.2.0) to report one or more PH levels of multiple cells to the gNB based on whether or not at least one cell of the multiple cells is configured and/or indicated for multi-TRP PUSCH transmissions (e.g., if the UE communicates with and/or is configured to communicate with at least one cell of the multiple cells via multiple TRPs and/or if the UE receives an indication that at least one cell of the multiple cells communicates via multiple TRPs). In some examples, if at least one cell of the multiple cells is configured and/or indicated for multi-TRP PUSCH transmissions (e.g., if the UE communicates with and/or is configured to communicate with at least one cell of the multiple cells via multiple TRPs and/or if the UE receives an indication that at least one cell of the multiple cells communicates via multiple TRPs), the UE may use the multi-TRP PHR MAC CE format (for reporting one or more PH levels and/or one or more PHs associated with the multiple cells, for example). If no cells in the multiple cells is indicated and/or configured for multi-TRP PUSCH transmissions (when the PHR is triggered, for example), the UE may use the multiple entry PHR MAC CE for reporting one or more PH levels and/or one or more PHs (associated with the multiple cells, for example).

In some embodiments, for a triggered PHR (e.g., in response to the triggered PHR), a UE may generate a first PHR MAC CE (e.g., a legacy PHR MAC CE) and a second MAC CE (e.g., a supplement MAC CE). The second MAC CE may be indicative of remaining PH of TRPs not reported in the first PHR MAC CE.

A second concept of the present disclosure is that, in response to a triggered PHR, a UE may generate multiple (e.g., two) multiple entry PHR MAC CEs comprising a first multiple entry PHR MAC CE and a second multiple entry PHR MAC CE. The first multiple entry PHR MAC CE may indicate PH levels associated with first TRPs of reported cells of a first set of cells (e.g., the reported cells may correspond to cells, of the first set of cells, for which PH is reported in the first multiple entry PHR MAC CE and/or the second multiple entry PHR MAC CE). The second multiple entry PHR MAC CE may indicate PH levels associated with second TRPs of reported cells of a second set of cells (e.g., the reported cells may correspond to cells, of the second set of cells, for which PH is reported in the first multiple entry PHR MAC CE and/or the second multiple entry PHR MAC CE). The first TRPs may be associated with CORESET pool index 0 (e.g., each TRP of the first TRPs may be associated with a cell of the first set of cells and may be associated with CORESET pool index 0 of the cell). The second TRPs may be associated with CORESET pool index 1 (e.g., each TRP of the second TRPs may be associated with a cell of the second set of cells and may be associated with CORESET pool index 1 of the cell). The first multiple entry PHR MAC CE may report PHRs determined (e.g., computed) based on one or more real transmissions. The second multiple entry PHR MAC CE may report PHRs determined (e.g., computed) based on one or more reference transmissions. The UE may indicate and/or include PH associated with an earlier transmission (e.g., a transmission that is earlier than a time at which the UE receives a UL grant that schedules transmission of the first multiple entry PHR MAC CE and/or the second multiple entry PHR MAC CE) in the first multiple entry PHR MAC CE. The UE may indicate and/or include PH associated with a latter transmission (e.g., a transmission that is after a time at which the UE receives a UL grant that schedules transmission of the first multiple entry PHR MAC CE and/or the second multiple entry PHR MAC CE) in the second multiple entry PHR MAC CE.

One, some and/or all of the foregoing examples, concepts, techniques and/or embodiments can be formed and/or combined to a new embodiment.

In some examples, embodiments disclosed herein, such as embodiments described with respect to the first concept and the second concept, may be implemented independently and/or separately. Alternatively and/or additionally, a combination of embodiments described herein, such as embodiments described with respect to the first concept and/or the second concept, may be implemented. Alternatively and/or additionally, a combination of embodiments described herein, such as embodiments described with respect to the first concept and/or the second concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, a UE that communicates with a cell via a first TRP and a second TRP may perform multi-TRP PUSCH transmission to the cell via the first TRP and the second TRP. In an example, the UE may transmit a same TB via multiple PUSCHs (to different TRPs of the cell, for example). In some examples, different pathloss reference signals associated with different TRPs of the cell may be indicated to the UE (e.g., the UE may be configured with the different pathloss reference signals associated with the different TRPs of the cell). In an example, the different pathloss reference signals may comprise a first pathloss reference signal associated with the first TRP and a second pathloss reference signal associated with the second TRP.

With respect to one or more embodiments herein, in some examples, the TRPs (e.g., reported TRPs for which PH is indicated in a multi-TRP PHR MAC CE) may be associated with a same cell. Alternatively and/or additionally, the TRPs may be associated with different cells (e.g., at least one of one or more first TRPs of the TRPs may be associated with a first cell, one or more second TRPs of the TRPs may be associated with a second cell, etc.).

With respect to one or more embodiments herein, in some examples, the transmission (e.g., at least one of the first transmission, the second transmission, a transmission based on which a PH is determined, etc.) may be a PUSCH transmission, a PUCCH transmission, or a SRS transmission.

With respect to one or more embodiments herein, in some examples, the one or more cells (e.g., one or more cells for which PH is indicated in a multi-TRP PHR MAC CE) may be one or more serving cells (e.g., one or more activated serving cells), such as one or more serving cells with configured UL.

With respect to one or more embodiments herein, in some examples, a PH report may be a PH.

With respect to one or more embodiments herein, in some examples, a real transmission is the same as an actual transmission. A real transmission may refer to a transmission that overlaps in time domain with a slot for transmitting PHR MAC CE. For example, a real transmission may correspond to a transmission that is within the same slot as a transmission of PHR MAC CE. A UE determining a PH based on a real transmission (e.g., the UE deriving the PH from the real transmission) may correspond to and/or comprise the UE determining (e.g., deriving) a difference between a (UE) maximum transmit power and a transmission power for the real transmission.

With respect to one or more embodiments herein, in some examples, a reference transmission may be based on a reference format. A reference transmission may be used in a scenario in which there is no transmission overlapping in time domain with a slot for transmitting PHR MAC CE. For example, a reference transmission may be used for determining a PH associated with a TRP if there is no transmission, associated with the TRP, that overlaps in time domain with a slot for transmitting PHR MAC CE (e.g., a PHR MAC CE comprising the PH associated with the TRP). A UE determining a PH based on a reference transmission (e.g., the UE deriving the PH from the reference transmission) may correspond to and/or comprise the UE determining (e.g., deriving) a difference between a reference UE maximum transmit power $\tilde{P}_{CMAX,f,c}(i)$ and a transmission power that is based on the reference format. For example, the PH (and/or the transmission power) may be determined (e.g., derived) using a set of power control parameters (e.g., a default set of power control parameters). For example, the reference format may comprise the set of power control parameters. In an example, the set of power control parameters may comprise an entry (e.g., an entry with a first lowest index, such as where the entry has the lowest index among one or more indexes of one or more entries) for determining $P_{O\_PUSCH,b,f,c}(j)$ and/or $\alpha_{b,f,c}(j)$. For example, the UE may determine $P_{O\_PUSCH,b,f,c}(j)$ and/or $\alpha_{b,f,c}(j)$ based on the entry, wherein $P_{O\_PUSCH,b,f,c}(j)$ and/or $\alpha_{b,f,c}(j)$ may be used to determine the PH (and/or the transmission power). Alternatively and/or additionally, the PH (and/or the transmission power) may be determined (e.g., derived) using a pathloss reference signal with pathloss reference signal ID (PL RS ID)=0, and/or using a closed loop index l=0. In some examples, the reference format (and/or the set of power control parameters) may be indicative of the pathloss reference signal with PL RS ID=0, and/or the closed loop index l=0. In some examples, a reference transmission may be a virtual transmission.

With respect to one or more embodiments herein, in some examples, a TB may be (and/or may comprise) a MAC PDU, UL data, one or more MAC CEs and/or logical channel data. In an example, a TB may be (and/or may comprise) a MAC PDU. In an example, a TB may be (and/or may comprise) UL data. In an example, a TB may comprise one or more MAC CEs and logical channel data.

With respect to one or more embodiments herein, in some examples, the data (e.g., data, such as a set of data, that the UE transmits via multiple PUSCHs and/or multiple TRPs to a network) may comprise one or more TBs and/or one or more MAC PDUs.

With respect to one or more embodiments herein, in some examples, a TRP (mentioned in the present disclosure) may be associated with a SRS resource and/or a PUSCH resource. In some examples, one, some and/or all instances of the term "TRP" throughout the present disclosure may be replaced with "SRS resource" and/or "PUSCH resource". In some examples, to transmit a TB to a TRP, the UE transmits the TB via a SRS resource and/or a PUSCH resource associated with the TRP.

With respect to one or more embodiments herein, in some examples, a TRP (mentioned in the present disclosure) may be associated with one or more beam failure detection reference signals (BFD-RSs) (e.g., a group of one or more BFD-RSs) associated with a cell. In some examples, one, some and/or all instances of the term "TRP" throughout the present disclosure may be replaced with "one or more BFD-RSs" and/or "group of one or more BFD-RSs". For a UE in single-TRP state on a cell, the UE may receive and/or monitor a single beam BFD-RS (and/or a single group of one or more BFD-RSs) associated with the cell. For a UE in multi-TRP state on a cell, the UE may receive and/or monitor multiple BFD-RSs (and/or multiple groups of one or more BFD-RSs) associated with the cell. When a TRP of a cell is removed for the UE (and/or in response to the TRP of the cell being removed for the UE), the UE may release a BFD-RS and/or a group of one or more BFD-RSs (associated with the TRP, for example). Alternatively and/or additionally, when the TRP of the cell is removed for the UE (and/or in response to the TRP of the cell being removed for the UE), the UE may remove the BFD-RS and/or the group of one or more BFD-RSs. Alternatively and/or additionally, when the TRP of the cell is removed for the UE (and/or in response to the TRP of the cell being removed for the UE), the UE may stop monitoring the BFD-RS and/or the group of one or more BFD-RSs.

With respect to one or more embodiments herein, in some examples, a TRP (mentioned in the present disclosure) may be associated with one or more activated TCI states (e.g., one or more activated TCI states for PDCCH monitoring), such as a group of one or more activated TCI states, associated with a cell. In some examples, one, some and/or all instances of the term "TRP" throughout the present disclosure may be replaced with "one or more activated TCI states" and/or "group of one or more activated TCI states". For a UE in single-TRP state on a cell, the UE may receive and/or monitor signaling (e.g., the same signaling, such as PDCCH signaling or PDSCH signaling) of the cell via a single activated TCI state. For a UE in multi-TRP state on a cell, the UE may receive and/or monitor one or more signalings (e.g., one or more same signalings, such as PDCCH signaling or PDSCH signaling) of the cell via multiple activated TCI states (e.g., the one or more signalings may be monitored via the multiple activated TCI states at a same time). When a TRP of a cell is removed for the UE (and/or in response to the TRP of the cell being removed for the UE), the UE may deactivate an activated TCI state (associated with the TRP, for example). For a UE in multi-TRP state on a cell, the UE may transmit one or more signalings (e.g., one or more same signalings, such as PUCCH signaling or PUSCH signaling) of the cell via two or more activated TCI states (e.g., the UE may transmit the one or more signalings of the cell via the two or more activated TCI states at a same time). When a TRP of a cell is removed for the UE (and/or in response to the TRP being removed for the UE), the UE may deactivate an activated TCI state (associated with the TRP, for example).

In some examples, one or more signalings (e.g., the one or more same signalings) may indicate a same DL assignment or a same UL grant for the UE. In some examples, the UE may combine the one or more signaling to determine (e.g., derive) a DL assignment or a UL grant. Each signaling in the one or more signalings may comprise the same content (e.g., the same DCI).

With respect to one or more embodiments herein, in some examples, a TRP (mentioned in the present disclosure) may be associated with a CORESET pool associated with a cell. In some examples, one, some and/or all instances of the term "TRP" throughout the present disclosure may be replaced with "CORESET pool". For a UE in single-TRP state on a cell, the UE may receive and/or monitor signaling from the cell via a single CORESET pool (e.g., there may be only one activated CORESET pool and/or one configured CORESET pool index that the UE may use to receive and/or monitor signaling from the cell). For a UE in multi-TRP state on a cell, the UE may receive and/or monitor signaling from the cell via multiple CORESET pools (e.g., there may be multiple activated CORESET pools and/or multiple configured CORESET pool indexes that the UE may use to receive and/or monitor signaling from the cell). When a TRP of a cell is removed for the UE (and/or in response to the TRP of the cell being removed for the UE), the UE may deactivate and/or release a CORESET pool (associated with the TRP, for example). Alternatively and/or additionally, when a TRP of a cell is removed for the UE (and/or in response to the TRP of the cell being removed for the UE), the UE may deactivate and/or release a CORESET pool index (associated with the TRP, for example).

With respect to one or more embodiments herein, in some examples, a TRP (mentioned in the present disclosure) may be associated with a SRS resource (and/or a SRS resource set) associated with a cell. In some examples, one, some and/or all instances of the term "TRP" throughout the present disclosure may be replaced with "SRS resource" and/or "SRS resource set". For a UE in single-TRP state on a cell, the UE may perform transmission to the cell via a single SRS resource. For a UE in multi-TRP state on a cell, the UE may perform transmission to the cell via multiple SRS resources. When a TRP of a cell is removed for the UE (and/or in response to the TRP of the cell being removed for the UE), the UE may deactivate and/or release a SRS resource and/or a SRS resource set (associated with the TRP, for example).

With respect to one or more embodiments herein, in some examples, multiplePHR (with which the UE is configured, for example) may be set to true.

With respect to one or more embodiments herein, in some examples, the first TRP may be a first serving TRP of the UE and/or the cell. The second TRP may be a second serving TRP of the UE and/or the cell.

With respect to one or more embodiments herein, in some examples, a serving TRP of a UE may be a TRP associated with one or more activated TCI states for PDCCH.

With respect to one or more embodiments herein, in some examples, a TRP (e.g., a TRP of a cell) may be associated with an activated TCI state, a reference signal for PUCCH, and/or a reference signal for PUSCH of a cell. In some examples, one, some and/or all instances of the term "TRP" throughout the present disclosure may be replaced with "activated TCI state", "reference signal for PUCCH" and/or "reference signal for PUSCH".

With respect to one or more embodiments herein, in some examples, a TRP (e.g., a TRP of a cell) may be an activated TRP.

With respect to one or more embodiments herein, in some examples, the cell may be a Special Cell (SpCell).

With respect to one or more embodiments herein, in some examples, the cell may be a SCell.

Throughout the present disclosure, one, some and/or all instances of "(UE) maximum transmit power" and/or "maximum transmit power" may correspond to (and/or may be replaced by) "maximum transmit power", "UE maximum transmit power", "maximum output power" and/or "UE configured maximum output power".

Figure 16:
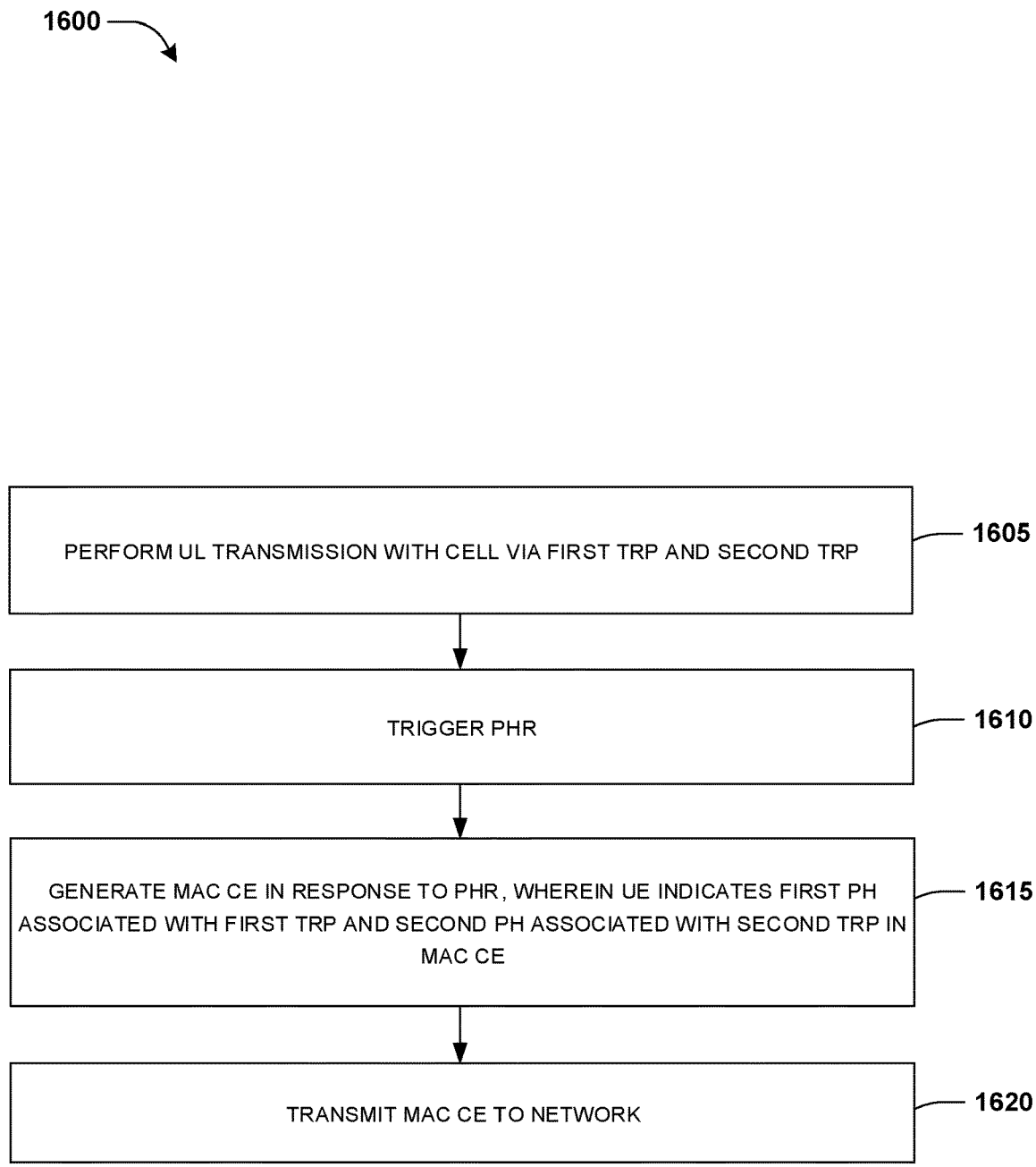
FIG. 16 is a flow chart according to one exemplary embodiment.

FIG. 16 is a flow chart 1600 according to one exemplary embodiment from the perspective of a UE. In step 1605, the UE performs UL transmission with a cell via a first TRP and a second TRP. For example, the UL transmission with the cell may comprise one or more UL transmissions, to the cell, via the first TRP and one or more UL transmissions, to the cell, via the second TRP. In step 1610, the UE triggers a PHR. In step 1615, the UE generates a MAC CE in response to the PHR (e.g., in response to triggering the PHR), wherein the UE indicates a first PH associated with the first TRP and a second PH associated with the second TRP in the MAC CE (e.g., the UE includes an indication of the first PH and an indication of the second PH in the MAC CE). In step 1620, the UE transmits the MAC CE to a network. Alternatively and/or additionally, the UE may transmit the MAC CE to the cell or to a second cell.

In one embodiment, the MAC CE is a PHR MAC CE.

In one embodiment the cell is a PCell.

In one embodiment, the MAC CE does not comprise and/or does not indicate PH associated with other cells other than the cell. For example, the MAC CE may indicate PH only for the cell.

In one embodiment, the MAC CE is a fixed size. For example, a size of the MAC CE may be fixed and/or may be based on a configuration which with the UE is configured (e.g., the configuration may be indicative of the fixed size).

In one embodiment, the UE determines whether or not to use the MAC CE (and/or a format of the MAC CE) for indicating PH based on one or more network configurations (e.g., the UE may receive the one or more network configurations from a network and/or the UE may be configured with the one or more network configurations by the network). In an example, the UE may generate the MAC CE based on a determination to use the MAC CE for indicating PH (e.g., the UE may determine to use the MAC CE for indicating PH based on an indication, in the one or more network configurations, to use the MAC CE). Alternatively and/or additionally, the UE may generate the MAC CE having the format based on a determination to use the MAC CE for indicating PH (e.g., the UE may determine to use the MAC CE for indicating PH based on an indication, in the one or more network configurations, to use the MAC CE).

In one embodiment, the UE determines whether or not to indicate the first PH and the second PH in the MAC CE (e.g., whether or not to include an indication of the first PH and an indication of the second PH in the MAC CE) for indicating PH based on one or more network configurations (e.g., the UE may receive the one or more network configurations from a network and/or the UE may be configured with the one or more network configurations by the network). In an example, the UE may generate the MAC CE to indicate the first PH and the second PH based on the one or more network configurations (e.g., the UE may generate the MAC CE to indicate the first PH and the second PH based on an indication, in the one or more network configurations, to indicate the first PH and the second PH in the MAC CE).

In one embodiment, the first PH is determined (e.g., derived) based on a real transmission.

In one embodiment, the first PH is determined (e.g., derived) based on a reference transmission.

In one embodiment, the first PH is associated with a Type 1 PH report.

In one embodiment, the first PH is associated with a Type 3 PH report.

In one embodiment, the second PH is determined (e.g., derived) based on a real transmission.

In one embodiment, the second PH is determined (e.g., derived) based on a reference transmission.

In one embodiment, the second PH is associated with a Type 1 PH report.

In one embodiment, the second PH is associated with a Type 3 PH report.

In one embodiment, the first TRP and the second TRP are activated at a same timing. For example, the first TRP and the second TRP may be activated (by the UE, for example) at the same time. Alternatively and/or additionally, the first TRP and the second TRP may be activated (by the UE, for example) in a same slot. Alternatively and/or additionally, the first TRP and the second TRP may be activated (by the UE, for example) in a same mini-slot. Alternatively and/or additionally, the first TRP and the second TRP may be activated (by the UE, for example) in a same symbol (e.g., OFDM symbol) of a slot.

Referring back to FIGS. 3 and 4, in one exemplary embodiment of a UE, the device 300 includes a program code 312 stored in the memory 310. The CPU 308 may execute program code 312 to enable the UE (i) to perform UL transmission with a cell via a first TRP and a second TRP, (ii) to trigger a PHR, (iii) to generate a MAC CE in response to the PHR, wherein the UE indicates a first PH associated with the first TRP and a second PH associated with the second TRP in the MAC CE, and (iv) to transmit the MAC CE to a network. Furthermore, the CPU 308 can execute the program code 312 to perform one, some and/or all of the above-described actions and steps and/or others described herein.

Figure 17:
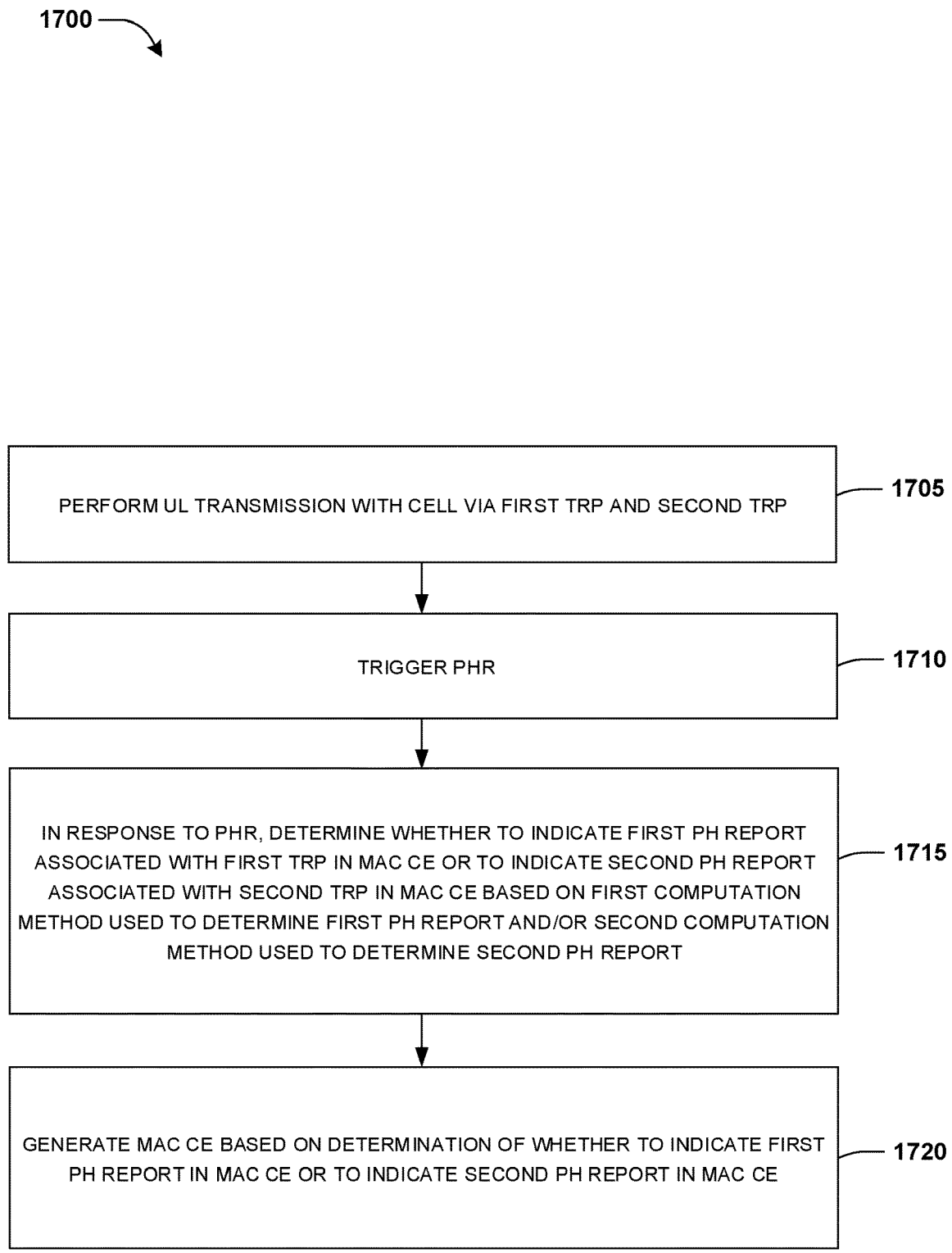
FIG. 17 is a flow chart according to one exemplary embodiment.

FIG. 17 is a flow chart 1700 according to one exemplary embodiment from the perspective of a UE. In step 1705, the UE performs UL transmission with a cell via a first TRP and a second TRP. For example, the UL transmission with the cell may comprise one or more UL transmissions, to the cell, via the first TRP and one or more UL transmissions, to the cell, via the second TRP. In step 1710, the UE triggers a PHR. In step 1715, in response to the PHR (e.g., in response to triggering the PHR), the UE determines whether to indicate a first PH report associated with the first TRP in a MAC CE or to indicate a second PH report associated with the second TRP in the MAC CE based on a first computation method used to determine the first PH report and/or a second computation method used to determine the second PH report. In some examples, the determination of whether to indicate the first PH report in the MAC CE or to indicate the second PH report in the MAC CE may be based on other information in addition to the first computation method and/or the second computation method. In some examples, the determination of whether to indicate the first PH report in the MAC CE or to indicate the second PH report in the MAC CE is performed for generating the MAC CE in response to the PHR (e.g., generating the MAC CE in response to triggering the PHR). In step 1720, the UE generates the MAC CE based on the determination of whether to indicate the first PH report in the MAC CE or to indicate the second PH report in the MAC CE. In an example, if the UE determines to indicate the first PH report in the MAC CE, the UE may generate the MAC CE such that the MAC CE is indicative of the first PH report. Alternatively and/or additionally, if the UE determines to indicate the second PH report in the MAC CE, the UE may generate the MAC CE such that the MAC CE is indicative of the second PH report.

In one embodiment, the UE indicates the first PH report in the MAC CE (e.g., the UE includes an indication of the first PH report in the MAC CE) if determination (e.g., computation) of the first PH report is based on a real PUSCH transmission (e.g., the UE may indicate the first PH report in the MAC CE if the first computation method uses a real PUSCH transmission to determine the first PH report).

In one embodiment, the UE does not indicate the second PH report in the MAC CE (e.g., the UE does not include an indication of the second PH report in the MAC CE) if determination (e.g., computation) of the second PH report is based on a reference PUSCH transmission (e.g., the UE may not indicate the second PH report in the MAC CE if the second computation method uses a reference PUSCH transmission to determine the second PH report).

In one embodiment, the UE transmits the MAC CE to the cell or to a second cell.

Referring back to FIGS. 3 and 4, in one exemplary embodiment of a UE, the device 300 includes a program code 312 stored in the memory 310. The CPU 308 may execute program code 312 to enable the UE (i) to perform UL transmission with a cell via a first TRP and a second TRP, (ii) to trigger a PHR, (iii) in response to the PHR, to determine whether to indicate a first PH report associated with the first TRP in a MAC CE or to indicate a second PH report associated with the second TRP in the MAC CE based on a first computation method used to determine the first PH report and/or a second computation method used to determine the second PH report, and (iv) to generate the MAC CE based on the determination of whether to indicate the first PH report in the MAC CE or to indicate the second PH report in the MAC CE. Furthermore, the CPU 308 can execute the program code 312 to perform one, some and/or all of the above-described actions and steps and/or others described herein.

Figure 18:
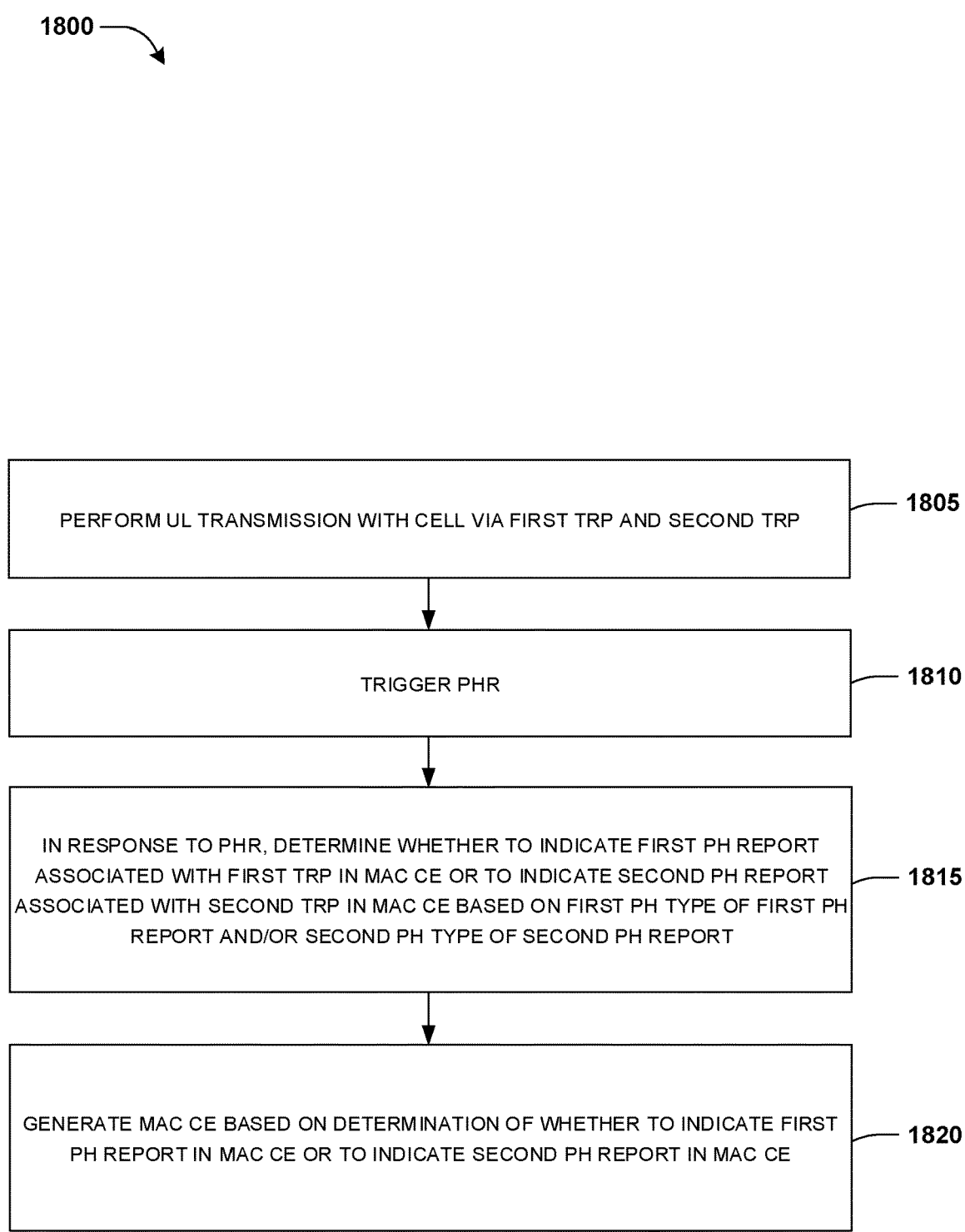
FIG. 18 is a flow chart according to one exemplary embodiment.

FIG. 18 is a flow chart 1800 according to one exemplary embodiment from the perspective of a UE. In step 1805, the UE performs UL transmission with a cell via a first TRP and a second TRP. For example, the UL transmission with the cell may comprise one or more UL transmissions, to the cell, via the first TRP and one or more UL transmissions, to the cell, via the second TRP. In step 1810, the UE triggers a PHR. In step 1815, in response to the PHR (e.g., in response to triggering the PHR), the UE determines whether to indicate a first PH report associated with the first TRP in a MAC CE or to indicate a second PH report associated with the second TRP in the MAC CE based on a first PH type of the first PH report and/or a second PH type of the second PH report. In some examples, the determination of whether to indicate the first PH report in the MAC CE or to indicate the second PH report in the MAC CE may be based on other information in addition to the first PH type and/or the second PH type. In some examples, the determination of whether to indicate the first PH report in the MAC CE or to indicate the second PH report in the MAC CE is performed for generating the MAC CE in response to the PHR (e.g., generating the MAC CE in response to triggering the PHR). In step 1820, the UE generates the MAC CE based on the determination of whether to indicate the first PH report in the MAC CE or to indicate the second PH report in the MAC CE. In an example, if the UE determines to indicate the first PH report in the MAC CE, the UE may generate the MAC CE such that the MAC CE is indicative of the first PH report. Alternatively and/or additionally, if the UE determines to indicate the second PH report in the MAC CE, the UE may generate the MAC CE such that the MAC CE is indicative of the second PH report.

In one embodiment, the UE indicates the first PH report in the MAC CE (e.g., the UE includes an indication of the first PH report in the MAC CE) if the first PH report is determined (e.g., computed) based on a real PUSCH transmission.

In one embodiment, the UE does not indicate the second PH report in the MAC CE (e.g., the UE does not include an indication of the second PH report in the MAC CE) if the second PH report is determined (e.g., computed) based on a reference PUSCH transmission.

In one embodiment, the UE indicates the first PH report in the MAC CE (e.g., the UE includes an indication of the first PH report in the MAC CE) if the first PH type of the first PH report corresponds to real PH (e.g., the first PH type may correspond to real PH if the first PH report is based on a real PUSCH transmission).

In one embodiment, the UE does not indicate the second PH report in the MAC CE (e.g., the UE does not include an indication of the second PH report in the MAC CE) if the second PH type of the second PH report corresponds to virtual PH (e.g., the second PH type may correspond to virtual PH if the second PH report is based on a reference PUSCH transmission).

In one embodiment, the UE transmits the MAC CE to the cell or to a second cell.

Referring back to FIGS. 3 and 4, in one exemplary embodiment of a UE, the device 300 includes a program code 312 stored in the memory 310. The CPU 308 may execute program code 312 to enable the UE (i) to perform UL transmission with a cell via a first TRP and a second TRP, (ii) to trigger a PHR, (iii) in response to the PHR, to determine whether to indicate a first PH report associated with the first TRP in a MAC CE or to indicate a second PH report associated with the second TRP in the MAC CE based on a first PH type of the first PH report and/or a second PH type of the second PH report, and (iv) to generate the MAC CE based on the determination of whether to indicate the first PH report in the MAC CE or to indicate the second PH report in the MAC CE. Furthermore, the CPU 308 can execute the program code 312 to perform one, some and/or all of the above-described actions and steps and/or others described herein.

Figure 19:
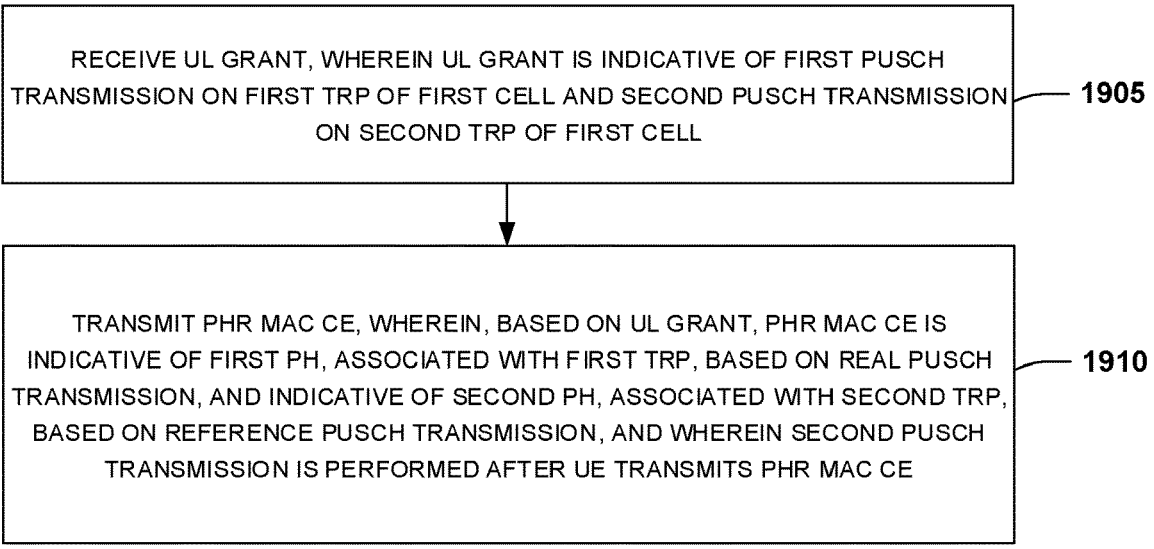
FIG. 19 is a flow chart according to one exemplary embodiment.

FIG. 19 is a flow chart 1900 according to one exemplary embodiment from the perspective of a UE. In step 1905, the UE receives a UL grant, wherein the UL grant is indicative of a first PUSCH transmission on a first TRP of a first cell and a second PUSCH transmission on a second TRP of the first cell. For example, the UL grant may schedule the first PUSCH transmission and the second PUSCH transmission. In step 1910, the UE transmits a PHR MAC CE. In an example, the UE generates and/or transmits the PHR MAC CE based on the UL grant. Based on the UL grant, the PHR MAC CE is indicative of a first PH, associated with the first TRP, based on a real PUSCH transmission. For example, the UE may determine the first PH, based on the real PUSCH transmission, for the first TRP. In an example, the first PH is a first Type 1 PH. Based on the UL grant, the PHR MAC CE is indicative of a second PH, associated with the second TRP, based on a reference PUSCH transmission. For example, the UE may determine the second PH, based on the reference PUSCH transmission, for the second TRP. In an example, the second PH is a second Type 1 PH. In an example, the UE generates the PHR MAC CE to be indicative of the first PH (associated with the first TRP) and the second PH (associated with the second TRP) based on the UL grant being indicative of PUSCH transmissions on the first TRP and the second TRP (e.g., based on the UL grant being indicative of the first PUSCH transmission on the first TRP and the second PUSCH transmission on the second TRP). The second PUSCH transmission is performed (by the UE) after the UE transmits the PHR MAC CE.

In one embodiment, the PHR MAC CE is indicative of a first maximum transmit power (e.g., a first UE maximum transmit power) for the first TRP and a second maximum transmit power (e.g., a second UE maximum transmit power) for the second TRP.

In one embodiment, the PHR MAC CE is indicative of a single maximum transmit power (e.g., a single UE maximum transmit power) for both the first TRP and the second TRP (e.g., both the first TRP and the second TRP are associated with the single maximum transmit power).

In one embodiment, the UE is configured with a first PUSCH power control adjustment state for the first TRP and a second PUSCH power control adjustment state for the second TRP, wherein the first PUSCH power control adjustment state is different from the second PUSCH power control adjustment state. In an example, the UE determines the first PH based on the first PUSCH power control adjustment state for the first TRP (and/or based on other information in addition to the first PUSCH power control adjustment state). In an example, the UE determines the second PH based on the second PUSCH power control adjustment state for the second TRP (and/or based on other information in addition to the second PUSCH power control adjustment state).

In one embodiment, the first PUSCH transmission and the second PUSCH transmission are performed to transmit a same TB. For example, the first PUSCH transmission and the second PUSCH transmission may be used for transmission of the same TB to the first cell (e.g., the first PUSCH transmission comprises transmission of the same TB and the second PUSCH transmission comprises transmission of the same TB).

In one embodiment, the UE determines, based on a configuration from a network, whether to indicate a single PH (e.g., a single Type 1 PH) for the first cell in the PHR MAC CE or to indicate two PHs (e.g., two Type 1 PHs) for the first cell in the PHR MAC CE. The PHR MAC CE indicates the first PH and the second PH based on a determination to indicate two PHs for the first cell in the PHR MAC CE (e.g., the UE may include the first PH and the second PH in the PHR MAC CE based on the determination to indicate two PHs for the first cell in the PHR MAC CE). For example, the UE may determine to indicate two PHs in the PHR MAC CE based on an indication (e.g., an instruction), in the configuration, to indicate two PHs for PHR for a cell.

In one embodiment, the real PUSCH transmission is the first PUSCH transmission.

In one embodiment, the first PUSCH transmission is performed before transmitting the PHR MAC CE. In an example in which the real PUSCH transmission is the first PUSCH transmission, the first PH is based on the first PUSCH transmission based on the UE performing the first PUSCH transmission before transmitting the PHR MAC CE.

In one embodiment, the first PUSCH transmission is performed in a first slot that overlaps with a second slot for transmitting the PHR MAC CE. For example, the first slot (in which the first PUSCH transmission is performed) may be the same as the second slot (in which the UE transmits the PHR MAC CE). In an example, the UE performs the first PUSCH transmission in one or more first symbols (e.g., one or more first OFDM symbols) of the first slot and the UE transmits the PHR MAC CE in one or more second symbols (e.g., one or more second OFDM symbols) of the first slot. The one or more second symbols may be after the one or more first symbols.

In one embodiment, the UE transmits the PHR MAC CE to the first cell or to a second cell.

In one embodiment, the UE triggers a PHR, associated with the PHR MAC CE, after receiving the UL grant. In an example, the UE generates and/or transmits the PHR MAC CE in response to triggering the PHR.

In one embodiment, the UE determines (e.g., calculates) the second PH, wherein the second PH is not determined (e.g., calculated) based on the second PUSCH transmission.

In one embodiment, the UE determines (e.g., calculates) the second PH based on a difference between a reference maximum transmit power (e.g., a reference UE maximum transmit power) and a power for the reference PUSCH transmission. In some examples, the UE determines the second PH based on other information in addition to the difference between the reference maximum transmit power and the power for the reference PUSCH transmission. In some examples, the power for the reference PUSCH transmission may be determined based on a pathloss and/or a power control adjustment state (e.g., a PUSCH power control adjustment state) associated with the second TRP, wherein the pathloss may be determined based on a DL reference signal (e.g., a pathloss reference signal) associated with the second TRP. In an example (e.g., according to 3GPP TS 38.101, v16.2.0 and 3GPP TS 38.213, v16.2.0), the UE may determine the reference maximum transmit power based on a RRC configured power from a network, maximum power reduction (MPR) being 0, Additional maximum power reduction (A-MPR) being 0, and/or power tolerance being 0 (and/or the UE may determine the reference maximum transmit power based on other information in addition to the RRC configured power, the MPR being 0, the A-MPR being 0 and/or the power tolerance being 0).

In one embodiment, the real PUSCH transmission is the first PUSCH transmission, wherein the UE determines (e.g., calculates) the first PH based on a difference between a maximum transmit power (e.g., a UE maximum transmit power) and an estimated power for the first PUSCH transmission. In some examples, the UE determines the first PH based on other information in addition to the difference between the maximum transmit power and the estimated power for the first PUSCH transmission. In some examples, the estimated power may be determined based on a pathloss and/or a power control adjustment state (e.g., a PUSCH power control adjustment state) associated with the first TRP, wherein the pathloss may be determined based on a DL reference signal (e.g., a pathloss reference signal) associated with the first TRP. In an example (e.g., according to 3GPP TS 38.101, v16.2.0), the UE may determine the maximum transmit power based on a RRC configured power from a network, a MPR associated with modulation scheme and transmission bandwidth, an A-MPR configured by a network, and/or power tolerance (and/or the UE may determine the maximum transmit power based on other information in addition to the RRC configured power, the MPR, the A-MPR and/or the power tolerance). The maximum transmit power (e.g., the UE maximum transmit power) may correspond to (and/or may be replaced by) a UE configured maximum output power.

In one embodiment, the first TRP is associated with a first SRS resource set of the first cell and the second TRP is associated with a second SRS resource set of the first cell.

Referring back to FIGS. 3 and 4, in one exemplary embodiment of a UE, the device 300 includes a program code 312 stored in the memory 310. The CPU 308 may execute program code 312 to enable the UE (i) to receive a UL grant, wherein the UL grant is indicative of a first PUSCH transmission on a first TRP of a first cell and a second PUSCH transmission on a second TRP of the first cell, and (ii) to transmit a PHR MAC CE, wherein, based on the UL grant, the PHR MAC CE is indicative of a first PH (e.g., a first Type 1 PH), associated with the first TRP, based on a real PUSCH transmission, wherein, based on the UL grant, the PHR MAC CE is indicative of a second PH (e.g., a second Type 1 PH), associated with the second TRP, based on a reference PUSCH transmission, and wherein the second PUSCH transmission is performed after the UE transmits the PHR MAC CE. Furthermore, the CPU 308 can execute the program code 312 to perform one, some and/or all of the above-described actions and steps and/or others described herein.

Figure 20:
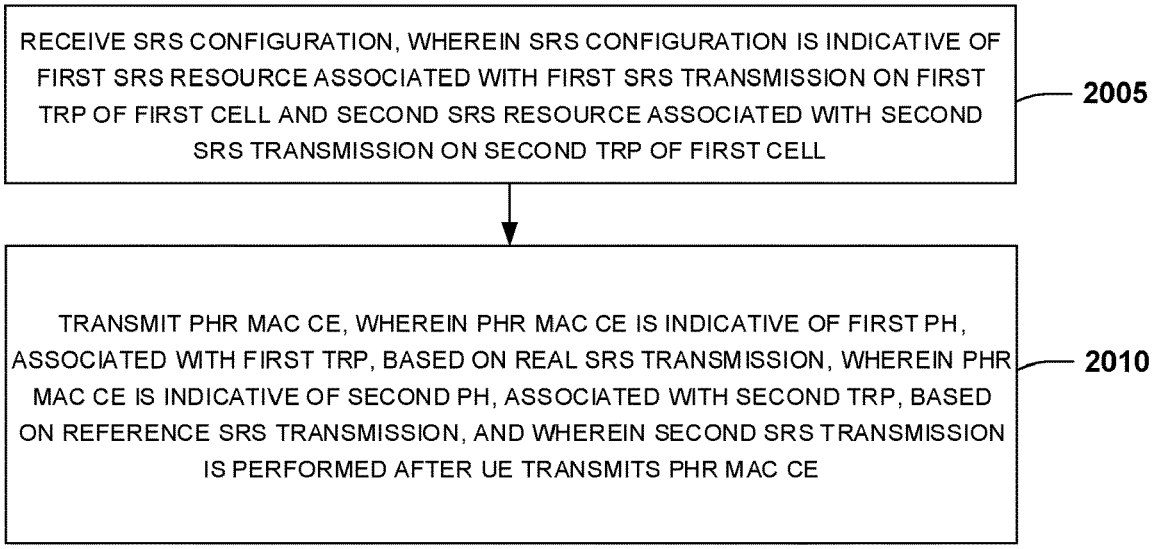
FIG. 20 is a flow chart according to one exemplary embodiment.

FIG. 20 is a flow chart 2000 according to one exemplary embodiment from the perspective of a UE. In step 2005, the UE receives a SRS configuration, wherein the SRS configuration is indicative of a first SRS resource associated with a first SRS transmission on a first TRP of a first cell and a second SRS resource associated with a second SRS transmission on a second TRP of the first cell. In some examples, the SRS configuration may be indicative of other information (e.g., information, such as one or more other SRS resources other than the first SRS resource and the second SRS resource) in addition to the first SRS resource and the second SRS resource. For example, the SRS configuration may indicate the first SRS transmission and the second SRS transmission. In step 2010, the UE transmits a PHR MAC CE. In an example, the UE generates and/or transmits the PHR MAC CE based on the SRS configuration. The PHR MAC CE is indicative of a first PH, associated with the first TRP, based on a real SRS transmission. For example, the UE may determine the first PH, based on the real SRS transmission, for the first TRP. In an example, the first PH is a first Type 3 PH. The PHR MAC CE is indicative of a second PH, associated with the second TRP, based on a reference SRS transmission. For example, the UE may determine the second PH, based on the reference SRS transmission, for the second TRP. In an example, the second PH is a second Type 3 PH. In an example, the PHR MAC CE is indicative of the first PH (associated with the first TRP) and the second PH (associated with the second TRP) based on the SRS configuration. In an example, the UE generates the PHR MAC CE to be indicative of the first PH (associated with the first TRP) and the second PH (associated with the second TRP) based on the SRS configuration being indicative of SRS transmissions on the first TRP and the second TRP (e.g., based on the SRS configuration being indicative of the first SRS transmission on the first TRP and the second SRS transmission on the second TRP). The second SRS transmission is performed (by the UE) after the UE transmits the PHR MAC CE.

In one embodiment, the PHR MAC CE is indicative of a first maximum transmit power (e.g., a first UE maximum transmit power) for the first TRP and a second maximum transmit power (e.g., a second UE maximum transmit power) for the second TRP.

In one embodiment, the PHR MAC CE is indicative of a single maximum transmit power (e.g., a single UE maximum transmit power) for both the first TRP and the second TRP (e.g., both the first TRP and the second TRP are associated with the single maximum transmit power).

In one embodiment, the UE is configured with a first PUCCH power control adjustment state for the first TRP and a second PUCCH power control adjustment state for the second TRP, wherein the first PUCCH power control adjustment state is different from the second PUCCH power control adjustment state. In an example, the UE determines the first PH based on the first PUCCH power control adjustment state for the first TRP (and/or based on other information in addition to the first PUSCH power control adjustment state). In an example, the UE determines the second PH based on the second PUCCH power control adjustment state for the second TRP (and/or based on other information in addition to the second PUSCH power control adjustment state).

In one embodiment, the UE determines, based on a configuration from a network, whether to indicate a single PH (e.g., a single Type 3 PH) for the first cell in the PHR MAC CE or to indicate two PHs (e.g., two Type 3 PHs) for the first cell in the PHR MAC CE. The PHR MAC CE indicates the first PH and the second PH based on a determination to indicate two PHs for the first cell in the PHR MAC CE (e.g., the UE may include the first PH and the second PH in the PHR MAC CE based on the determination to indicate two PHs for the first cell in the PHR MAC CE). For example, the UE may determine to indicate two PHs in the PHR MAC CE based on an indication (e.g., an instruction), in the configuration, to indicate two PHs for PHR for a cell.

In one embodiment, the real SRS transmission is the first SRS transmission.

In one embodiment, the first SRS transmission is performed before transmitting the PHR MAC CE. In an example in which the real SRS transmission is the first SRS transmission, the first PH is based on the first SRS transmission based on the UE performing the first SRS transmission before transmitting the PHR MAC CE.

In one embodiment, the first SRS transmission is performed in a first slot that overlaps with a second slot for transmitting the PHR MAC CE. For example, the first slot (in which the first SRS transmission is performed) may be the same as the second slot (in which the UE transmits the PHR MAC CE). In an example, the UE performs the first SRS transmission in one or more first symbols (e.g., one or more first OFDM symbols) of the first slot and the UE transmits the PHR MAC CE in one or more second symbols (e.g., one or more second OFDM symbols) of the first slot. The one or more second symbols may be after the one or more first symbols.

In one embodiment, the UE transmits the PHR MAC CE to the first cell or to a second cell.

In one embodiment, the UE triggers a PHR, associated with the PHR MAC CE, after receiving the SRS configuration. In an example, the UE generates and/or transmits the PHR MAC CE in response to triggering the PHR.

In one embodiment, the UE determines (e.g., calculates) the second PH, wherein the second PH is not determined (e.g., calculated) based on the second SRS transmission.

In one embodiment, the UE determines (e.g., calculates) the second PH based on a difference between a reference maximum transmit power (e.g., a reference UE maximum transmit power) and a power for the reference SRS transmission. In some examples, the UE determines the second PH based on other information in addition to the difference between the reference maximum transmit power and the power for the reference SRS transmission. In some examples, the power for the reference SRS transmission may be determined based on a pathloss and/or a power control adjustment state (e.g., a PUCCH power control adjustment state) associated with the second TRP, wherein the pathloss may be determined based on a DL reference signal (e.g., a pathloss reference signal) associated with the second TRP. In an example (e.g., according to 3GPP TS 38.101, v16.2.0 and 3GPP TS 38.213, v16.2.0), the UE may determine the reference maximum transmit power based on a RRC configured power from a network, MPR being 0, A-MPR being 0, and power tolerance being 0 (and/or the UE may determine the reference maximum transmit power based on other information in addition to the RRC configured power, the MPR being 0, the A-MPR being 0 and/or the power tolerance being 0).

In one embodiment, the real SRS transmission is the first SRS transmission, wherein the UE determines (e.g., calculates) the first PH based on a difference between a maximum transmit power (e.g., a UE maximum transmit power) and an estimated power for the first SRS transmission. In some examples, the UE determines the first PH based on other information in addition to the difference between the maximum transmit power and the estimated power for the first SRS transmission. In some examples, the estimated power may be determined based on a pathloss and/or a power control adjustment state (e.g., a PUCCH power control adjustment state) associated with the first TRP, wherein the pathloss may be determined based on a DL reference signal (e.g., a pathloss reference signal) associated with the first TRP. In an example (e.g., according to 3GPP TS 38.101, v16.2.0), the UE may determine the maximum transmit power based on a RRC configured power from a network, a MPR associated with modulation scheme and transmission bandwidth, an A-MPR configured by a network, and/or power tolerance (and/or the UE may determine the maximum transmit power based on other information in addition to the RRC configured power, the MPR, the A-MPR and/or the power tolerance). The maximum transmit power (e.g., the UE maximum transmit power) may correspond to (and/or may be replaced by) a UE configured maximum output power.

In one embodiment, the first TRP is associated with a first SRS resource set of the first cell and the second TRP is associated with a second SRS resource set of the first cell.

Referring back to FIGS. 3 and 4, in one exemplary embodiment of a UE, the device 300 includes a program code 312 stored in the memory 310. The CPU 308 may execute program code 312 to enable the UE (i) to receive a SRS configuration, wherein the SRS configuration is indicative of a first SRS resource associated with a first SRS transmission on a first TRP of a first cell and a second SRS resource associated with a second SRS transmission on a second TRP of the first cell, and (ii) to transmit a PHR MAC CE, wherein the PHR MAC CE is indicative of a first PH (e.g., a first Type 3 PH), associated with the first TRP, based on a real SRS transmission, wherein the PHR MAC CE is indicative of a second PH (e.g., a second Type 3 PH), associated with the second TRP, based on a reference SRS transmission, and wherein the second SRS transmission is performed after the UE transmits the PHR MAC CE. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 16-20. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 16-20, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network), such as by enhancing power control adjustments for different TRPs in multi-TRP scenarios. For example, applying one or more of the techniques presented herein may enable the UE to generate (e.g., correctly generate) a multi-TRP PHR MAC CE and/or provide the multi-TRP PHR MAC CE to one or more cells and/or the network, thereby enabling the UE and/or the network to more quickly and/or efficiently perform power control adjustments for different TRPs in multi-TRP scenarios.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   receiving an uplink (UL) grant indicating multi-Transmission/Reception Point (TRP) Physical Uplink Shared Channel (PUSCH) transmissions associated with transmission of a same Transport Block (TB) on different TRPs, wherein the multi-TRP PUSCH transmissions indicated by the UL grant comprise both:
      a first PUSCH transmission, at a first timing, comprising transmission of the same TB on a first TRP of a first cell; and
      a second PUSCH transmission, at a second timing, comprising transmission of the same TB on a second TRP of the first cell; and
   generating and transmitting a Power Headroom Reporting (PHR) Medium Access Control (MAC) Control Element (CE), wherein:
      based on the first timing of the first PUSCH transmission indicated by the UL grant and the second timing of the second PUSCH transmission indicated by the UL grant, the PHR MAC CE is generated to indicate:
         a first Type 1 power headroom (PH), associated with the first TRP, based on a real PUSCH transmission, wherein the first PUSCH transmission is at least one of performed before transmitting the PHR MAC CE or performed in a first slot that overlaps with a third slot for transmitting the PHR MAC CE; and
         a second Type 1 PH, associated with the second TRP, based on a reference PUSCH transmission, wherein the second PUSCH transmission is transmitted after transmitting the PHR MAC CE.

2. The method of claim 1, wherein the PHR MAC CE is indicative of:
   a first UE maximum transmit power for the first TRP and a second UE maximum transmit power for the second TRP; or
   a single UE maximum transmit power for both the first TRP and the second TRP.

3. The method of claim 1, wherein:
   the UE is configured with a first PUSCH power control adjustment state for the first TRP and a second PUSCH power control adjustment state for the second TRP; and
   the first PUSCH power control adjustment state is different from the second PUSCH power control adjustment state.

4. The method of claim 1, wherein:
   the first timing corresponds to at least one of a first time, a first time unit, the first slot, a first mini-slot or a first symbol; and
   the second timing corresponds to at least one of a second time, a second time unit, a second slot, a second mini-slot or a second symbol.

5. The method of claim 1, comprising:
   determining, based on a configuration from a network, whether to indicate a single Type 1 PH for the first cell in the PHR MAC CE or to indicate two Type 1 PHs for the first cell in the PHR MAC CE, wherein the PHR MAC CE indicates the first Type 1 PH and the second Type 1 PH based on a determination to indicate two Type 1 PHs for the first cell in the PHR MAC CE.

6. The method of claim 1, wherein:
   the real PUSCH transmission is the first PUSCH transmission.

7. The method of claim 1, wherein:
   transmitting the PHR MAC CE comprises transmitting the PHR MAC CE to the first cell or to a second cell.

8. The method of claim 1, wherein:
   triggering a PHR, associated with the PHR MAC CE, after receiving the UL grant.

9. The method of claim 1, comprising:
   determining the second Type 1 PH, wherein at least one of:
      determining the second Type 1 PH is not based on the second PUSCH transmission; or
      determining the second Type 1 PH is based on a difference between a reference UE maximum transmit power and a power for the reference PUSCH transmission.

10. The method of claim 1, wherein the real PUSCH transmission is the first PUSCH transmission, the method comprising:
    determining the first Type 1 PH based on a difference between a UE maximum transmit power and an estimated power for the first PUSCH transmission.

11. The method of claim 1, wherein:
    the first TRP is associated with a first Sounding Reference Signal (SRS) resource set of the first cell; and
    the second TRP is associated with a second SRS resource set of the first cell.

12. A User Equipment (UE), comprising:
    a control circuit;
    a processor installed in the control circuit; and
    a memory installed in the control circuit and operatively coupled to the processor, wherein the processor is configured to execute a program code stored in the memory to perform operations, the operations comprising:
  receiving an uplink (UL) grant indicating multi-Transmission/Reception Point (TRP) Physical Uplink Shared Channel (PUSCH) transmissions associated with transmission of a same Transport Block (TB) on different TRPs, wherein the multi-TRP PUSCH transmissions indicated by the UL grant comprise both:
    a first PUSCH transmission, at a first timing, comprising transmission of the same TB on a first TRP of a first cell; and
    a second PUSCH transmission, at a second timing, comprising transmission of the same TB on a second TRP of the first cell; and
  generating and transmitting a Power Headroom Reporting (PHR) Medium Access Control (MAC) Control Element (CE), wherein:
    based on the first timing of the first PUSCH transmission indicated by the UL grant and the second timing of the second PUSCH transmission indicated by the UL grant, the PHR MAC CE is generated to indicate:
      a first power headroom (PH), associated with the first TRP, based on a real PUSCH transmission, wherein the first PUSCH transmission is at least one of performed before transmitting the PHR MAC CE or performed in a first slot that overlaps with a third slot for transmitting the PHR MAC CE; and
      a second PH, associated with the second TRP, based on a reference PUSCH transmission, wherein the second PUSCH transmission is transmitted after transmitting the PHR MAC CE.

13. The UE of claim 12, wherein the PHR MAC CE is indicative of:
  a first UE maximum transmit power for the first TRP and a second UE maximum transmit power for the second TRP; or
  a single UE maximum transmit power for both the first TRP and the second TRP.

14. The UE of claim 12, wherein:
  the UE is configured with a first PUSCH power control adjustment state for the first TRP and a second PUSCH power control adjustment state for the second TRP; and
  the first PUSCH power control adjustment state is different from the second PUSCH power control adjustment state.

15. The UE of claim 12, wherein:
  the first timing corresponds to at least one of a first time, a first time unit, the first slot, a first mini-slot or a first symbol; and
  the second timing corresponds to at least one of a second time, a second time unit, a second slot, a second mini-slot or a second symbol.

16. The UE of claim 12, the operations comprising:
  determining, based on a configuration from a network, whether to indicate a single PH for the first cell in the PHR MAC CE or to indicate two PHs for the first cell in the PHR MAC CE, wherein the PHR MAC CE indicates the first PH and the second PH based on a determination to indicate two PHs for the first cell in the PHR MAC CE.

17. The UE of claim 12, wherein:
  the first TRP is associated with a first Sounding Reference Signal (SRS) resource set of the first cell; and
  the second TRP is associated with a second SRS resource set of the first cell.

18. A non-transitory computer-readable medium comprising processor-executable instructions that when executed by a User Equipment (UE) cause performance of operations, the operations comprising:
  receiving an uplink (UL) grant indicating multi-Transmission/Reception Point (TRP) Physical Uplink Shared Channel (PUSCH) transmissions associated with transmission of a same Transport Block (TB) on different TRPs, wherein the multi-TRP PUSCH transmissions indicated by the UL grant comprise both:
    a first PUSCH transmission, at a first timing, comprising transmission of the same TB on a first TRP of a first cell; and
    a second PUSCH transmission, at a second timing, comprising transmission of the same TB on a second TRP of the first cell; and
  generating and transmitting a Power Headroom Reporting (PHR) Medium Access Control (MAC) Control Element (CE), wherein:
    based on the first timing of the first PUSCH transmission indicated by the UL grant and the second timing of the second PUSCH transmission indicated by the UL grant, the PHR MAC CE is generated to indicate:
      a first Type 1 power headroom (PH), associated with the first TRP, based on a real PUSCH transmission, wherein the first PUSCH transmission is at least one of performed before transmitting the PHR MAC CE or performed in a first slot that overlaps with a third slot for transmitting the PHR MAC CE; and
      a second Type 1 PH, associated with the second TRP, based on a reference PUSCH transmission, wherein the second PUSCH transmission is transmitted after transmitting the PHR MAC CE.

* * * * *